United States Patent
Painter et al.

(10) Patent No.: US 7,031,577 B2
(45) Date of Patent: Apr. 18, 2006

(54) RESONANT OPTICAL DEVICES INCORPORATING MULTI-LAYER DISPERSION-ENGINEERED WAVEGUIDES

(75) Inventors: Oskar J. Painter, Pasadena, CA (US); David W. Vernooy, Sierra Madre, CA (US); Kerry J. Vahala, San Gabriel, CA (US)

(73) Assignee: Xponent Photonics Inc, Monrovia, CA (US)

( * ) Notice: Subject to any disclaimer, the term of this patent is extended or adjusted under 35 U.S.C. 154(b) by 0 days.

(21) Appl. No.: 10/990,950

(22) Filed: Nov. 16, 2004

(65) Prior Publication Data

US 2006/0039653 A1    Feb. 23, 2006

Related U.S. Application Data

(62) Division of application No. 10/037,966, filed on Dec. 21, 2001, now Pat. No. 6,839,491.

(60) Provisional application No. 60/257,218, filed on Dec. 21, 2000, provisional application No. 60/257,248, filed on Dec. 21, 2000, provisional application No. 60/301,519, filed on Jun. 27, 2001.

(51) Int. Cl.
*G02B 6/26* (2006.01)
*G02B 6/30* (2006.01)

(52) U.S. Cl. ............................ 385/50; 385/28; 385/39; 385/49

(58) Field of Classification Search ................ 385/27, 385/28, 30, 31, 39, 40–43, 48–50
See application file for complete search history.

(56) References Cited

U.S. PATENT DOCUMENTS

| | | |
|---|---|---|
| 4,142,775 A | 3/1979 | Ramaswamy et al. |
| 5,446,579 A | 8/1995 | Lomashevitch |
| 5,475,704 A | 12/1995 | Lomashevitch |
| 5,515,461 A | 5/1996 | Deri et al. |
| 5,703,989 A | 12/1997 | Khan et al. |
| 5,926,496 A | 7/1999 | Ho et al. |
| 6,009,115 A | 12/1999 | Ho |
| 6,031,945 A | 2/2000 | You et al. |
| 6,052,495 A | 4/2000 | Little et al. |

(Continued)

OTHER PUBLICATIONS

F. Agahi, B. Pezeshki, J. A. Kash, and D. W. Kisker, "Asymmetric F abry-Perot modulator with a waveguide geometry", Electron. Lett. vol. 32(3) 210 (1996).

(Continued)

*Primary Examiner*—John D. Lee
(74) *Attorney, Agent, or Firm*—David S. Alavi; Scott R. Miller; Christie Parker & Hale LLP

(57) ABSTRACT

A multi-layer laterally-confined dispersion-engineered optical waveguide may include one multi-layer reflector stack for guiding an optical mode along a surface thereof, or may include two multi-layer reflector stacks with a core therebetween for guiding an optical mode along the core. Dispersive properties of such multi-layer waveguides enable modal-index-matching between low-index optical fibers and/or waveguides and high-index integrated optical components and efficient transfer of optical signal power therebetween. Integrated optical devices incorporating such multi-layer waveguides may therefore exhibit low (<3 dB) insertion losses. Incorporation of an active layer (electro-optic, electro-absorptive, non-linear-optical) into such waveguides enables active control of optical loss and/or modal index with relatively low-voltage/low-intensity control signals. Integrated optical devices incorporating such waveguides may therefore exhibit relatively low drive signal requirements.

12 Claims, 53 Drawing Sheets

U.S. PATENT DOCUMENTS

| | | | |
|---|---|---|---|
| 6,222,964 | B1 | 4/2001 | Sadot et al. |
| 6,282,219 | B1 | 8/2001 | Butler et al. |
| 6,310,995 | B1 | 10/2001 | Saini et al. |
| 6,330,378 | B1 | 12/2001 | Forrest et al. |
| 6,339,607 | B1 | 1/2002 | Jiang et al. |
| 6,356,694 | B1 | 3/2002 | Weber |
| 6,400,856 | B1 | 6/2002 | Chin |
| 6,424,669 | B1 | 7/2002 | Jiang et al. |
| 6,445,724 | B1 | 9/2002 | Abeles |
| 6,507,684 | B1 | 1/2003 | Tapalian et al. |
| 6,560,259 | B1 | 5/2003 | Hwang |
| 6,633,696 | B1* | 10/2003 | Vahala et al. .............. 385/27 |
| 6,839,491 | B1* | 1/2005 | Painter et al. ............. 385/50 |
| 6,865,317 | B1* | 3/2005 | Vahala et al. .............. 385/30 |
| 2002/0081055 | A1 | 6/2002 | Painter et al. |
| 2003/0081902 | A1 | 5/2003 | Blauvelt et al. |

OTHER PUBLICATIONS

Carl Arft, Diego R. Yankelovich, Andre Knoesen, Erji Mao, and James S. Harris Jr., "In-line fiber evanescent field electrooptic modulators", Journal of Nonlinear Optical Physics and Materials vol. 9(1) 79 (2000).

C. I. H. Ashby, M. M. Bridges, A. A. Allemnan, B. E. Hammons, "Origin of the time dependence of wet oxidation of AlGaAs", Appl. Phys. Lett. vol. 75(1) 73 (1999).

W. G. Bi and C. W. Tu, "Bowing parameter of the band-gap energy of GaNxAs1-x", Appl. Phys. Lett. vol. 70(12) 1608 (1997).

P. Chavarkar, L. Zhao, S. Keller, A. Fisher, C. Zheng, J. S. Speck, and U. K. Mishra, "Strain relaxation of InxGa1-xAs during lateral oxidation of underlying AlAs layers", Appl. Phys. Lett. vol. 75(15) 2253 (1999).

E. I. Chen, N. Holonyak, Jr., andM. J. Ries, "Planar disorder- and native-oxide-defined photopumped AlAs-GaAs superlattice minidisk lasers", J. Appl. Phys. vol. 79(11) 8204 (1996).

K. D. Choquette, K. M. Geib, C. I. H. Ashby, R. D. Twesten, O. Blum, H. Q. Hou, D. M. Follstaedt, B. E. Hammons, D. Mathes, and R. Hull, "Advances in selective wet oxidation of AlGaAs alloys", IEEE Journal of Selected Topics in Quantum Electronics vol. 3(3) 916 (1997).

R. H. Homg, D. S. Wuu, S.C. Wei, M. F. Huang, K.H. Chang, P.H. Liu, and K. C. Lin, "AlGaInP/AuBe/glass light emitting diodes fabricated by wafer-bonding technology", Appl. Phys. Letts. vol. 75(2) 154 (1999).

D.L. Huffaker, H. Deng, Q. Deng, and D.G. Deppe, "Ring and stripe oxide-confined vertical-cavity surface-emitting lasers", Appl. Phys. Lett., vol. 69(23), 3477 (1996).

B. Koley, F. G. Johnson, O. King, S. S. Saini, and M. Dagenais, "A method of highly efficient hydrolization oxidation of III-V semiconductor lattice matched to indium phosphide", Appl. Phys. Lett. vol. 75(9) 1264 (1999).

M. Kondow, T. Kitatani, S. Nakatsuka, M. C. Larson, K. Nakahara, Y. Yazawa, M. Okai, and K. Uomi, "GaInNAs: A novel material for long-wavelength semiconductor lasers", IEEE Journal of Selected Topics in Quantium Electronics, vol. 3(3), 719 (1997).

B.A. Little, S.T. Chu, H. A. Haus, J. Foresi, and J.-P. Laine, "Microring channel dropping filters", J. Lightwave Technology vol. 15 998 (1997).

Y. Luo, D. C. Hall, L. Kou, L. Steingart, J. H. Jackson, O. Blum, and H. Hou, "Oxidized AlxGa1-xAs heterostructures planar waveguides", Appl. Phys. Lett. vol. 75(20) 3078 (1999).

M. H. MacDougalP. D. Dapkus, A. E. Bond, C.-K. Lin, and J. Geske, "Design and fabrication of VCSEL's with AlxOy-GaAs DBR's", IEEE Journal of Selected Topics in Quantum Electronics vol. 3(3) 905 (1997).

M. H. MacDougal, P. D. Dapkus, "Wavelength shift of selectively oxidized AlxOy-AlGaAs-GaAs distributed Bragg reflectors", IEEE Photonics Tech. Lett: vol. 9(7) 884 (1997).

R. L. Naone and L. A. Coldren, "Surface energy model for the thickness dependence of the lateral oxidation of AlAs", J. Appl. Phys. vol. 82(5) 2277 (1997).

N. Ohnoki, F. Koyama, and K. Iga, "Superlattice AlAs/ AlInAs-oxide current aperture for long wavelength InP-based vertical-cavity surface-emitting laser structure", Appl. Phys. Lett. vol. 73(22) 3262 (1998).

N. Ohnold, F. Koyama, and K. Iga, "Super-lattice AlAs/ AlInAs for lateral-oxide current confinement in InP-based lasers", J. Crystal Growth vol. 195 603 (1998).

R. D. Pechstedt, P. St. J. Russell, T. A. Birks, and F. D. Lloyd-Lucas, "Selective coupling of fiber modes with use of surface-guided Bloch modes supported by dielctric multilayer stacks", J. Opt. Soc. Am. A vol. 12(12) 2655 (1995).

R. D. Pechstedt, P. St. J. Russell, "Narrow-band in-line fiber filter using surface-guided Bloch modes supported by dielectric multilayer stacks", J. Lightwave Tech. vol. 14(6) 1541 (1996).

B. Pezeshki, J. A. Kash, D. W. Kisker, and F. Tong, "Multiple wavelength light source using an asymmetric waveguide coupler", Appl. Phys. Lett. vol. 65(2) 138 (1994).

B. Pezeshki, J. A. Kash, D. W. Walker, and F. Tong, "Wavelength sensitive tapered coupler with anti-resonant waveguides", IEEE Phot. Tech. Lett. vol. 6(10) 1225 (1994).

B. Pezeshki, F. F. Tong, J. A. Kash, and D. W. Kisker, "Vertical cavity devices as wavelength selective waveguides", J. Lightwave Tech. vol. 12(10) 1791 (1994).

B. Pezeshki, J. A. Kash, and F. Agahi, "Waveguide version of an asymmetric Fabry-Perot modulator", Appl. Phys. Lett. vol. 67(12) 1662 (1995).

H. Saito, T. Makimoto, and N. Kobayashi, "MOVPE growth of strained InGaAsN/GaAs quantum wells", J. Crystal Growth, vol. 195 416 (1998).

I.-H. Tan, C. Reaves, A. L. Holmes Jr., E. L. Hu, J. E. Bowers, and S. DenBaars, "Low-temperature bonding of III-V semiconductors", Electronics Letters 31 588 (1995).

H. Wada and T. Kamijoh, "Effects of heat treatment on bonding properties in InP-to-Si direct wafer bonding", Japanese Journal of Applied Physics Part 1 33 4878 (1994).

H. Wada, T. Kamijoh, and Y. Ogawa, "Direct bonding of InP to different materials for optical devices", Proceedings of the 3rd International Symposium on Semiconductor Wafer Bonding Science, Technology, and Applications, 95-97 579, The Electrochemical Society (Pennington NJ, 1995).

H. Wada and T. Kamijoh, "Room-temperature cw operation of InGaAsP lasers on Si fabricated by wafer bonding", IEEE Photonics Technology Letters 8 173 (1996).

H. Wada and T. Kamijoh, "Wafer bonding of InP to Si and its application to optical devices", Japanese Journal of Applied Physics Part 1 37 1383 (1998).

Z. J. Wang, S.-J. Chua, F. Zhou, W. Wang, and R. H. Wu, "Buried heterostructures InGaAsP/InP strain-compensated multiple quantum well laser with a native-oxidized InAlAs current blocking layer", Appl. Phys. Lett. vol. 73(26) 3803 (1998).

H. P. Xin and C. W. Tu, "GaInNAs/GaAs multiple quantum wells grown by gas-source molecular beam epitaxy", Appl. Phys Lett. vol. 72(19) 2442 (1998).

E. Yablonovitch, T. Sands, D. M. Hwang, I. Schnitzer, T. J. Gmitter, S. K. Shastry, D. S. Hill, and J. C. C. Fan, "Van der Waals bonding of GaAs on Pd leads to a permanent, solid-phase-topotaxial, metallurgical bond", Applied Physics Letters 59 3159 (1991).

Pochi Yeh, Amnon Yariv, and Chi-Shain Hong, "Electromagnetic propagation in periodic stratified media. I. General theory", J. Optical Soc. Am., vol. 67(4) 423 (1977).

Z.-F. Xiao, G.-Y. Wu, D. Zhang, G. Zhang, Z.-H. Li, Y.-L. Hao, and Y.-Y. Wang, "Silicon/glass wafer-to-wafer bonding with Ti/Ni intermediate bonding", Sensors and Actuators A—Physical 71 123 (1998).

* cited by examiner

FIG. 3A
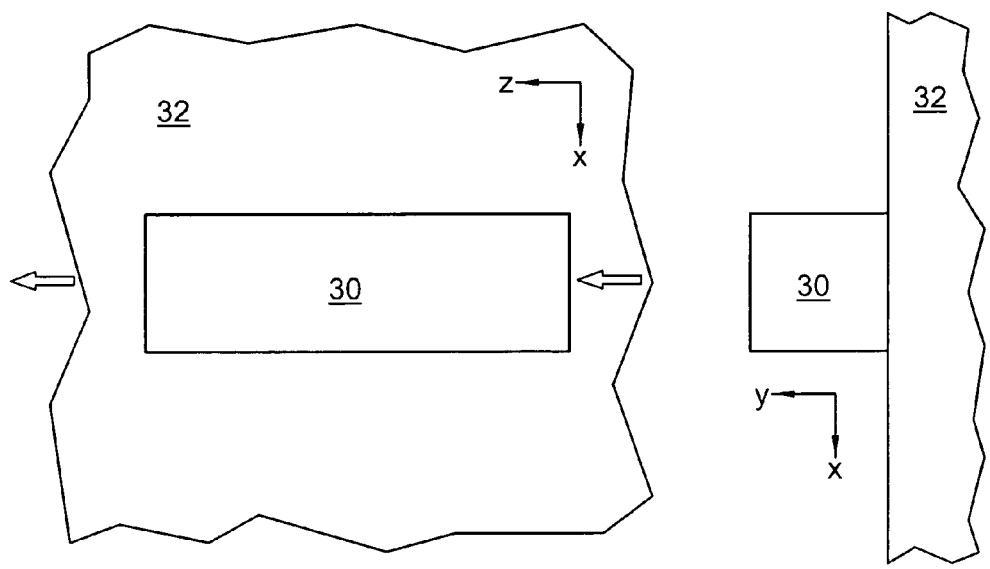
FIG. 3B
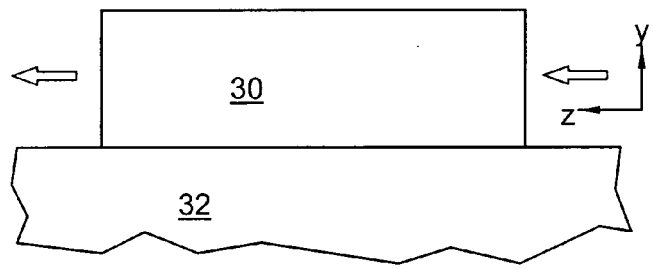
FIG. 3C
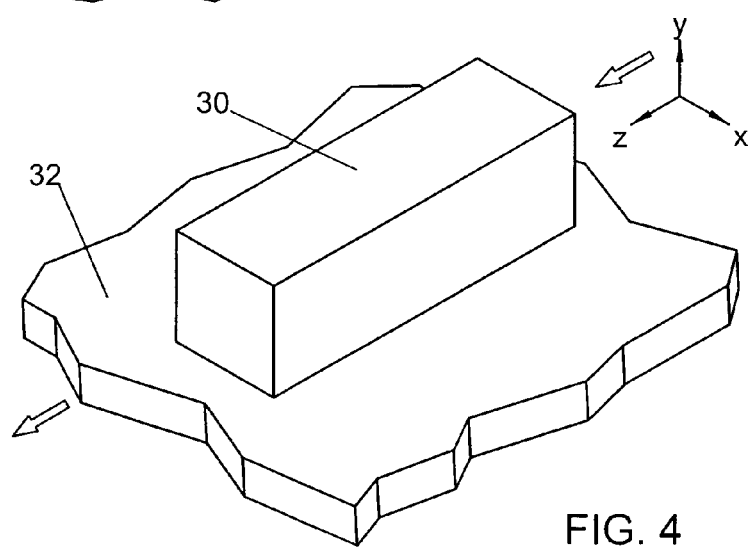
FIG. 4

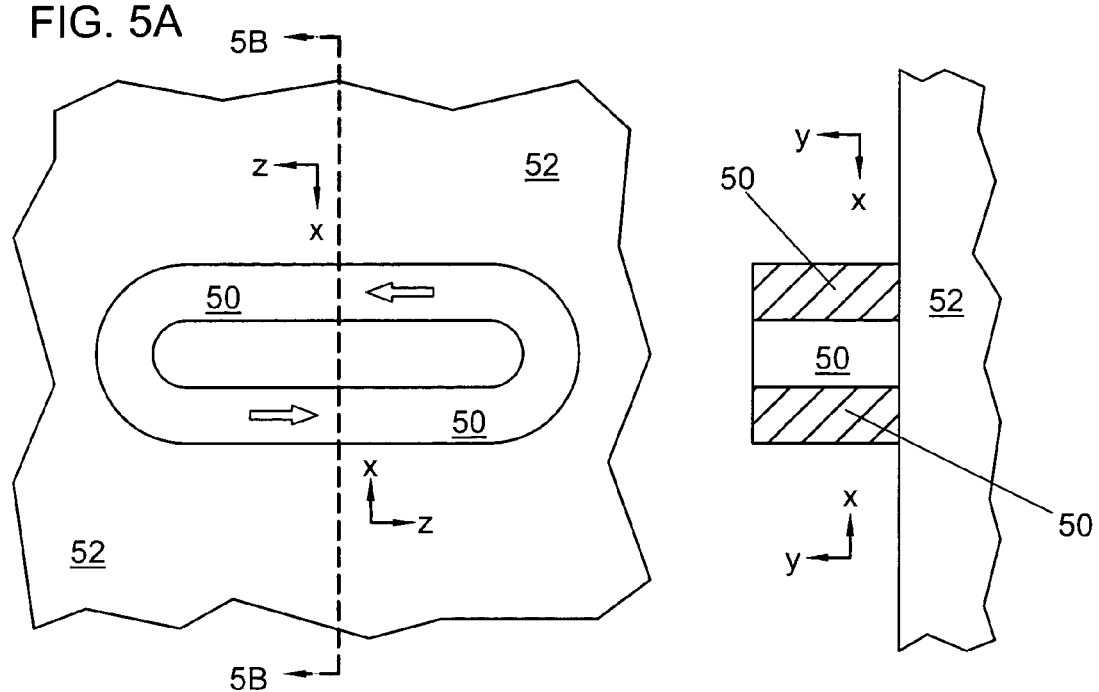
FIG. 5A
FIG. 5B
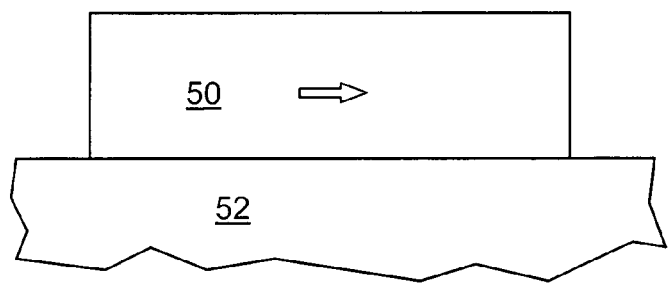
FIG. 5C
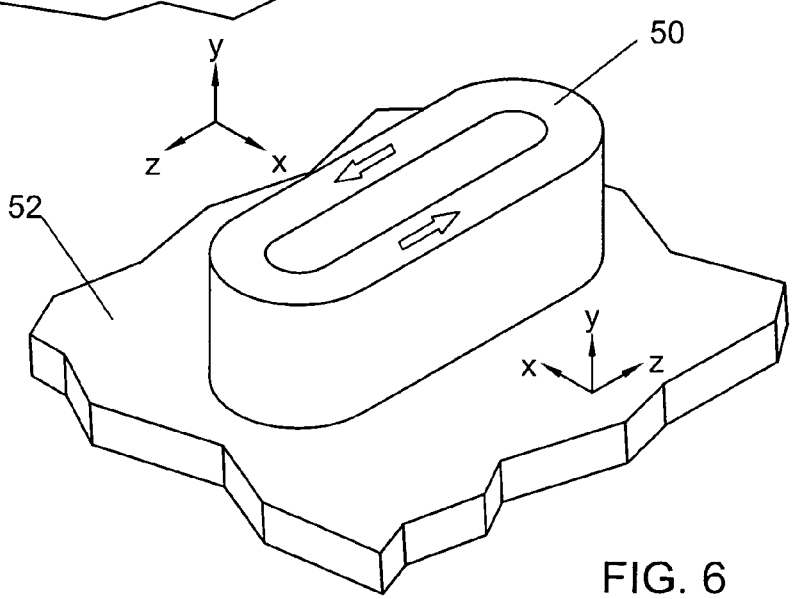
FIG. 6

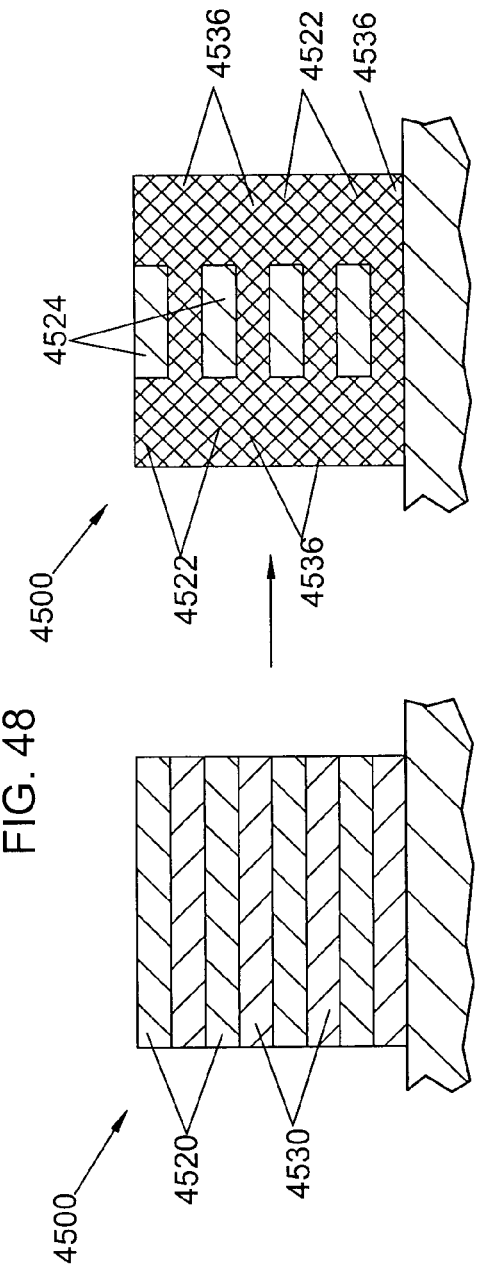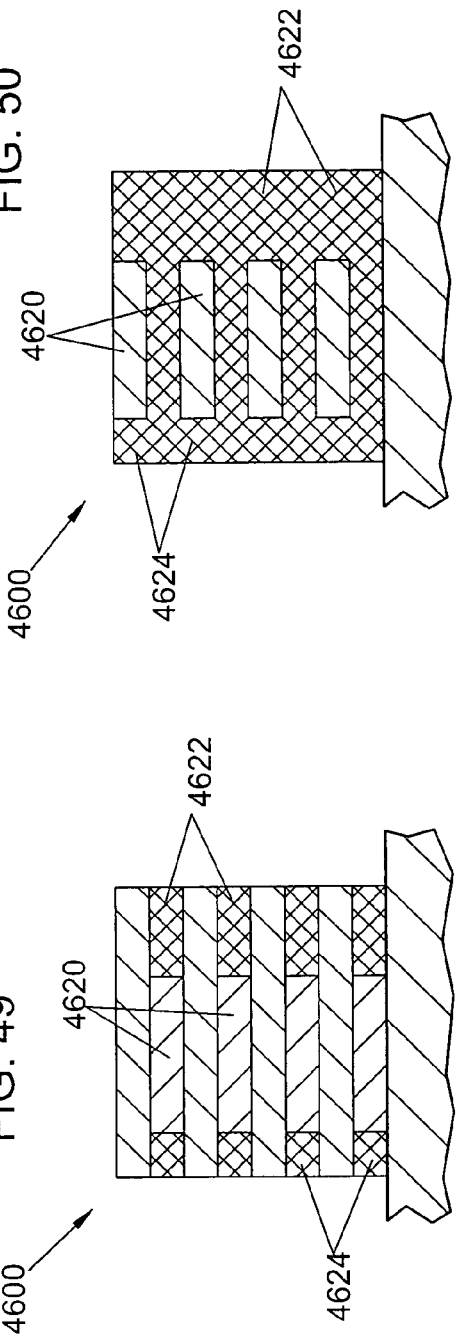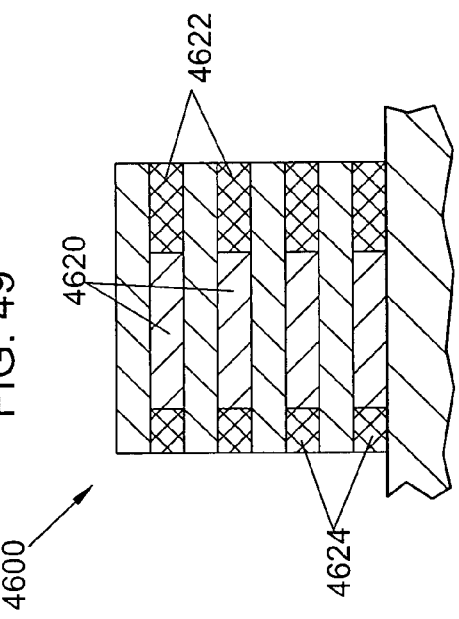

RESONANT OPTICAL DEVICES INCORPORATING MULTI-LAYER DISPERSION-ENGINEERED WAVEGUIDES

BENEFIT CLAIMS TO RELATED APPLICATIONS

This application is a divisional application of prior-filed U.S. non-provisional application Ser. No. 10/037,966 entitled "Multi-layer dispersion-engineered waveguides and resonators" filed Dec. 21, 2001 in the names of Oskar J. Painter, David W. Vernooy, and Kerry J. Vahala, now U.S. Pat. No. 6,839,491 which in turn claims benefit of: i) U.S. provisional Application No. 60/257,218 entitled "Waveguides and resonators for integrated optical devices and methods of fabrication and use thereof", filed Dec. 21, 2000 in the name of Oskar J. Painter; ii) U.S. provisional Application No. 60/257,248 entitled "Modulators for resonant optical power control devices and methods of fabrication and use thereof", filed Dec. 21, 2000 in the names of Oskar J. Painter, Kerry J. Vahala, Peter C. Sercel, and Guido Hunziker; and iii) U.S. provisional Application No. 60/301,519 entitled "Waveguide-fiber Mach-Zender interferometer and methods of fabrication and use thereof", filed Jun. 27, 2001 in the names of Oskar J. Painter, David W. Vernooy, and Kerry J. Vahala. Each of said application Ser. Nos. 10/037,966, 60/257,218, 60/257,248, and 60/301,519 is hereby incorporated by reference in its entirety as if fully set forth herein.

GOVERNMENT RIGHTS

The U.S. Government may have limited rights in this application pursuant to DARPA Contract No. N00014-00-3-0023.

BACKGROUND

The field of the present invention relates to devices for modulating, routing and/or processing optical signal power transmission. In particular, optical waveguides and resonators for integrated optical devices, as well as methods of fabrication and use thereof, are disclosed herein. The waveguides and resonators include a multi-layer laterally-confined dispersion-engineered waveguide segment, and may further include one or more active layers, thereby enabling tailoring of optical properties of the waveguide/resonator, and/or controlled modulation thereof.

This application is related to subject matter disclosed in:

A1) U.S. provisional Application No. 60/111,484 entitled "An all-fiber-optic modulator" filed Dec. 7, 1998 in the names of Kerry J. Vahala and Amnon Yariv, said provisional application being hereby incorporated by reference in its entirety as if fully set forth herein;

A2) U.S. application Ser. No. 09/454,719 entitled "Resonant optical wave power control devices and methods" filed Dec. 7, 1999 in the names of Kerry J. Vahala and Amnon Yariv, said application being hereby incorporated by reference in its entirety as if fully set forth herein;

A3) U.S. provisional Application No. 60/108,358 entitled "Dual tapered fiber-microsphere coupler" filed Nov. 13, 1998 in the names of Kerry J. Vahala and Ming Cai, said provisional application being hereby incorporated by reference in its entirety as if fully set forth herein;

A4) U.S. application Ser. No. 09/440,311 entitled "Resonator fiber bi-directional coupler" filed Nov. 12, 1999 in the names of Kerry J. Vahala, Ming Cai, and Guido Hunziker, said application being hereby incorporated by reference in its entirety as if fully set forth herein;

A5) U.S. provisional Application No. 60/183,499 entitled "Resonant optical power control devices and methods of fabrication thereof" filed Feb. 17, 2000 in the names of Peter C. Sercel and Kerry J. Vahala, said provisional application being hereby incorporated by reference in its entirety as if fully set forth herein;

A6) U.S. provisional Application No. 60/226,147 entitled "Fiber-optic waveguides for evanescent optical coupling and methods of fabrication and use thereof", filed Aug. 18, 2000 in the names of Peter C. Sercel, Guido Hunziker, and Robert B. Lee, said provisional application being hereby incorporated by reference in its entirety as if fully set forth herein;

A7) U.S. provisional Application No. 60/170,074 entitled "Optical routing/switching based on control of waveguide-ring resonator coupling", filed Dec. 9, 1999 in the name of Amnon Yariv, said provisional application being hereby incorporated by reference in its entirety as if fully set forth herein;

A8) U.S. Pat. No. 6,052,495 entitled "Resonator modulators and wavelength routing switches" issued Apr. 18, 2000 in the names of Brent E. Little, James S. Foresi, and Hermann A. Haus, said patent being hereby incorporated by reference in its entirety as if fully set forth herein;

A9) U.S. Pat. No. 6,101,300 entitled "High efficiency channel drop filter with absorption induced on/off switching and modulation" issued Aug. 8, 2000 in the names of Shanhui Fan, Pierre R. Villeneuve, John D. Joannopoulos, Brent E. Little, and Hermann A. Haus, said patent being hereby incorporated by reference in its entirety as if fully set forth herein;

A10) U.S. Pat. No. 5,926,496 entitled "Semiconductor micro-resonator device" issued Jul. 20, 1999 in the names of Seng-Tiong Ho and Deanna Rafizadeh, said patent being hereby incorporated by reference in its entirety as if fully set forth herein; and A11) U.S. Pat. No. 6,009,115 entitled "Semiconductor micro-resonator device" issued Dec. 28, 1999 in the name of Seng-Tiong Ho, said patent being hereby incorporated by reference in its entirety as if fully set forth herein.

A12) U.S. provisional Application No. 60/257,218 entitled "Waveguides and resonators for integrated optical devices and methods of fabrication and use thereof", filed Dec. 21, 2000 in the name of Oskar J. Painter, said provisional application being hereby incorporated by reference in its entirety as if fully set forth herein;

A13) U.S. provisional Application No. 60/257,248 entitled "Modulators for resonant optical power control devices and methods of fabrication and use thereof", filed Dec. 21, 2000 in the names of Oskar J. Painter, Kerry J. Vahala, Peter C. Sercel, and Guido Hunziker, said provisional application being hereby incorporated by reference in its entirety as if fully set forth herein;

A14) U.S. provisional Application No. 60/301,519 entitled "Waveguide-fiber Mach-Zender interferometer and methods of fabrication and use thereof", filed Jun. 27, 2001 in the names of Oskar J. Painter, David W. Vernooy, and Kerry J. Vahala, said provisional application being hereby incorporated by reference in its entirety as if fully set forth herein;

A15) U.S. non-provisional application Ser. No. 09/788,303 entitled "Cylindrical processing of optical media", filed Feb. 16, 2001 in the names of Peter C. Sercel, Kerry J. Vahala, David W. Vernooy, and Guido Hunziker, said non-provisional application being hereby incorporated by reference in its entirety as if fully set forth herein.

A16) U.S. non-provisional application Ser. No. 09/788,331 entitled "Fiber-ring optical resonators", filed Feb. 16, 2001 in the names of Peter C. Sercel, Kerry J. Vahala, David W. Vernooy, Guido Hunziker, and Robert B. Lee, said non-provisional application being hereby incorporated by reference in its entirety as if fully set forth herein.

A17) U.S. non-provisional application Ser. No. 09/788,300 entitled "Resonant optical filters", filed Feb. 16, 2001 in the names of Kerry J. Vahala, Peter C. Sercel, David W. Vernooy, Oskar J. Painter, and Guido Hunziker, said non-provisional application being hereby incorporated by reference in its entirety as if fully set forth herein.

A18) U.S. non-provisional application Ser. No. 09/788,301 entitled "Resonant optical power control device assemblies", filed Feb. 16, 2001 in the names of Peter C. Sercel, Kerry J. Vahala, David W. Vernooy, Guido Hunziker, Robert B. Lee, and Oskar J. Painter, said non-provisional application being hereby incorporated by reference in its entirety as if fully set forth herein.

A19) U.S. provisional Application No. 60/335,656 entitled "Polarization-engineered transverse-optical-coupling apparatus and methods", filed Oct. 30, 2001 in the names of Kerry J. Vahala, Peter C. Sercel, Oskar J. Painter, David W. Vernooy, and David S. Alavi, said provisional application being hereby incorporated by reference in its entirety as if fully set forth herein;

A20) U.S. provisional Application No. 60/334,705 entitled "Integrated end-coupled transverse-optical-coupling apparatus and methods", filed Oct. 30, 2001 in the names of Henry A. Blauvelt, Kerry J. Vahala, Peter C. Sercel, Oskar J. Painter, and Guido Hunziker, said provisional application being hereby incorporated by reference in its entirety as if fully set forth herein;

A21) U.S. provisional Application No. 60/333,236 entitled "Alignment apparatus and methods for transverse optical coupling", filed Nov. 23, 2001 in the names of Charles I. Grosjean, Guido Hunziker, Paul M. Bridger, and Oskar J. Painter, said provisional application being hereby incorporated by reference in its entirety as if fully set forth herein;

A22) U.S. non-provisional application Ser. No. 10/037,146 entitled "Resonant optical modulators", filed Dec. 21, 2001 in the names of Oskar J. Painter, Peter C. Sercel, Kerry J. Vahala, David W. Vernooy, and Guido Hunziker, said non-provisional application being hereby incorporated by reference in its entirety as if fully set forth herein.

This application is also related to subject matter disclosed in the following publications, each of said publications being hereby incorporated by reference in its entirety as if fully set forth herein:

P1) Ming Cai, Guido Hunziker, and Kerry Vahala, "Fiber-optic add-drop device based on a silica microsphere whispering gallery mode system", IEEE Photonics Technology Letters Vol. 11 686 (1999);

P2) J. C. Knight, G. Cheung, F. Jacques, and T. A. Birks, "Phased-matched excitation of whispering gallery-mode resonances by a fiber taper", Optics Letters Vol. 22 1129 (1997);

P3) R. D. Pechstedt, P. St. J. Russell, T. A. Birks, and F. D. Lloyd-Lucas, "Selective coupling of fiber modes with use of surface-guided Bloch modes supported by dielctric multilayer stacks", J. Opt. Soc. Am. A Vol. 12(12) 2655 (1995);

P4) R. D. Pechstedt, P. St. J. Russell, "Narrow-band in-line fiber filter using surface-guided Bloch modes supported by dielectric multilayer stacks", J. Lightwave Tech. Vol. 14(6) 1541 (1996);

P5) Hiroshi Wada, Takeshi Kamijoh, and Yoh Ogawa, "Direct bonding of InP to different materials for optical devices", Proceedings of the third international symposium on semiconductor wafer bonding: Physics and applications, Electrochemical Society Proceedings, Princeton N.J., Vol. 95-7, 579–591 (1995);

P6) R. H. Horng, D. S. Wuu, S.C. Wei, M. F. Huang, K. H. Chang, P. H. Liu, and K. C. Lin, "AlGaInP/AuBe/glass light emitting diodes fabricated by wafer-bonding technology", Appl. Phys. Letts. Vol. 75(2) 154 (1999);

P7) Y. Shi, C. Zheng, H. Zhang, J. H. Bechtel, L. R. Dalton, B. B. Robinson, W. Steier, "Low (sub-1-volt) halfwave voltage polymeric electro-optic modulators achieved by controlling chromophore shape", Science Vol. 288, 119 (2000);

P8) E. L. Wooten, K. M. Kissa, and A. Yi-Yan, "A review of lithium niobate modulators for fiber-optic communications systems", IEEE J. Selected Topics in Quantum Electronics, Vol. 6(1), 69 (2000);

P9) D. L. Huffaker, H. Deng, Q. Deng, and D. G. Deppe, "Ring and stripe oxide-confined vertical-cavity surface-emitting lasers", Appl. Phys. Lett., Vol. 69(23), 3477 (1996);

P10) Serpenguzel, S. Arnold, and G. Griffel, "Excitation of resonances of microspheres on an optical fiber", Opt. Lett. Vol. 20, 654 (1995);

P11) F. Treussart, N. Dubreil, J. C. Knight, V. Sandoghar, J. Hare, V. Lefevre-Seguin, J. M. Raimond, and S. Haroche, "Microlasers based on silica microspheres", Ann. Telecommun. Vol. 52, 557 (1997);

P12) M. L. Gorodetsky, A. A. Savchenkov, V. S. Ilchenko, "Ultimate Q of optical microsphere resonators", Optics Letters, Vol. 21, 453 (1996);

P13) Carl Arft, Diego R. Yankelovich, Andre Knoesen, Erji Mao, and James S. Harris Jr., "In-line fiber evanescent field electrooptic modulators", Journal of Nonlinear Optical Physics and Materials Vol. 9(1) 79 (2000);

P14) Pochi Yeh, Amnon Yariv, and Chi-Shain Hong, "Electromagnetic propagation in periodic stratified media. I. General theory", J. Optical Soc. Am., Vol. 67(4) 423 (1977);

P15) Ming Cai, Oskar Painter, and Kerry J. Vahala, "Observation of critical coupling in a fiber taper to a silica-microsphere whispering-gallery mode system", Physical Review Letters, Vol. 85(1) 74 (2000);

P16) M. Kondow, T. Kitatani, S. Nakatsuka, M. C. Larson, K. Nakahara, Y. Yazawa, M. Okai, and K. Uomi, "GaInNAs: A novel material for long-wavelength semiconductor lasers", IEEE Journal of Selected Topics in Quantum Electronics, Vol 3(3), 719 (1997);

P17) H. Saito, T. Makimoto, and N. Kobayashi, "MOVPE growth of strained InGaAsN/GaAs quantum wells", J. Crystal Growth, Vol. 195 416 (1998);

P18) W. G. Bi and C. W. Tu, "Bowing parameter of the band-gap energy of $GaN_xAs_{1-x}$", Appl. Phys. Lett. Vol. 70(12) 1608 (1997);

P19) H. P. Xin and C. W. Tu, "GaInNAs/GaAs multiple quantum wells grown by gas-source molecular beam epitaxy", Appl. Phys Lett. Vol. 72(19) 2442 (1998);

P20) B. Koley, F. G. Johnson, O. King, S. S. Saini, and M. Dagenais, "A method of highly efficient hydrolization oxidation of III–V semiconductor lattice matched to indium phosphide", Appl. Phys. Lett. Vol. 75(9) 1264 (1999);

P21) Z. J. Wang, S.-J. Chua, F. Zhou, W. Wang, and R. H. Wu, "Buried heterostructures InGaAsP/InP strain-compensated multiple quantum well laser with a native-oxidized InAlAs current blocking layer", Appl. Phys. Lett. Vol 73(26) 3803 (1998);

P22) N. Ohnoki, F. Koyama, and K. Iga, "Superlattice AlAs/AlInAs-oxide current aperture for long wavelength InP-based vertical-cavity surface-emitting laser structure", Appl. Phys. Lett. Vol. 73(22) 3262 (1998);

P23) N. Ohnoki, F. Koyama, and K. Iga, "Super-lattice AlAs/AlInAs for lateral-oxide current confinement in InP-based lasers", J. Crystal Growth Vol. 195 603 (1998);

P24) K. D. Choquette, K. M. Geib, C. I. H. Ashby, R. D. Twesten, O. Blum, H. Q. Hou, D. M. Follstaedt, B. E. Hammons, D. Mathes, and R. Hull, "Advances in selective wet oxidation of AlGaAs alloys", IEEE Journal of Selected Topics in Quantum Electronics Vol. 3(3) 916(1997);

P25) M. H. MacDougal, P. D. Dapkus, "Wavelength shift of selectively oxidized $Al_xO_y$—AlGaAs—GaAs distributed Bragg reflectors", IEEE Photonics Tech. Lett. Vol. 9(7) 884 (1997);

P26) C. I. H. Ashby, M. M. Bridges, A. A. Allerman, B. E. Hammons, "Origin of the time dependence of wet oxidation of AlGaAs", Appl. Phys. Lett. Vol. 75(1) 73 (1999);

P27) P. Chavarkar, L. Zhao, S. Keller, A. Fisher, C. Zheng, J. S. Speck, and U. K. Mishra, "Strain relaxation of $In_xGa_{1-x}As$ during lateral oxidation of underlying AlAs layers", Appl. Phys. Lett. Vol. 75(15) 2253 (1999);

P28) R. L. Naone and L. A. Coldren, "Surface energy model for the thickness dependence of the lateral oxidation of AlAs", J. Appl. Phys. Vol. 82(5) 2277 (1997);

P29) M. H. MacDougal P. D. Dapkus, A. E. Bond, C.-K. Lin, and J. Geske, "Design and fabrication of VCSEL's with $Al_xO_y$—GaAs DBR's", IEEE Journal of Selected Topics in Quantum Electronics Vol. 3(3) 905 (1997);

P30) E. I. Chen, N. Holonyak, Jr., and M. J. Ries, "Planar disorder- and native-oxide-defined photopumped AlAs—GaAs superlattice minidisk lasers", J. Appl. Phys. Vol. 79(11) 8204 (1996); and P31) Y. Luo, D. C. Hall, L. Kou, L. Steingart, J. H. Jackson, O. Blum, and H. Hou, "Oxidized $Al_xGa_{1-x}As$ heterostructures planar waveguides", Appl. Phys. Lett. Vol. 75(20) 3078 (1999);

P32) B. Pezeshki, J. A. Kash, and F. Agahi, "Waveguide version of an asymmetric Fabry-Perot modulator", Appl. Phys. Lett. Vol. 67(12) 1662 (1995);

P33) B. Pezeshki, F. F. Tong, J. A. Kash, and D. W. Kisker, "Vertical cavity devices as wavelength selective waveguides", J. Lightwave Tech. Vol. 12(10) 1791 (1994);

P34) F. Agahi, B. Pezeshki, J. A. Kash, and D. W. Kisker, "Asymmetric Fabry-Perot modulator with a waveguide geometry", Electron. Lett. Vol. 32(3) 210 (1996);

P35) B. Pezeshki, J. A. Kash, D. W. Kisker, and F. Tong, "Multiple wavelength light source using an asymmetric waveguide coupler", Appl. Phys. Lett. Vol. 65(2) 138 (1994); and P36) B. Pezeshki, J. A. Kash, D. W. Walker, and F. Tong, "Wavelength sensitive tapered coupler with anti-resonant waveguides", IEEE Phot. Tech. Lett. Vol. 6(10) 1225 (1994).

Optical fiber and propagation of high-speed optical pulses therethrough has become the technology of choice for high-speed telecommunications. Generation of trains of such high-speed optical pulses, representative of voice, video, data, and/or other signals, requires high-speed optical modulation techniques, typically intensity modulation techniques. Direct intensity modulation of the light source (usually a laser diode) generally induces unwanted phase and/or frequency modulation as well, which may be problematic when the modulated optical mode must propagate long distances within the optical fiber, or when the modulated optical mode is one narrow-linewidth wavelength component among many within a wavelength division multiplexed (WDM) fiber-optic telecommunication system. It has therefore become standard practice to provide an external intensity modulator as a separate optical component, to act on a propagating optical mode after it has left the light source.

Other devices may be required for subsequent manipulation and/or control of the propagating optical pulse train, including but not limited to, for example, routers, switches, fixed and variable attenuators, fixed and variable couplers, bi-directional couplers, channel add-drop filters, N×N switches, and so forth. It is desirable for these devices to perform their respective functions without the need for conversion of the optical pulse train into an electronic signal for manipulation and re-conversion to an optical pulse train following manipulation. It is preferable for these devices to perform their respective functions by direct manipulation of the optical pulse train. To this end many of these devices are fabricated as integrated devices, with optical portions and electronically-driven control portions fabricated as a single integrated component. Many of these devices function by controlling flow of optical power from one optical mode to another optical mode in a controlled fashion. For example, optical power may be shifted from a propagating optical mode of a first optical fiber to a propagating mode of a second optical fiber in an actively-controlled fashion, using so-called directional couplers, or in a wavelength-dependent fashion (active or passive), using so-called channel add-drop filters. Application of a control signal to an active device may cause optical power to remain within a propagating optical mode of a first optical fiber, or to couple into a propagating optical mode of a second optical fiber.

High insertion losses associated with currently available devices necessitate use of optical amplifiers to boost optical signal levels in a fiber-optic telecommunications system, essentially to replace optical power thrown away by the use of lossy modulators, couplers, and other devices. This adds significantly to the cost, size, and power consumption of any fiber-optic system or sub-system. Furthermore, the full potential of powerful new on-chip integrated optical devices cannot be realized when a substantial fraction of the optical signal is lost through inefficient transfer of optical power between an optical fiber and a waveguide on an integrated optical chip.

Optical signal power transfer between various optical devices in a fiber-optic telecommunications system relies on optical coupling between optical modes in the devices.

Transverse-coupling (also referred to as transverse optical coupling, evanescent coupling, evanescent optical coupling, directional coupling, directional optical coupling) may be employed, thereby eliminating transverse mode matching requirements imposed by end-coupling. Such optical power transfer by transverse-coupling depends in part on the relative modal indices of the transverse-coupled optical modes. Active control of the modal index of one or both of the transverse-coupled optical modes would therefore enable active control of the degree to which optical power is transferred from one device to the other, preferably using control voltages substantially smaller magnitude than required by currently available devices. Optical power transfer from a fiber-optic or other low-index optical waveguide to an integrated on-chip optical device (typically higher-index) could be greatly improved by employing transverse-coupling. Such optical power transfer could be actively controlled by controlling a modal index of an optical mode of a waveguide and/or resonator of the integrated device. Optical losses within such an integrated on-chip device could also be reduced.

FIG. 1 shows an example of a modulator 10 fabricated as an optical waveguide Mach-Zender interferometer on an electro-optic crystal substrate 12 (typically lithium niobate). Standard fabrication techniques are used to fabricate the waveguide 14 (usually lithographic masking followed by ion diffusion) and to deposit control electrodes 16. An incident optical signal propagating into entrance face 18 (i.e., "end-coupled") and through the device is divided into the two arms of the interferometer waveguide 14, application of a control voltage across the control electrodes 16 (in any of several configurations) induces a relative change in the modal indices of the optical modes in the arms (by an electro-optic mechanism), and the optical signals propagating in the arms are then recombined before exiting through exit face 19. Variation of the control voltage enables modulation of the transmission of the incident optical signal from a lower operational optical transmission level (when the recombined optical modes substantially destructively interfere; preferably near zero transmission) to an upper operational optical transmission level (when the recombined optical modes substantially constructively interfere; preferably near 100% transmission, but typically limited by insertion loss of the modulator). Modulators of this sort are widely used in fiber optic telecommunications systems, may enable modulation frequencies up to several tens of GHz, and may require control voltages of at least several volts up to about 10 volts for substantially full modulation of the optical signal. The control voltage required for a device to achieve substantially full modulation (i.e., near zero transmission of the optical mode at the lower transmission level) is referred to as $V_\pi$, since a phase shift of about $\pi$ is required to make the optical modes propagating in the two arms of the interferometer substantially destructively interfere. $V_\pi$ is an important figure-of-merit for characterizing electro-optic modulators. The relatively high $V_\pi$ of typical lithium niobate modulators forces the use of expensive high speed electronic drivers (described below), increasing cost and power consumption of the device. In addition, coupling optical power into and out of the faces of the modulator (end-fire coupling, or end-coupling) is quite inefficient, and typical lithium niobate modulators may have insertion losses as high as 6 dB. Most of the insertion loss may be attributed to transverse mode mismatch of the input optical mode and the preferred mode of the waveguide. This may be somewhat mitigated by modifying the device to achieve better mode-matching, but at the expense of a larger $V_\pi$.

FIG. 2 shows an example of a directional coupler 20 (also referred-to as a 2×2 optical switch) fabricated as an integrated optical device on an electro-optic crystal substrate 22 (typically lithium niobate). In this example two waveguides 24a and 24b are fabricated on the substrate, and are positioned in relatively close proximity in a coupling portion of the device. In this way an optical signal propagating in an optical mode of one waveguide may transverse-couple into an optical mode of the second waveguide. The device is typically constructed so that over the length of the coupling portion, substantially all of the optical power entering the first waveguide is transferred into the second waveguide. Control electrodes 26 are positioned so that an applied control voltage alters the relative modal indices of the optical modes of the two waveguides in the coupling portion (by an electro-optic mechanism). A switching voltage $V_0$, typically several volts up to about 10 volts, is the voltage that alters the relative modal indices (i.e., the phase matching condition between the waveguides) to the extent that substantially none of the optical power entering the first waveguide is transferred to the second waveguide. By switching the control voltage between about zero volts and about $V_0$, the optical power entering the first waveguide may be switched between exiting via the second waveguide (zero volts applied) or exiting via the first waveguide ($V_0$ applied). Such couplers may exhibit switching frequencies of up to 10 GHz, and $V_0$ is an important figure-of-merit for characterizing electro-optic couplers. In a manner similar to the modulators described hereinabove, these devices require costly high-speed electronic driver hardware (described below) and exhibit insertion losses as high as 6 dB.

A general discussion of electro-optic modulators, interferometers, and couplers may be found in *Fundamentals of Photonics* by B. E. A. Saleh and M. C. Teich (Wiley, New York, 1991), hereby incorporated by reference in its entirety as if fully set forth herein. Particular attention is called to Chapter 18.

For operating voltages ($V_\pi$ or $V_0$) on the order of several volts and high modulation/switching frequencies, a high speed electronic control input signal must typically be amplified to the appropriate level for application to the device by a high speed electronic amplifier, usually referred to as a driver or RF driver. A driver adds substantially to the size, cost, and power consumption of current optical modulators, couplers, and other devices, and may limit the maximum frequency at which such devices may be driven. For operating voltages ($V_\pi$ or $V_0$) on the order of 10 V, a device may consume on the order of 1 W of electrical drive power. This power must be dissipated and/or otherwise managed properly to avoid overheating, degraded performance, and/or eventual failure of the device. This may be particularly problematic when the properties defining the performance of the device (such as waveguide pathlength, refractive and modal indices, and so forth) are temperature dependent. Since such large numbers of such modulators, couplers, switches, and other optical devices are required to implement a fiber-optic telecommunications system of any significant extent (organization-, city-, state-, nation-, and/or world-wide; alternatively enterprise, metro, and/or trunk systems), any potential reductions in size, cost, and/or power consumption may prove to be quite significant. A sub-volt control voltage level ($V_\pi$ and/or $V_0$) would eliminate the need for a driver, potentially cutting the cost of each device, and would result in a corresponding decrease in power consumption and its attendant technical difficulties and economic disadvantages. Limitations on operating speed imposed by driver performance would be eliminated.

It is desirable to provide optical modulators, interferometers, couplers, routers, add/drop filters, switches, and/or other devices wherein optical power may be efficiently transferred to/from the device from/to an optical fiber or other low-index waveguide without limitations and/or insertion losses imposed by end-coupling. It is desirable to provide optical modulators, interferometers, couplers, routers, add/drop filters, switches, and/or other devices wherein optical power may be efficiently transferred to/from the device from/to an optical fiber or other low-index waveguide by transverse-coupling. It is desirable to provide optical modulators, interferometers, couplers, routers, add/drop filters, switches, and/or other devices having insertion loss less than about 3 dB. It is desirable to provide optical modulators, interferometers, couplers, routers, add-drop filters, switches, and/or other integrated optical devices that may be well modal-index-matched to optical fiber and/or other low-index waveguides. It is desirable to provide optical modulators, interferometers, couplers, routers, add-drop filters, and/or other devices that may be fabricated as integrated optical devices, on a planar platform or on multiple-level vertically-integrated planar platforms. It is therefore desirable to provide optical modulators, interferometers, couplers, routers, add-drop filters, switches, and/or other devices wherein the required control voltage level ($V_\pi$ or $V_0$) is less than about one volt. It is desirable to provide optical modulators, interferometers, couplers, routers, add-drop filters, and/or other devices that do not require a driver for amplifying electronic control signals. It is desirable to provide optical modulators, interferometers, couplers, routers, add-drop filters, and/or other devices that are compatible with other extant components of a fiber-optic telecommunications system.

SUMMARY

Certain aspects of the present invention may overcome one or more aforementioned drawbacks of the previous art and/or advance the state-of-the-art of apparatus and methods for modulating, routing, and/or other optical power control devices, and in addition may meet one or more of the following objects:

To provide waveguides and resonators for integrated optical devices and methods of fabrication and use thereof compatible with other extant components of a fiber-optic telecommunications system;

To provide waveguides and resonators for integrated optical devices and methods of fabrication and use thereof that may be fabricated as integrated optical devices;

To provide waveguides and resonators for integrated optical devices and methods of fabrication and use thereof that may yield optical devices having insertion loss of less than about 3 dB;

To provide waveguides and resonators for integrated optical devices and methods of fabrication and use thereof wherein optical power may be efficiently transferred to/from the device from/to an optical fiber or other low-index waveguide;

To provide waveguides and resonators for integrated optical devices and methods of fabrication and use thereof wherein transverse-coupling serves to transfer optical signals to/from the waveguide/resonator;

To provide waveguides and resonators for integrated optical devices and methods of fabrication and use thereof that may include a laterally-confined optical waveguide segment;

To provide waveguides and resonators for integrated optical devices and methods of fabrication and use thereof that may include a multi-layer optical waveguide segment;

To provide waveguides and resonators for integrated optical devices and methods of fabrication and use thereof that may include a dispersion-engineered waveguide segment;

To provide waveguides and resonators for integrated optical devices and methods of fabrication and use thereof that may include a ridge-like waveguide/resonator structure protruding from a substrate;

To provide waveguides and resonators for integrated optical devices and methods of fabrication and use thereof for enabling modal-index-matching between the waveguide/resonator and an optical fiber or other low-index waveguide;

To provide waveguides and resonators for integrated optical devices and methods of fabrication and use thereof for enabling passive modal-index-matching between the waveguide/resonator and an optical fiber or other low-index waveguide;

To provide waveguides and resonators for integrated optical devices and methods of fabrication and use thereof for enabling active modal-index-matching between the waveguide/resonator and an optical fiber or other low-index waveguide by application of a control signal to the waveguide/resonator;

To provide waveguides and resonators for integrated optical devices and methods of fabrication and use thereof wherein a multi-layer stack guides a surface-guided optical mode, the surface-guided optical mode being transverse-coupled to a mode of another optical element;

To provide waveguides and resonators for integrated optical devices and methods of fabrication and use thereof wherein a pair of multi-layer stacks guide a substantially confined optical mode therebetween, the confined optical mode being transverse-coupled to a mode of another optical element;

To provide waveguides and resonators for integrated optical devices and methods of fabrication and use thereof wherein the waveguide/resonator includes an at least one electro-active layer and electronic control components for controlling the electro-active layer;

To provide waveguides and resonators for integrated optical devices and methods of fabrication and use thereof wherein the dispersive properties of the multi-layer stack(s) enable substantial changes in the modal index and/or modal loss of a guided optical mode by application of relatively small control voltages to the electro-active layer;

To provide waveguides and resonators for integrated optical devices and methods of fabrication and use thereof wherein the waveguide/resonator includes at least one non-linear-optical layer and optical control components for controlling the non-linear-optical layer;

To provide waveguides and resonators for integrated optical devices and methods of fabrication and use thereof wherein the dispersive properties of the multi-layer stack(s) enable substantial changes in the modal index and/or modal loss of a guided optical mode by application of relatively small optical control signals to the non-linear-optical layer;

To provide waveguides and resonators for integrated optical devices and methods of fabrication and use thereof wherein the required control voltage level ($V_\pi$ or $V_0$) may be less than about one volt;

To provide waveguides and resonators for integrated optical devices and methods of fabrication and use thereof wherein use of a driver for amplifying high-data-rate electronic control signals may not be required;

To provide fiber-optic modulators and methods of fabrication and use thereof wherein a simplified driver for amplifying high-data-rate electronic control signals may be employed;

To provide waveguides and resonators for integrated optical devices and methods of fabrication and use thereof wherein the waveguide/resonator further comprises lateral lower-index portions for substantially laterally confining a guided optical mode;

To provide waveguides and resonators for integrated optical devices and methods of fabrication and use thereof wherein lateral lower-index portions of the waveguide/resonator restrict the guided optical modes to one or a few transverse optical modes;

To provide waveguides and resonators for integrated optical devices and methods of fabrication and use thereof wherein lateral lower-index portions of the waveguide/resonator decrease optical loss and/or increase the Q-factor of the waveguide/resonator;

To provide waveguides and resonators for integrated optical devices and methods of fabrication and use thereof wherein the multi-layer stack(s), electro-active and/or non-linear-optical layer, and control components (if present) may be fabricated by a layer growth/deposition sequence on a single substrate;

To provide waveguides and resonators for integrated optical devices and methods of fabrication and use thereof wherein the multi-layer stack(s), electro-active and/or non-linear-optical layer, and control components (if present) may be fabricated by layer growth/deposition sequences on multiple substrates followed by wafer-bonding of the grown/deposited layers;

To provide waveguides and resonators for integrated optical devices and methods of fabrication and use thereof wherein lateral low-index portions of the waveguide/resonator may be provided by lateral chemical conversion of one or more layers of the waveguide/resonator;

To provide waveguides and resonators for integrated optical devices and methods of fabrication and use thereof wherein one or more grown/deposited layers of the waveguide/resonator may subsequently be substantially completely converted to another material through lateral chemical conversion;

To provide waveguides and resonators for integrated optical devices and methods of fabrication and use thereof wherein control of a modal index of a guided optical mode enables control of optical power transfer between the waveguide/resonator and another optical element through transverse-coupling;

To provide waveguides and resonators for integrated optical devices and methods of fabrication and use thereof wherein control of a modal index of a guided resonant optical mode enables control of a resonance frequency of the resonator; and To provide waveguides and resonators for integrated optical devices and methods of fabrication and use thereof wherein control of a modal index and/or optical loss of a guided optical mode enables control of an operational state of the optical device.

One or more of the foregoing objects may be achieved in the present invention by an optical waveguide/resonator including at least one multi-layer laterally-confined dispersion-engineered optical waveguide segment. The multi-layer waveguide segment may include a single multi-layer reflector stack for guiding a surface-guided optical mode (SGOM). The multi-layer waveguide segment may also include lateral lower-index portions thereof for lateral confinement of the surface-guided optical mode, and may include a waveguide or core layer thereon. The multi-layer waveguide segment may further comprise one or more electro-active and/or non-linear-optical layers and control components for controlling the refractive index and/or optical loss thereof. Strongly dispersive optical properties of the single-reflector-guided SGOM (a substantially flat dispersion relation in the operating wavelength range, so that a narrow range of wavelengths cover a wide range of propagation constants or modal indices) serve to produce a substantially larger modal index shift of the SGOM for a given applied control signal than previous devices. The surface-guided optical mode may be transverse-coupled to another optical mode of another optical element. Control of the modal index and/or optical loss may enable control of: optical power transfer between the waveguide/resonator and another optical element; the resonance frequency of a resonant optical mode of a resonator; and an operational state of the waveguide/resonator and/or an optical device incorporating the waveguide/resonator.

Alternatively, the multi-layer waveguide segment may include a pair of multi-layer reflector stacks for guiding a substantially confined optical mode along a waveguide or core layer therebetween. Such a dual-reflector waveguide segment may also include lateral lower-index portions thereof for lateral confinement of the guided optical mode. The dual-reflector waveguide segment may further comprise one or more electro-active and/or non-linear-optical layers and control components for controlling the refractive index and/or optical loss thereof. The strongly dispersive optical properties of the dual-reflector-guided optical mode (a substantially flat dispersion relation in the operating wavelength range, so that a narrow range of wavelengths cover a wide range of propagation constants or modal indices) serve to produce a substantially larger modal index shift of the guided optical mode for a given applied control signal than previous devices. The guided optical mode may be transverse-coupled to another optical mode of another optical element. Control of the modal index and/or optical loss may enable control of: optical power transfer between the waveguide/resonator and another optical element; the resonance frequency of a optical mode of a resonator; and an operational state of the waveguide/resonator and/or an optical device incorporating the waveguide/resonator.

Multi-layer waveguides/resonators may be fabricated by 1) "vertical fabrication" of a multi-layer structure including reflector stack(s), any required core or waveguide layer, any required electro-active and/or non-linear-optical layer(s), any required control components, and any other desired layers on a substrate, followed by 2) "horizontal fabrication" of the multi-layer structure by spatially-selective processing of portions of the multi-layer structure, creating on the substrate a multi-layer waveguide segment of the desired size, shape, and topology. The "horizontal fabrication" step may further include lateral processing of one or more layers of the multi-layer waveguide segment, resulting in chemical conversion of all or part of the affected layers.

Additional objects and advantages of the present invention may become apparent upon referring to the preferred and alternative embodiments of the present invention as illustrated in the drawings and described in the following written description and/or claims.

BRIEF DESCRIPTION OF THE DRAWINGS

In many of the Figures, a reference coordinate system is shown for descriptive convenience only.

FIGS. 3A, 3B, and 3C are top plan, transverse-sectional, and side elevation views, respectively, of an optical waveguide on a substrate according to the present invention, showing a direction of light propagation therein.

FIG. 4 is an isometric view of an optical waveguide on a substrate according to the present invention, showing a direction of light propagation therein.

FIGS. 5A, 5B, and 5C are top plan, transverse-sectional, and side elevation views, respectively, of an optical resonator on a substrate according to the present invention, showing a direction of light propagation therein.

FIG. 6 is an isometric view of an optical resonator on a substrate according to the present invention, showing a direction of light propagation therein.

FIG. 48 is a process diagram for horizontal fabrication of a waveguide of the present invention.

FIG. 49 is a transverse-sectional view of a waveguide of the present invention having asymmetric lateral low-index portions thereon.

FIG. 50 is a transverse-sectional view of a waveguide of the present invention having asymmetric lateral low-index portions thereon.

Figure 1:
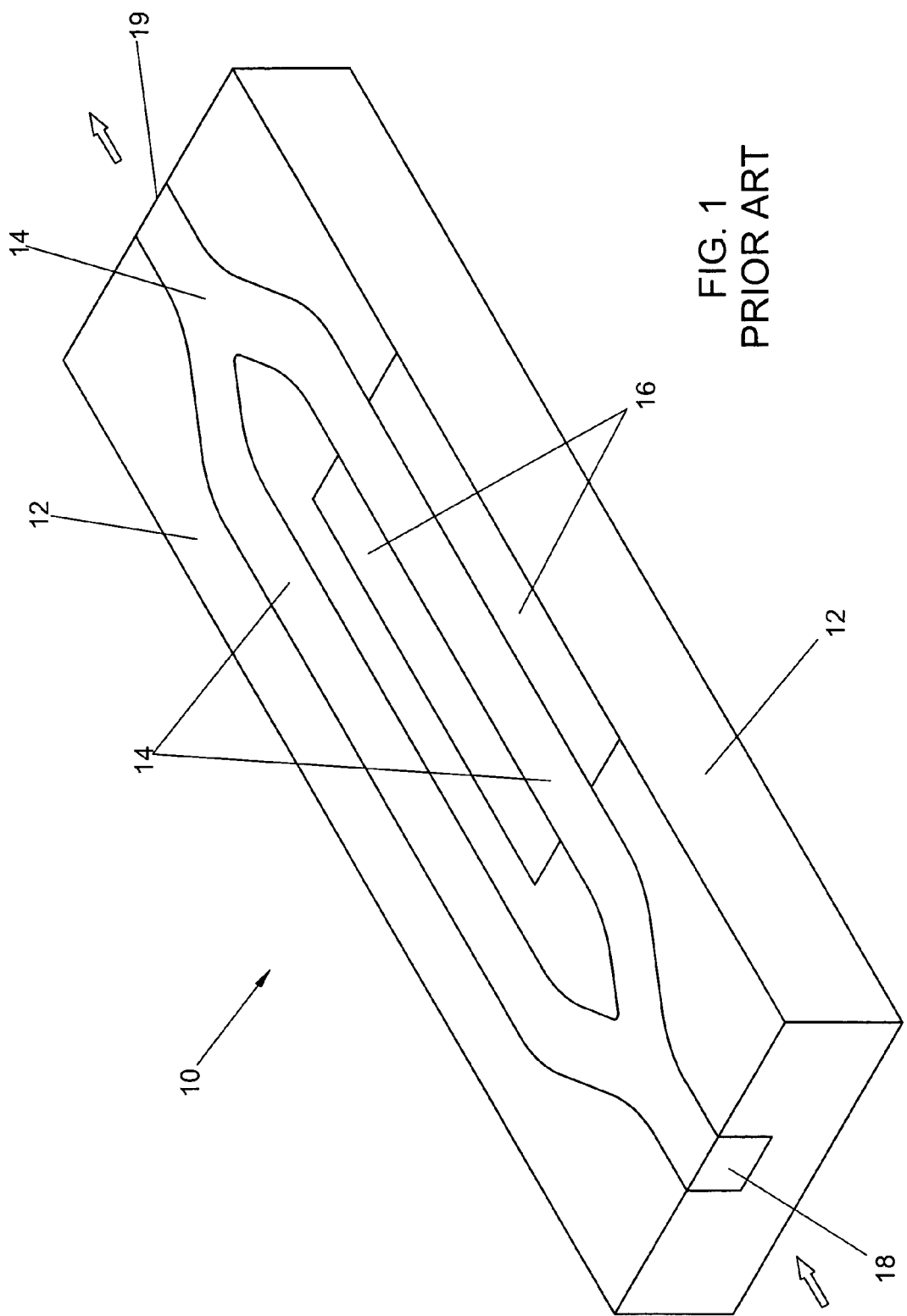
FIG. 1 shows a prior-art Mach-Zender interferometer modulator fabricated on an electro-optic crystal substrate.

It should be noted that the relative proportions of various structures shown in the Figures may be distorted to more clearly illustrate the present invention. In particular, various metal, semiconductor, and/or other thin films, layers, and/or coatings may also be shown having disproportionate and/or exaggerated thicknesses for clarity. Relative dimensions of various waveguides, resonators, optical fibers/tapers, and so forth may also be distorted, both relative to each other as well as transverse/longitudinal proportions. The text and incorporated references should be relied on for the appropriate dimensions of structures shown herein.

DETAILED DESCRIPTION OF PREFERRED AND ALTERNATIVE EMBODIMENTS

For purposes of the present written description, the term "waveguide" shall often be intended encompass both open waveguides (in which no closed optical path is provided for allowing re-circulation of optical power within an optical mode supported by the waveguide) and closed waveguides (in which a closed optical path is provided for allowing re-circulation of optical power within an optical mode supported by the waveguide; such closed waveguides may also be equivalently referred to as resonators or rings). The term "waveguide" shall often be used herein to denote both open and closed structures when structure and/or fabrication of such open and closed waveguides is discussed. In portions of the written description wherein only one or the other type of waveguide (open or closed) is described, it will be made clear in the text which is intended, either implicitly or explicitly. This will typically be the case when functional aspects of devices incorporating the open and/or closed waveguides are discussed.

For purposes of the present written description and/or claims, the term "laterally-confined waveguide" shall typically denote an optical structure elongated along an optical propagation direction (the longitudinal direction) and adapted so as to substantially confine one or more optical modes in directions substantially perpendicular to the optical propagation direction (i.e., transverse directions). The longitudinal dimension/direction shall be associated with the terms "forward", "backward", and so on. Such laterally-confined waveguides are frequently fabricated on, mounted on, or otherwise positioned on a substantially planar portion of a substrate, in which case longitudinal dimensions/directions may also be referred to as "horizontal". Transverse dimensions/directions may be associated with terms "vertical" and "horizontal" relative to a substrate. Vertical dimensions/directions (hence also transverse relative to the waveguide) may be associated with the terms "up", "down", "above", "below", "superior", "inferior", "top", "bottom", and so on. Horizontal dimensions/directions that are also transverse relative to the waveguide may be associated with the terms "left", "right", "lateral", "medial", "side", and so on. Such descriptive terms are typically intended to convey local directions and/or positions relative to a waveguide, a substrate, an alignment structure, and/or the like, and are typically not intended to convey absolute position or direction in space.

An example configuration of an open waveguide 30 on a substrate 32 is shown in FIGS. 3A, 3B, 3C, and 4, while an example configuration of a resonator 50 on substrate 52 is shown in FIGS. 5A, 5B, 5C, and 6. As shown in these Figures, a reference axis system may be defined relative to a waveguide or resonator structure on a substrate for convenience of description only, and shall not be construed as limiting the scope of inventive concepts disclosed and/or claimed herein. The +z-axis shall be defined generally as the direction of propagation of light along a waveguide or resonator structure (indicated by the larger open arrows), and will typically be oriented substantially parallel to a plane defined by the substrate surface on which the waveguide or resonator is positioned. It should be noted that such waveguide or resonator structures may typically support propagation of light in either direction (i.e., +z or −z). The +y-axis shall be oriented substantially perpendicular to and away from the substrate surface plane. The x-axis shall be oriented substantially parallel to the substrate plane and substantially perpendicular to the direction of propagation of light along the waveguide or resonator. The reference axis system is defined locally with respect to the waveguide or resonator, so that in the case of a curved waveguide or resonator, the axis system may vary in its absolute orientation in space at various points along the waveguide or resonator, but its orientation with respect to the waveguide at any given point is substantially as described hereinabove (note FIGS. 5A, 5B, 5C, and 6). The z-direction may be referred to as the longitudinal direction. The x-direction may be referred to as transverse, horizontal, left, right, lateral, and/or medial, while the y-direction may be referred to as transverse, vertical, up, down, superior, and/or inferior.

For purposes of the written description and/or claims, "index" may denote the bulk refractive index of a particular material (also referred to herein as a "material index") or may denote the propagation constant (in the z-direction) of a particular optical mode in a particular optical element (referred to herein as a "modal index"). As referred to herein, the term "low-index" shall denote any materials and/or optical structures having an index less than about 2.5, while "high-index" shall denote any materials and/or structures having an index greater than about 2.5. Within these bounds, "low-index" may preferably refer to silicas, glasses, oxides, polymers, and any other optical materials having indices between about 1.3 and about 1.8, and may include optical fiber, optical waveguides, planar lightwave circuit components, and any other optical components incorporating such materials. Similarly, "high-index" may preferably refer to materials such as semiconductors or any other material having indices of about 3 or greater. The terms "high-index" and "low-index" are to be distinguished from the terms "lower-index" and "higher-index", also employed herein. "Low-index" and "high-index" refer to an absolute numerical value of the index (greater than or less than about 2.5), while "lower-index" and "higher-index" are relative terms indicating which of two materials has the larger index, regardless of the absolute numerical values of the indices.

For purposes of the written description and/or claims, the term "multi-layer reflector stack" or "MLR stack" or "MLR" shall denote a multi-layer structure wherein the layer index varies with each successive layer of the stack (typically alternately increasing and decreasing; often alternating layers of a higher-index material and a lower-index material), yielding an optical structure having wavelength-dependent optical properties. A common example of such a structure is a distributed Bragg reflector (DBR), which may typically comprise alternating quarter-wave-thickness layers of a higher-index material and a lower-index material. Graded-index material(s) may also be employed. The term "multi-layer reflector stack" shall denote any periodic, partially periodic, multi-periodic, quasi-periodic, and/or similar multi-layer varying-index structure.

For purposes of the written description and/or claims, the term "electro-active" shall denote any material that may exhibit electro-optic and/or electro-absorptive properties. The term "non-linear-optical" shall denote any material that may exhibit non-linear optical properties, including both resonant and non-resonant non-linear-optical properties.

For purposes of the written description and/or claims, "transverse-coupling" (also referred to as transverse optical coupling, evanescent coupling, evanescent optical coupling, directional coupling, directional optical coupling) shall generally denote those situations in which two optical elements, each capable of supporting a propagating and/or resonant optical mode and at least one having an evanescent portion of its optical mode extending beyond the respective optical element, are optically coupled by at least partial transverse spatial overlap of the evanescent portion of one optical mode with at least a portion of the other optical mode. The amount, strength, level, or degree of optical power transfer from one optical element to the other through such transverse optical coupling depends on the spatial extent of the overlap (both transverse and longitudinal), the spectral properties of the respective optical modes, and the relative spatial phase matching of the respective optical modes (also referred to as modal index matching). To transfer optical power most efficiently, the respective modal indices of the optical modes (equivalently, the respective modal propagation constants), each in its respective optical element, must be substantially equal. Mismatch between these modal indices decreases the amount of optical power transferred by transverse coupling between the optical elements, since the coupled modes get further out of phase with each other as each propagates within its respective optical element and the direction of the optical power transfer eventually reverses itself. The propagation distance over which the modes interact (i.e., the effective interaction length) and the degree of modal-index matching (or mismatching) together influence the overall flow of optical power between the coupled modes. Optical power transfer between the coupled modes oscillates with a characteristic amplitude and spatial period as the modes propagate, each in its respective optical element.

Neglecting the effects of optical loss in the optical elements, an ideal system consisting of two coupled modes can be characterized by the following coupled system of equations:

$$\frac{\partial E_1}{\partial z} = i\beta_1 E_1 + i\kappa E_2$$

$$\frac{\partial E_2}{\partial z} = i\beta_2 E_2 + i\kappa^* E_1$$

where the following definitions apply:
$E_{1,2}$ amplitudes of the coupled fields;
$\beta_{1,2}$ propagation constants of the coupled fields,
$\tau$ coupling amplitude resulting from spatial overlap of the fields,
z propagation distance coordinate.

For the purpose of illustration, it is assumed that the coupling amplitude $\tau$ is constant over an interaction distance L. Then, an incident field of amplitude $E_1$ that is spatially confined to the first optical element before interaction will couple to the other wave guide with a resultant field amplitude $E_2(L)$ at z=L (where we define z=0 as the start of the coupling region) given by the following expression, $$\frac{|E_2(L)|^2}{|E_1(0)|^2} = \frac{|\kappa|^2}{q^2}\sin^2(qL)$$

$$q^2 = |\kappa|^2 + \frac{1}{4}\Delta\beta^2.$$

Consider the modal-index mismatch term ($\alpha\beta=\beta_2-\beta_1$) and the interaction length in this expression. As is well known, a condition of modal-index mismatch between the two spatial modes causes an oscillatory power transfer to occur between the waveguides as the interaction length is varied. The spatial period of this oscillation, a so-called "beat length", can be defined as the distance over which power cycles back and forth between the guides. Greater amounts of modal-index mismatch will reduce the beat length. Also note that the absolute magnitude of power transfer will diminish with increasing modal-index mismatch. Finally, it is apparent that increased amounts of interaction length and/or increased modal-index mismatch will introduce an increased spectral selectivity to the optical power transfer.

By controlling the modal-index mismatch and/or transverse spatial overlap between optical modes, these characteristics may be exploited for controlling optical power transfer between optical elements. For example, by altering the modal-index mismatch, a device may be switched from a first condition, in which a certain fraction of optical power is transferred from a first optical mode in a first optical element to a second optical mode in a second optical element (modal-index mismatch set so that the effective interaction length is about half of the characteristic spatial period described above), to a second condition in which little or no optical power is transferred (modal-index mismatch set so that the effective interaction length is about equal to the characteristic spatial period). Further discussion of optical coupling may be found in *Fundamentals of Photonics* by B. E. A. Saleh and M. C. Teich (Wiley, New York, 1991), hereby incorporated by reference in its entirety as if fully set forth herein. Particular attention is called to Chapters 7 and 18.

It should be noted that optical waveguides and resonators as described herein, optical modulators, interferometers, couplers, routers, add-drop filters, switches, and other devices incorporating such waveguides and/or resonators, their fabrication, and their use according to the present invention are intended primarily for handling optical modes having wavelengths between about 0.8 µm and about 1.0 µm (the wavelength range typically utilized for so-called short-haul fiber-optic telecommunications) and optical modes having wavelengths between about 1.2 µm and about 1.7 µm (the wavelength range typically utilized for so-called long-haul fiber-optic telecommunications). However, these devices, methods of fabrication, and methods of use may be adapted for use at any desired wavelength while remaining within the scope of inventive concepts disclosed and/or claimed herein.

Figure 7:
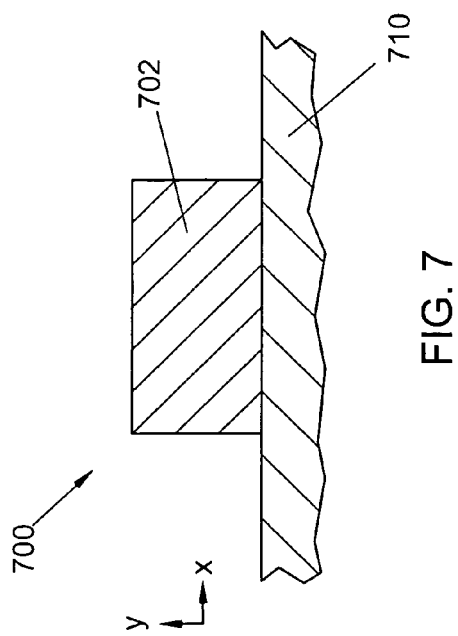
FIG. 7 is a transverse-sectional view of a single-DBR waveguide of the present invention positioned on a substrate.
Figure 8:
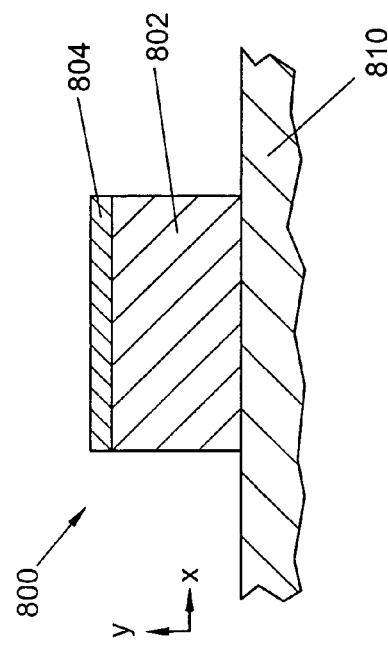
FIG. 8 is a transverse-sectional view of a single-DBR waveguide of the present invention, having a core layer thereon and positioned on a substrate.
Figure 11:
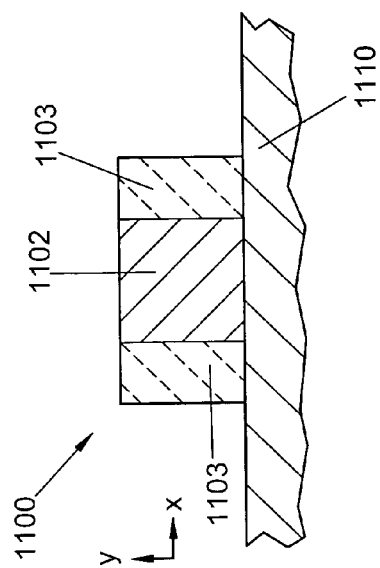
FIG. 11 is a transverse-sectional view of a single-DBR waveguide of the present invention, having lateral low-index portions thereon and positioned on a substrate.
Figure 12:
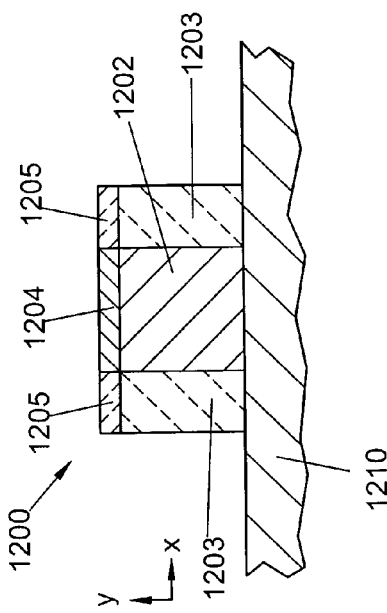
FIG. 12 is a transverse-sectional view of a single-DBR waveguide of the present invention, having a core layer and lateral low-index portions thereon and positioned on a substrate.

Optical waveguides and/or resonators according to the present invention may typically fall into one of two general categories, or may fall into an intermediate category. In the first category, illustrated schematically in transverse-section in FIG. 7, the waveguide structure 700 comprises a single multi-layer reflector 702 (equivalently, a MLR or MLR stack), shown in the form of an elongated ridge-like structure protruding from a substrate 710. This category may also include a waveguide structure 800 as shown schematically in transverse section in FIG. 8, comprising a MLR stack 802 and a core or waveguide layer 804 on substrate 810. Such a single-MLR waveguide may support propagation of an optical mode as a surface-guided optical mode (equivalently, a SGOM, SGO mode, SG mode, surface-guided mode, optical SGM, SGM, or SG optical mode; such modes have been referred to in the literature as surface-guided Bloch modes (SGBM), anti-resonant reflecting optical waveguide modes (ARROW), and so forth). Such an optical mode is confined and guided from below by the reflectivity of the MLR stack 702 (802), and from above by the index contrast between the MLR stack 702 (core layer 804) and a surrounding lower-index medium (air; vacuum; a lower-index glass, polymer, semi-conductor, electro-optic, or other overlayer). Lateral confinement of the SGOM may arise from a similar index contrast between the sides of an elongated, ridge-like MLR stack 702 (MLR stack 802 and core layer 804) and a surrounding lower-index medium. Alternatively, some or all of the MLR layers may be provided with uni-lateral and/or bilateral lower-index portions for laterally confining the SGOM within the MLR stack, as shown schematically in transverse-section in FIGS. 11 and 12. FIG. 11 shows a waveguide 1100 on substrate 1110, waveguide 1100 comprising a single MLR stack 1102 and lateral lower-index portions 1103. FIG. 12 shows a waveguide 1200 on substrate 1210, waveguide 1200 comprising a single MLR stack 1202, lateral lower-index portions thereof 1203, core layer 1204, and lateral lower-index portions thereof 1205. In FIG. 12, one or the other or both of MLR stack 1202 and core layer 1204 may be provided with respective lower-index lateral portions 1203 and 1205. Lateral confinement may alternatively be provided by lateral metallic coatings, lateral dielectric coatings, lateral multi-layer reflectors or distributed Bragg reflectors, and/or internal reflection at a waveguide lateral surface. In any of FIGS. 7, 8, 11, or 12, evanescent portions of the SG optical mode may extend upward from the top of the MLR stack and/or laterally from one or both sides of the MLR stack, thereby enabling transverse-coupling between the SG optical mode and other optical modes sufficiently near the top and/or sides of the single-MLR stack.

Figure 10:
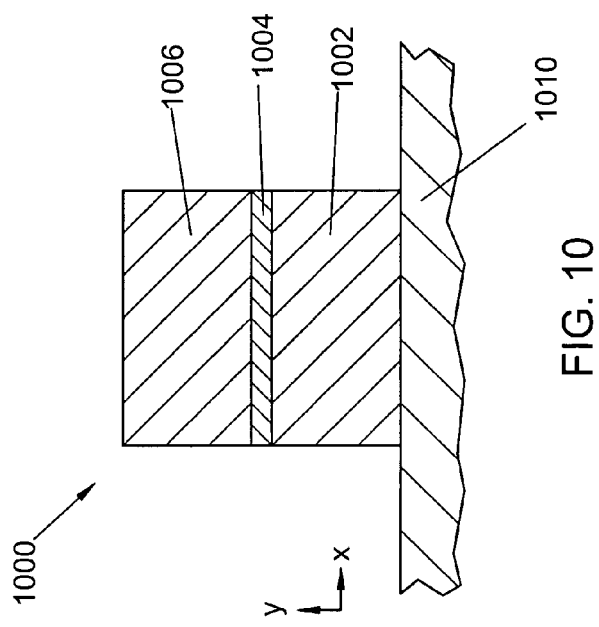
FIG. 10 is a transverse-sectional view of a dual-DBR waveguide of the present invention positioned on a substrate.
Figure 14:
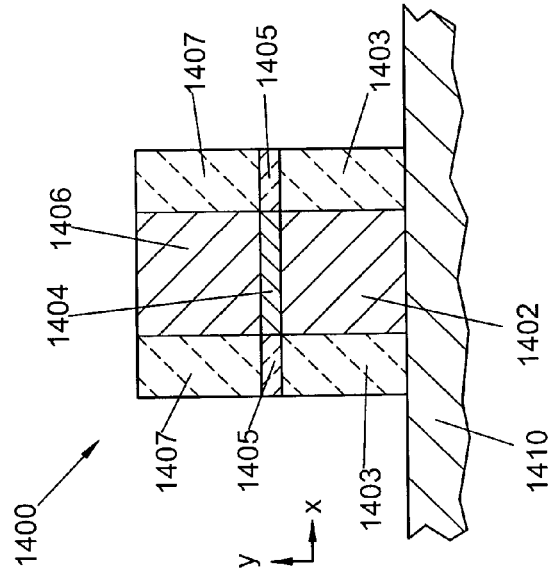
FIG. 14 is a transverse-sectional view of a dual-DBR waveguide of the present invention, having lateral low-index portions thereon and positioned on a substrate.

In the second category of waveguides and/or resonators, illustrated schematically in transverse-section in FIG. 10, waveguide 1000 comprises a pair of MLR stacks 1002 and 1006 are employed to confine and guide a propagating optical mode, one from above and one from below (referred to hereinafter as a dual-MLR stack). The two MLR stacks (which may or may not be substantially similar), as well as a waveguide layer 1004 (alternatively, a "core" layer) provided therebetween (along which the propagating optical mode is substantially confined), are shown in the form of an elongated ridge-like structure protruding from a substrate 1010. Lateral confinement of the optical mode may arise in a manner similar to that described in the preceding paragraph, either by index contrast between the waveguide structure 1000 and a surrounding lower-index medium, or by lateral (uni-lateral and/or bilateral) lower-index portions provided in some or all of the layers of the MLR stacks and/or waveguide layer, which substantially confine the optical mode within the dual-MLR waveguide structure, as shown schematically in transverse-section in FIG. 14. FIG. 14 shows a waveguide 1400 on substrate 1410, waveguide 1400 comprising bottom MLR stack 1402 with lower-index portions 1403, core layer 1404 with lower-index portions 1405, and top MLR stack 1406 with lower-index portions 1407. In FIG. 14, one, any two, or all three of MLR stacks 1402 and 1406 and core layer 1404 may be provided with respective lower-index lateral portions 1403, 1407, and 1405. Lateral confinement may alternatively be provided by lateral metallic coatings, lateral dielectric coatings, lateral multi-layer reflectors or distributed Bragg reflectors, and/or internal reflection at a waveguide lateral surface. In either FIG. 10 or FIG. 14, evanescent portions of the optical mode may extend laterally from one or both sides of the waveguide layer, thereby enabling transverse-coupling between the optical mode and other optical modes propagating sufficiently near a side of the dual-MLR stack waveguide structure.

Figure 9:
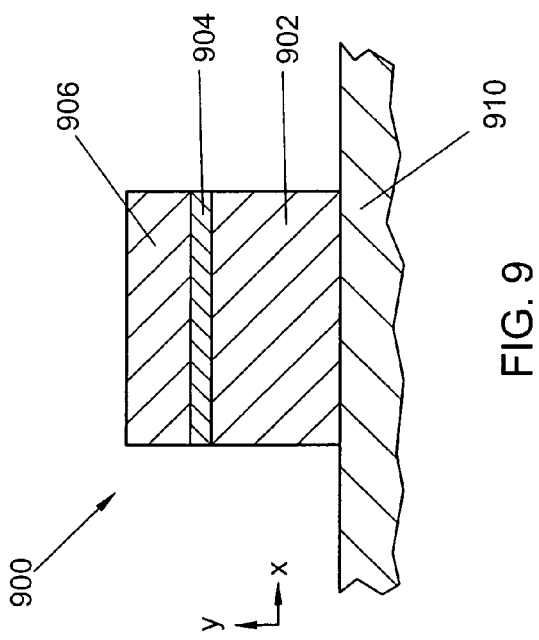
FIG. 9 is a transverse-sectional view of an asymmetric-dual-DBR waveguide of the present invention positioned on a substrate.
Figure 13:
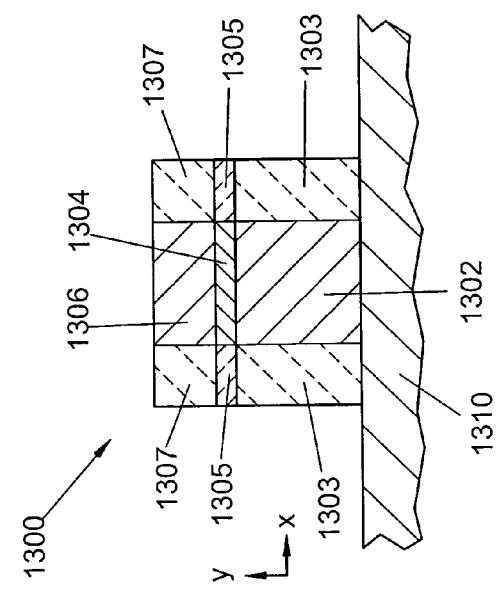
FIG. 13 is a transverse-sectional view of an asymmetric-dual-DBR waveguide of the present invention, having lateral low-index portions thereon and positioned on a substrate.

Intermediate between these two categories are structures comprising a lower MLR stack, a waveguide or core layer, and a partial upper MLR stack. Such structures shall be referred to herein as partial dual-MLR stack waveguide structures, and are shown schematically in transverse-section in FIGS. 9 and 13. In FIG. 9, waveguide 900 (on substrate 910) comprises a lower MLR 902, and core layer 904, and a partial upper MLR 906. In FIG. 13, waveguide 1300 (on substrate 1310) comprises a lower MLR 1302 with lateral lower-index portions thereof 1303, core layer 1304 with lateral lower-index portions thereof 1305, and partial upper MLR 1306 with lateral lower-index portions thereof

1307. In FIG. 13, any one, any two, or all three of MLR stacks 1302 and 1306 and core layer 1304 may be provided with respective lower-index lateral portions 1303, 1307, and 1305. Such structures provide a range of behaviors intermediate between the single-MLR structures (wherein the supported optical mode has a substantially fully accessible evanescent portion extending upward from the top of the waveguide) and the dual-MLR structures (wherein substantially no evanescent portion of the supported optical mode extends upward from the top of the waveguide). Providing a partial upper MLR stack allows the extent of the evanescent portion of the supported optical mode extending upward from the top of the waveguide to be tailored to fit a particular application by varying the number and characteristics of the layers comprising the partial upper MLR stack.

Figure 62A:
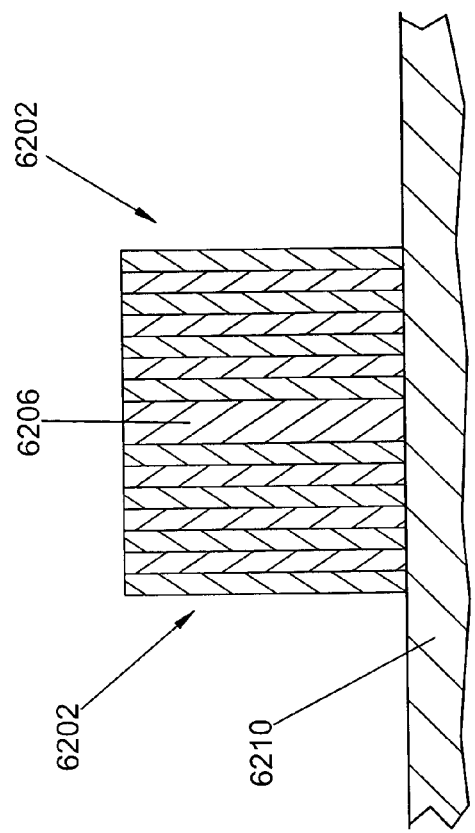
FIGS. 62A and 62B show examples of multi-layer and/or periodic structures employed for lateral confinement of a guided optical mode in a waveguide.
Figure 62B:
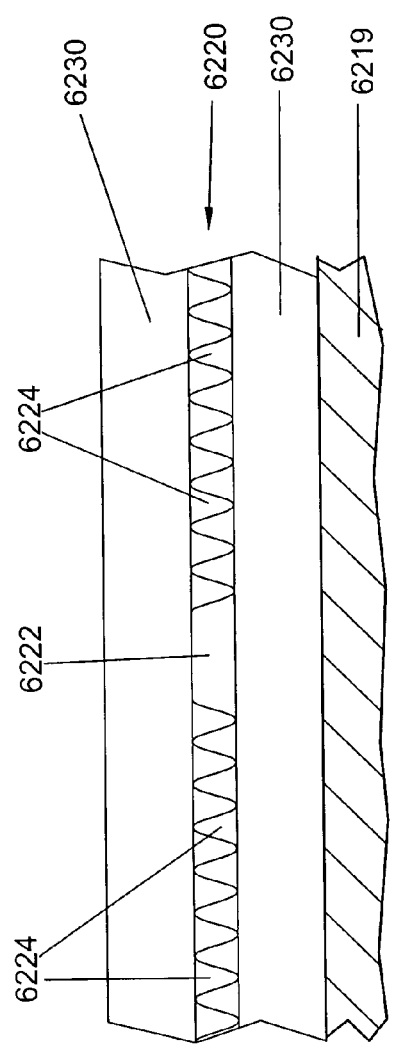

The exemplary transverse waveguide structures illustrated in FIGS. 7–14 are shown having layers of the multi-layer reflector stacks substantially parallel to the substrate and providing confinement of a guided optical mode along a vertical direction. It is also possible and may be desirable to construct, fabricate, assemble, or otherwise provide waveguides having layers of one or more multi-layer reflector stacks substantially perpendicular to the substrate, thereby providing confinement of a guided optical mode along a horizontal direction. An example of such a structure is shown in transverse section in FIG. 62A, including MLR stacks 6202 surrounding a core 6206, all positioned on substrate 6210. It may be desirable to construct, fabricate, assemble, or otherwise provide waveguides having multi-layer stacks with layers in both substantially parallel and substantially perpendicular orientations, so as to provide confinement of a guided optical mode along both horizontal and vertical directions. Alternatively, it may be desirable to provide one or more layers of a multi-layer waveguide structure with a grating. Such a grating may serve to provide lateral confinement for a support optical mode, and may also cause the waveguide to exhibit desirable dispersive properties. An example of such a waveguide is shown in transverse section in FIG. 62B positioned on a substrate 6219. Core layer 6220 is provided with a central portion 6222 (along which a guided mode may propagate) and lateral grating portions 6224. Upper and lower clad layers 6230 are provided below and, if desired, above core layer 6220, and may comprise a single layer of lower-index material or a MLR stack. Upper and lower layers 6230 serve to confine a guided optical mode vertically, while grating portions 6224 of core layer 6220 serve to confine the guided optical mode horizontally. Grating portions 6224 may be provided using any suitable spatially-selective material processing techniques.

Part of the utility of MLR-based waveguide structures in waveguides and/or resonators incorporated into optical devices arises from their dispersive optical properties, which enable dispersion-engineering of the devices. A MLR waveguide exhibits a substantially flat dispersion relation for guided optical modes over mid-IR, near-IR, and visible wavelengths, so that a narrow range of wavelengths spans a wide range of propagation constants (equivalently, a wide range of modal indices). This may be exploited in a variety of ways. A waveguide incorporating a MLR structure may be used to modal-index-match to another optical component having a substantially different refractive index. Such modal-index-matching may be achieved by appropriate and accurate design and fabrication of the multi-layer reflector (so-called passive modal-index-matching). Alternatively, an electrical or optical signal may be applied to a multi-layer reflector incorporating one or more electro-active or non-linear-optical layers, respectively, to achieve modal-index-matching over a substantial range of modal-indices (so-called active modal-index-matching).

Waveguide and/or resonator structures as described in the preceding paragraphs may find widely applicable utility in the fields of fiber-optic telecommunications and sensors and integrated optical devices. Optical power transfer between various optical devices in a fiber-optic telecommunications system frequently rely on optical coupling between optical modes in the devices. Transverse-coupling may be employed, thereby eliminating spatial-mode-matching requirements imposed by end-coupling. Optical signal power transfer by transverse-coupling depends in part on the relative modal indices of the transverse-coupled optical modes. Active control of the modal index of one or both of the transverse-coupled optical modes therefore enables active control of the degree to which optical signal power is transferred from one device to the other. If one of the devices to be coupled were to comprise an active waveguide or resonator according to the present invention, optical power transfer between the devices could then be controlled through active control of the modal index as described in the preceding paragraph, typically using control signals of substantially smaller magnitude than required by previously available devices. Optical signal power transfer from a fiber-optic or other low-index optical waveguide into an integrated on-chip optical device (typically high-index) may be greatly improved and/or actively controlled by employing waveguide and/or resonator structures according to the present invention. Optical losses within such an integrated on-chip device may be reduced. Waveguides and resonators according to the present invention may be substantially modal-index-matched to optical fiber or other low-index waveguides, may possess low optical loss and/or high optical Q-factors, and may be controlled by relatively small control signals. Waveguides according to the present invention may be used for phase modulation in interferometric optical devices (such as a Mach-Zender interferometer modulator, for example) using smaller control signals than required by previously available devices.

A suitable multi-layer reflector (MLR) according to the present invention preferably includes a periodic, partially periodic, multi-periodic, quasi-periodic, and/or similar multi-layer dielectric stack. A MLR stack preferably includes layers of varying index (typically alternately increasing and decreasing index; often alternating layers of a higher-index material and a lower-index material) and exhibits wavelength-dependent optical properties. Graded-index materials may also be employed. A distributed Bragg reflector (DBR) may serve as a preferred MLR according to the present invention and is shown and described in exemplary embodiments disclosed herein. However, other types of multi-layer-reflector structures may be employed while remaining within the scope of inventive concepts disclosed and/or claimed herein.

A distributed Bragg reflector (DBR) preferably includes alternating quarter-wave ($\lambda/4$) layers of dielectric materials having a sufficiently large material refractive index differential (typically expressed as $\Delta n/n_{avg}$), typically greater than about 8%, preferably greater than about 15%, most preferably greater than about 60%. Determination of the quarter-wave thickness depends on the design wavelength and the material index of the layer at the design wavelength, and typically a range of layer thicknesses will function suitably at a given design wavelength. Fabrication techniques for the materials used must enable sufficiently precise growth or deposition of substantially uniform layers of material, typically with nanometer-scale precision. Such fabrication techniques often require use of materials (often semi-conductors, particularly III–V semiconductors and/or alloys, quantum wells, multi-quantum wells, super-lattices, and/or oxidation products thereof; other suitable materials may be equivalently employed) with crystalline lattice parameters sufficiently similar to allow deposition of layers of the different materials on each other without substantial generation of strain and/or defects in the materials. Growth or deposition may also involve amorphous materials. Preferred techniques include as examples crystalline growth or re-growth, amorphous growth or re-growth, vapor deposition, chemical vapor deposition, epitaxial deposition, beam deposition, beam-assisted and/or beam-enhanced deposition (beams may include optical, electron, ion, plasma, neutral, radical, and so forth), sputter deposition, plasma and/or ion beam deposition; other suitable techniques may be equivalently employed. The use of III–V semi-conductors and/or alloys thereof for implementation of the present invention enables: use of technologically mature deposition, material processing, and other fabrication techniques; attainment of desirable optical properties for waveguide/resonator devices in the wavelength region(s) of interest (including a controllable refractive index via electro-active and/or non-linear-optical properties); integration of the optical device(s) onto a substrate along with control elements therefor and electrical and/or optical connections thereto; integration of the optical device(s) onto a substrate along with III–V-based light sources and/or detectors. Oxidation of III–V semiconductors and/or alloys also yields substantially lower-index oxides of high optical quality, enabling fabrication of high-index-contrast MLR stacks and high-index-contrast lateral confinement of optical modes therein. All of these considerations limit, however, the particular combinations of materials and fabrication techniques that may be employed for a device suitable for a given application, which will be described in detail hereinbelow.

A general description of fabrication of MLR waveguides and resonators and general considerations dictating choices for materials follows. A vertical layer sequence may typically be constructed first (i.e. "vertical fabrication") on one or more suitable substrates. The vertical fabrication may proceed as a single sequence of layer depositions on a single substrate to achieve the desired multi-layer structure (referred to hereinafter as "single-substrate vertical fabrication"). Alternatively, the vertical fabrication may proceed as multiple sequences of layer depositions on multiple substrates, with wafer-bonding and substrate etching techniques employed to form the single desired multi-layer structure on a single substrate (referred to hereinafter as "multi-substrate vertical fabrication" or "wafer-bonding vertical fabrication"). It should be noted that "wafer-bonding" shall generally encompass any technique suitable for bringing two substantially planar materials into substantially intimate contact substantially free of voids therebetween and establishing a bond therebetween. In addition to bringing the two surfaces into contact, such techniques may further involve elevated temperature and or pressure for periods of time in order to bond the materials together. Single-substrate fabrication may be employed when all layer materials to be used are sufficiently compatible in their lattice properties to form a sufficiently low-strain and defect-free multi-layer structure by layer deposition. When insufficiently compatible materials are used, multi-substrate fabrication may be employed to produce a sufficiently low-strain and defect-free multi-layer structures, which are subsequently wafer-bonded or otherwise assembled together, perhaps using polymer-based or other adhesive. Multi-substrate vertical fabrication therefore permits a much wider range of material combinations to be employed, at the expense of more complex fabrication procedures. The wider range of material combinations may enable, for example, use of materials optimized for forming MLR stacks of high optical quality in conjunction with electro-active and/or non-linear optical materials optimized for the design wavelength but that may not be lattice-compatible with the MLR materials. The ability to use a wider range of materials enables tailoring of the electro-optic properties of the waveguide and the dispersive properties of the MLR stack(s) for specific performance characteristics of an optical device employing the waveguide. It should be noted that multi-substrate fabrication may be desirable and employed with materials that might also be suitable for single-substrate fabrication.

Vertical fabrication is preferably followed by spatially selective processing of portions of some or all layers of the multi-layer structure (i.e., "horizontal fabrication"), producing a waveguide or resonator of the desired size, shape, and topology. Horizontal fabrication may include removal of multi-layer material to leave protruding ridge, protruding mesa, stepped, and/or recessed structure(s); such structures may be shallow structures involving only the few top layers of the multi-layer structure, or may be deep structures involving most or all of the layers of the multi-layer structure. Horizontal fabrication may include deposition of lateral coatings on such a protruding, stepped, or recessed structures, including but not limited to lateral metallic coatings (optically reflective and/or electrical contact layers), lateral dielectric coatings, lateral multi-layer reflectors or distributed Bragg reflectors, or other lateral coating. Horizontal fabrication may also include chemical conversion and/or modification of some or all layers of the MLR or DBR, either after forming the protruding, stepped, or recessed structure(s), and/or for forming a buried structure. The conversion/modification may involve all, some, or none of each individual layer of the multi-layer structure, and may proceed from one or both sides of a protruding and/or recessed structure. Horizontal fabrication may include spatially-selective modification of lateral portions of the waveguide structure for lateral confinement of a guided optical mode. This may include providing lateral cladding or MLR layers by spatially-selective chemical, physical, or optical modification of the multi-layer structure by material deposition or re-deposition, material growth or re-growth, photolithography, beam lithography, doping, implantation, densification, etching, or other suitable techniques including other material growth/deposition/processing techniques recited herein.

In addition to MLR layers, waveguide core layers, electro-active layers, and/or non-linear optical layers, additional layers may be included as physical spacers and/or insulators (i.e., buffer layers), as protective overlayers (i.e., cladding layers), as conductive electrical contacts (i.e., contact layers; metallic and/or semi-conductor), and/or layers for enabling control of the fabrication processes (i.e., etch-stop layers). A buffer layer may function as an electrical buffer (moving a portion of the waveguide structure beyond the localized influence of a contact layer, for example) and/or as an optical buffer (maintaining a portion of a guided optical mode away from layers having undesirable optical properties, adjust the thickness of a particular layer, or other purposes). Individual layers may fulfill more than one of these functions. For many of the structures disclosed herein, the waveguide layer structure may preferably include top and bottom electrical contact layers with one or more electro-active layers therebetween. Application of a voltage across these contact layers produces an electric field substantially perpendicular to the layers of the waveguide (substantially vertical). This electric field causes variation of the optical properties any electro-active layers present, and the dispersive properties of the MLR structure(s) of the waveguide result in a substantial change in the modal index of a guided optical mode (as described hereinabove). Other configurations may be employed for the application of an electric field to the electro-optic layer(s), however, and substantially horizontal electric fields (transverse and/or longitudinal) may be employed, for example, without departing from inventive concepts disclosed and/or claimed herein.

For a single-MLR device, a wafer may be grown including a suitable substrate, a bottom buffer/etch-stop layer (if desired or needed), a doped bottom electrical contact layer (often delta-doped in the case of III–V semiconductors and alloys), another buffer/etch-stop layer (if desired or needed), alternating $\lambda/4$ layers of a pair of materials comprising a DBR stack (either having sufficient index contrast to form a DBR, or which may be converted during subsequent processing to materials possessing such an index contrast; typically between 3 and 10 or more pairs of layers may be employed), a top buffer/etch-stop layer (if desired or needed), a top core layer (between $\lambda/4$ and $\lambda/2$), and a top cladding/etch-stop layer (if desired or needed). Electro-active and/or nonlinear optical properties for active control of the waveguide/resonator may be incorporated into this structure in a variety of ways, if desired or needed.

Figure 15:
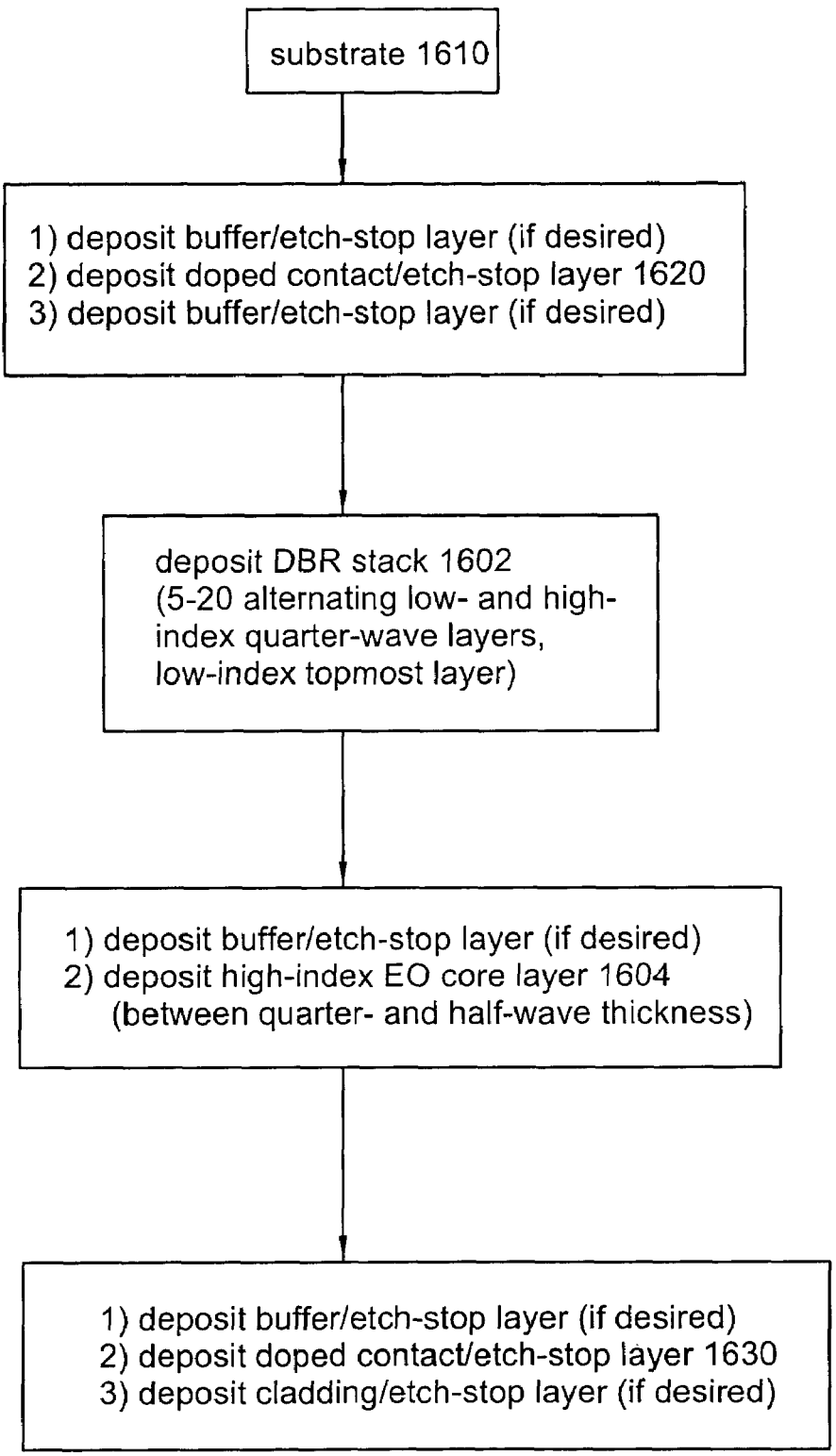
FIG. 15 is a flow diagram for a single-substrate vertical fabrication procedure for a single-DBR waveguide of the present invention.
Figure 16:
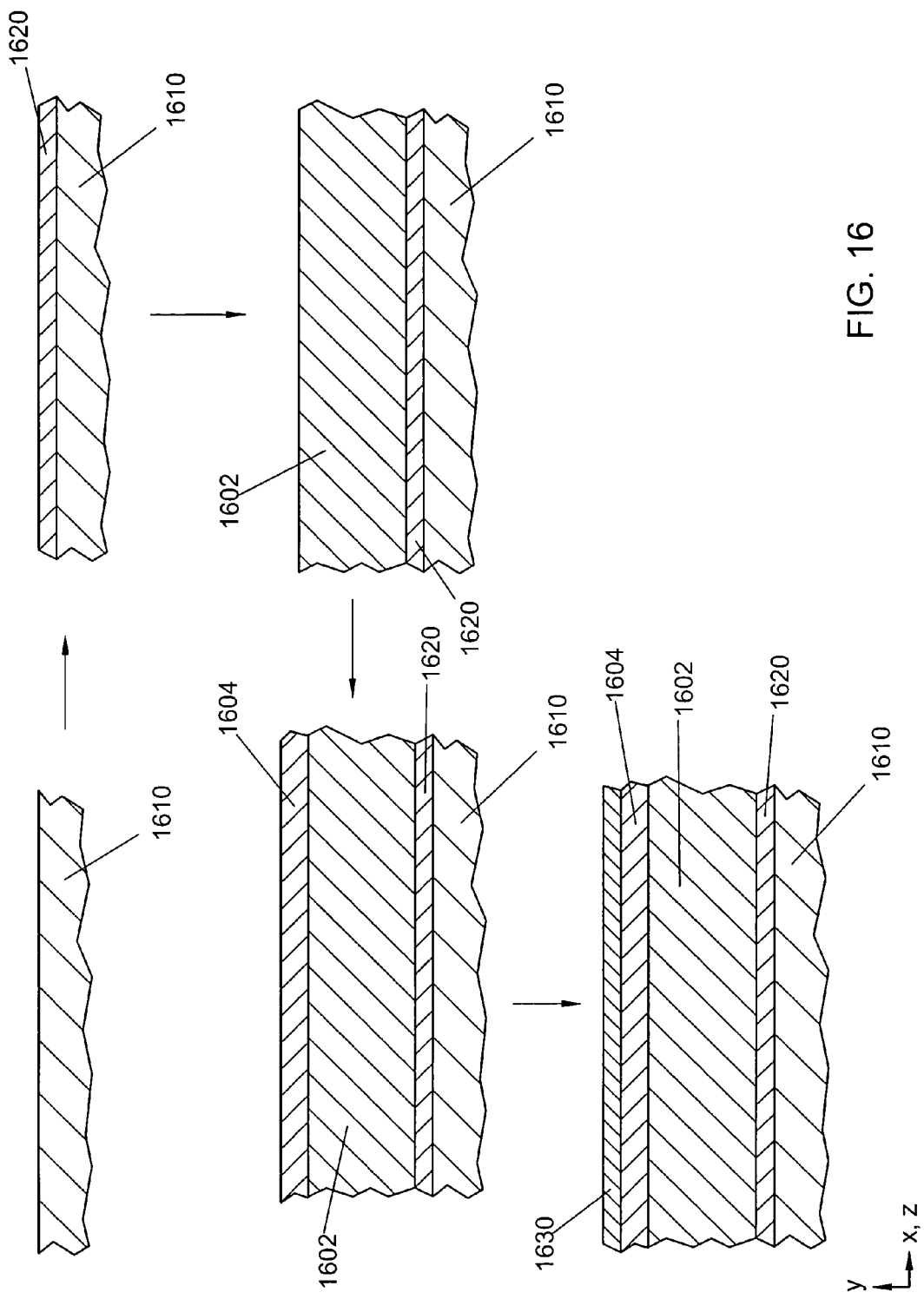
FIG. 16 is a process diagram for a single-substrate vertical fabrication procedure for a single-DBR waveguide of the present invention.

In a group of single-substrate fabrication processes for fabricating single-MLR devices, one or more of the $\lambda/4$ layers, buffer/etch-stop layers (if present), core layer, and/or cladding/etch-stop layer may comprise an electro-active or non-linear-optical material. The flowchart of FIG. 15 and process diagram of FIG. 16 illustrate a single-substrate fabrication procedure wherein the core layer 1604 comprises an electro-active or non-linear-optical material. First, a doped electrical contact/etch-stop layer 1620 (meaning that the contact layer may also function as an etch-stop layer, if desired) is deposited on substrate 1610 (if desired or needed). Buffer/etch-stop layers (meaning these layers may function as buffers and/or etch-stop layers) may optionally be deposited before and/or after deposition of contact layer 1620. In this and all succeeding diagrams, optional buffer/etch-stop layers and cladding/etch-stop layers are omitted for clarity. A DBR stack 1602 of about 5 to about 20 alternating lower- and higher-index quarter-wave layers is then deposited, with the topmost layer comprising a lower-index layer. "Lower-index" and "higher-index" here describe the material indices of the layers as they will exist after all fabrication and processing are complete, as does the description "quarter-wave". For example, the proper quarter-wave thickness for a particular layer is not necessarily determined by the material index of the material deposited, but the material which eventually comprises the layer. In some cases this will be the deposited material, but in other cases may be a new material obtained from the deposited material through a chemical conversion process during subsequent processing. Similarly, whether a given layer is a lower-index or higher-index layer depends on the index of the layer material after all fabrication and processing are complete. A higher-index deposited material may, for example, be converted to a lower-index layer material during subsequent processing. A waveguide core layer 1604 may then be deposited (after an optional buffer/etch-stop layer, if desired) comprising a higher-index electro-active or non-linear-optical material and having a layer thickness between about quarter-wave and about half-wave. The distinction between a quarter-wave core layer 1604 and the quarter-wave layers of DBR 1602 is a somewhat artificial one. A top doped electrical contact/etch-stop layer 1630 may then be deposited (if desired or needed; preceded by an optional buffer/etch-stop layer if desired, and followed by an optional cladding/etch-stop layer if desired), completing the vertical fabrication of this particular structure.

In the layer deposition scheme described hereinabove and in other deposition schemes described hereinbelow, it should be noted that electrical contact layers may only be required if electro-active layer(s) are included in the multi-layer waveguide structure (typically for active modal-index control). Such electrical contact layers and/or electro-active layers may be omitted from waveguides incorporating one or more non-linear-optic layers for active modal-index control or from waveguides employing passive modal-index matching. While top and bottom electrical contact layers may preferably be located near the top and bottom, respectively, of the multi-layer structure, this need not always be the case. Top and bottom electrical contact layers may be placed in any suitable position within the multi-layer structure with the electro-active layer(s) therebetween. Electrical contact layers may preferably be oriented substantially parallel to the other layers in the multi-layer structure, so that an electric field applied through the contact layers would be substantially perpendicular to the layers. Alternatively, electrical contacts may be applied laterally so that a control electric field would be applied substantially parallel to the layers of the multi-layer structure. It should also be noted that while the layer deposition schemes recited herein describe deposition of DBR stacks, all of these deposition schemes may be generalized to include any MLR structure, including periodic, partially periodic, multi-periodic, quasi-periodic, or other varying-index MLR structure, while remaining within the scope of inventive concepts disclosed and/or claimed herein.

Figure 17:
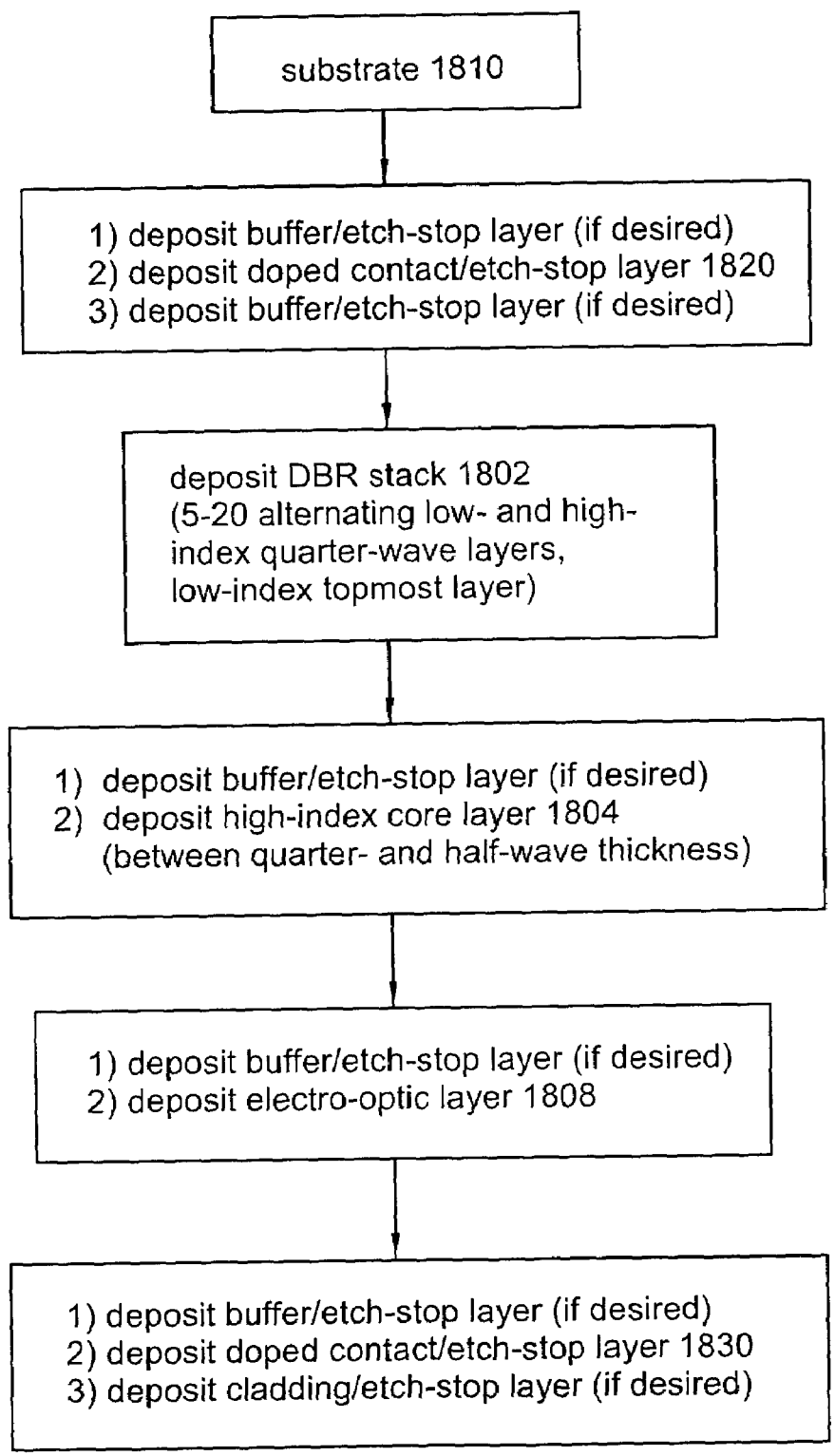
FIG. 17 is a flow diagram for a single-substrate vertical fabrication procedure for a single-DBR waveguide of the present invention.
Figure 18:
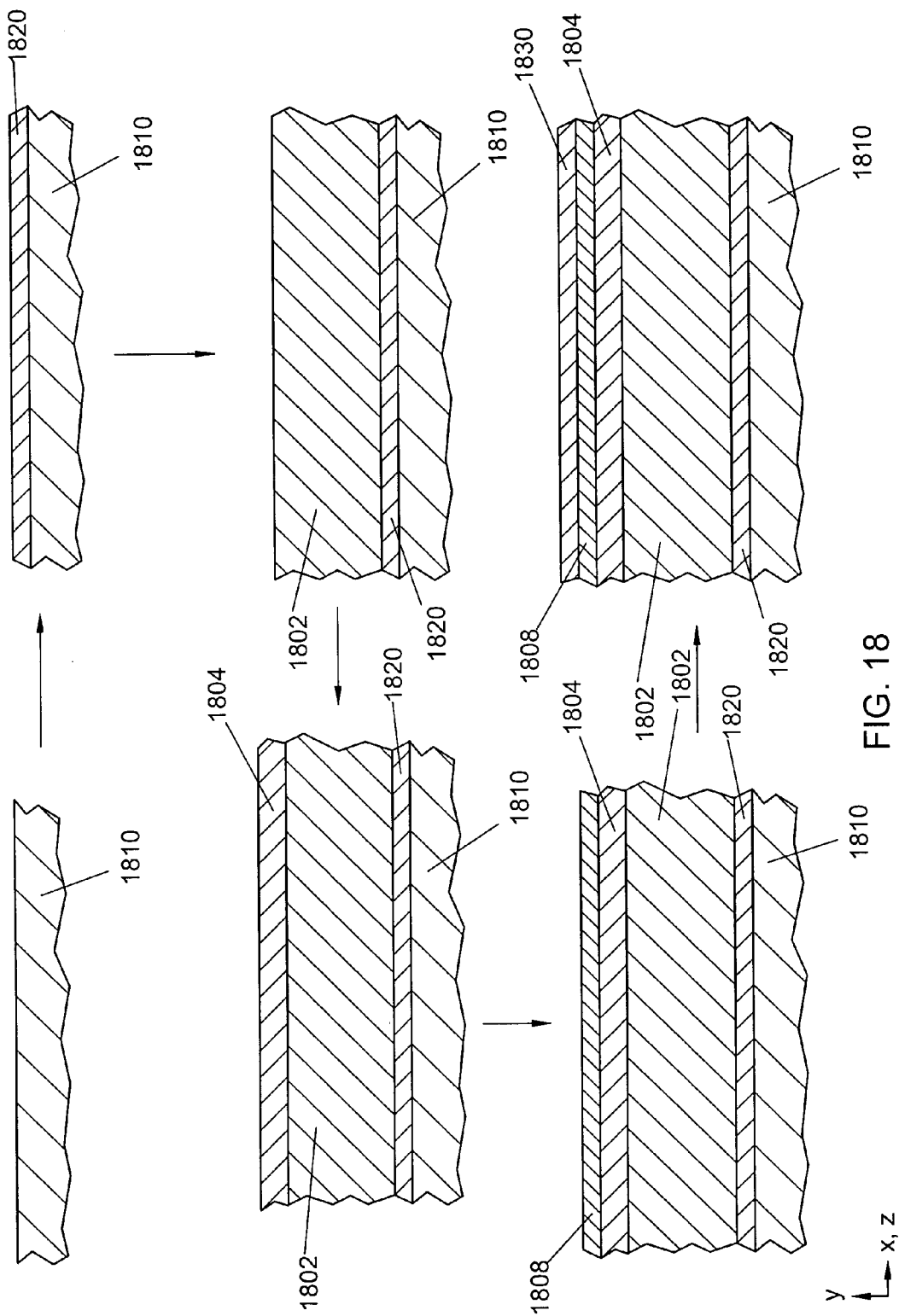
FIG. 18 is a process diagram for a single-substrate vertical fabrication procedure for a single-DBR waveguide of the present invention.

The flowchart of FIG. 17 and process diagram of FIG. 18 illustrate a single-substrate vertical fabrication procedure wherein a layer 1808 of electro-active or non-linear-optical material is deposited separately from core layer 1804. First, a doped electrical contact/etch-stop layer 1820 is deposited on substrate 1810. Buffer/etch-stop layers may optionally be deposited before and/or after deposition of contact layer 1820, and are not shown. A DBR stack 1802 of about 5 to about 20 alternating lower- and higher-index quarter-wave layers is then deposited, with the topmost layer comprising a lower-index layer. A waveguide core layer 1804 may then be deposited (after an optional buffer/etch-stop layer, if desired) comprising a higher-index material and having a layer thickness between about quarter-wave and about half-wave. Electro-active or non-linear-optical material layer 1808 may then be deposited (preceded by an optional buffer/etch-stop layer if desired). A top doped electrical contact/etch-stop layer 1830 may then be deposited (preceded by an optional buffer/etch-stop layer if desired, and followed by an optional cladding/etch-stop layer if desired), completing the vertical fabrication of this particular structure. Alternatively, the order of deposition of the core layer and electro-active or non-linear-optical layer may be reversed.

Figure 19:
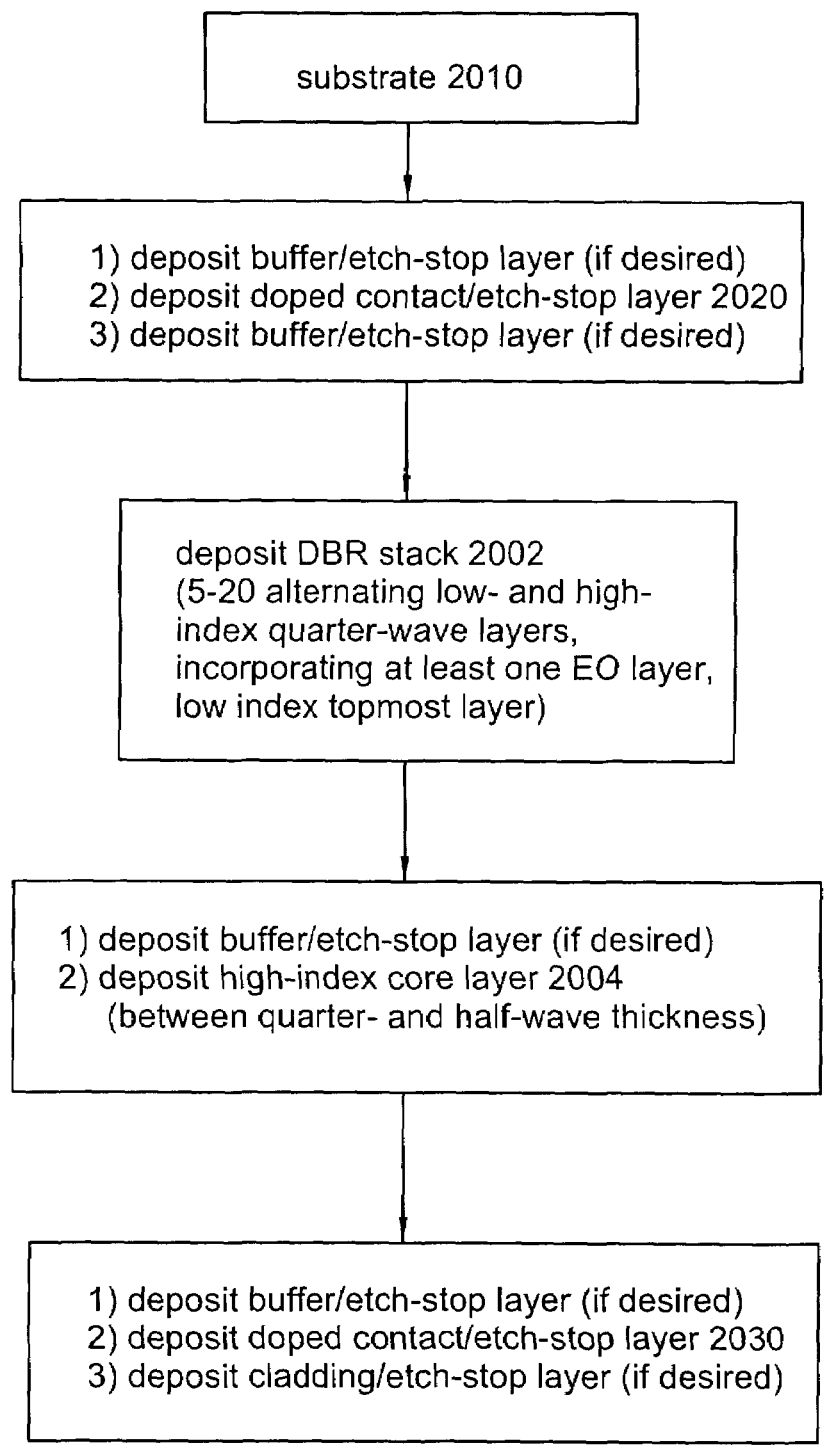
FIG. 19 is a flow diagram for a single-substrate vertical fabrication procedure for a single-DBR waveguide of the present invention.
Figure 20:
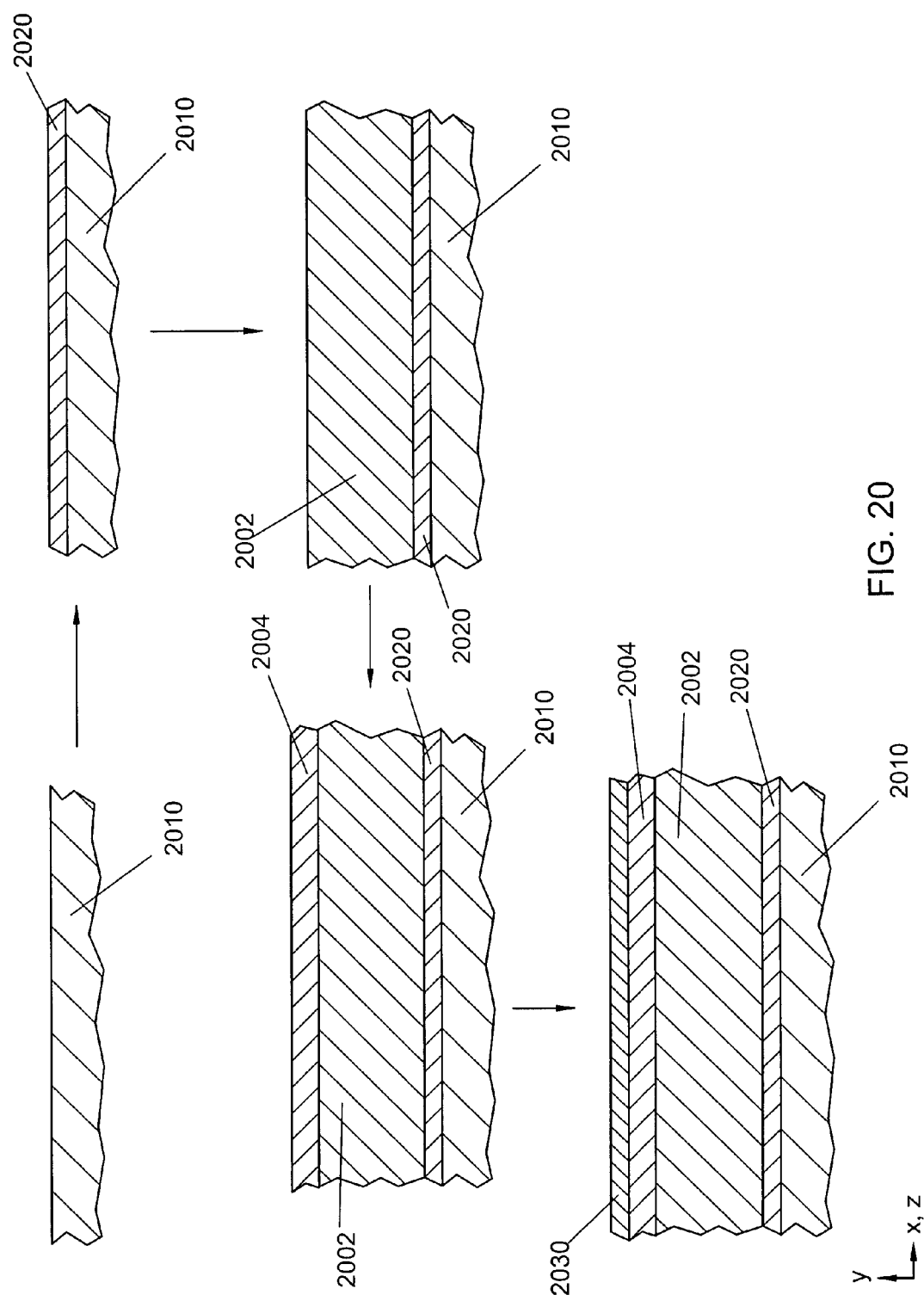
FIG. 20 is a process diagram for a single-substrate vertical fabrication procedure for a single-DBR waveguide of the present invention.

The flowchart of FIG. 19 and process diagram of FIG. 20 illustrate a single-substrate vertical fabrication procedure wherein a material comprising at least one layer of DBR stack 2002 is an electro-active or non-linear-optical material. First, a doped electrical contact/etch-stop layer 2020 is deposited on substrate 2010. Buffer/etch-stop layers may optionally be deposited before and/or after deposition of contact layer 2020, and are not shown. A DBR stack 2002 of about 5 to about 20 alternating lower- and higher-index quarter-wave layers is then deposited, with the topmost layer comprising a lower-index layer. One or more of the DBR layers (lower-index material, higher-index material, or both DBR materials) may comprise a layer of electro-optic active or non-linear-optical material. A waveguide core layer 2004 may then be deposited (after an optional buffer/etch-stop layer, if desired) comprising a higher-index material and having a layer thickness between about quarter-wave and about half-wave. A top doped electrical contact/etch-stop layer 2030 may then be deposited (preceded by an optional buffer/etch-stop layer if desired, and followed by an optional cladding/etch-stop layer if desired), completing the vertical fabrication of this particular structure. Direct incorporation of electro-active or non-linear-optical material into DBR 2002 enables simplification of the vertical fabrication of an active waveguide according to the present invention.

In each of the vertical layer structures of FIGS. 15–20 fabricated using single-substrate vertical fabrication procedures, the lattice properties of the electro-active or non-linear-optical material must be substantially compatible with those of the $\lambda/4$ layers (DBR layers), core layer, the upper electrical contact layer, and/or upper cladding layer (if present), in order to form a sufficiently low-strain and/or defect-free structure. Application of a control voltage across the top and bottom contact layers (vertical control electric field) enables active control of the optical properties of an electro-active layer, in turn enabling control of a modal index of an optical mode supported by the ultimate waveguide structure. Alternatively, the top and bottom electrical contact layers may be omitted and replaced with lateral electrical contacts during subsequent horizontal fabrication, enabling application of a horizontal control electric field. Application of a control optical signal enables active control of the optical properties of a non-linear optical layer, in turn enabling control of a modal index of an optical mode supported by the ultimate waveguide structure.

Figure 21:
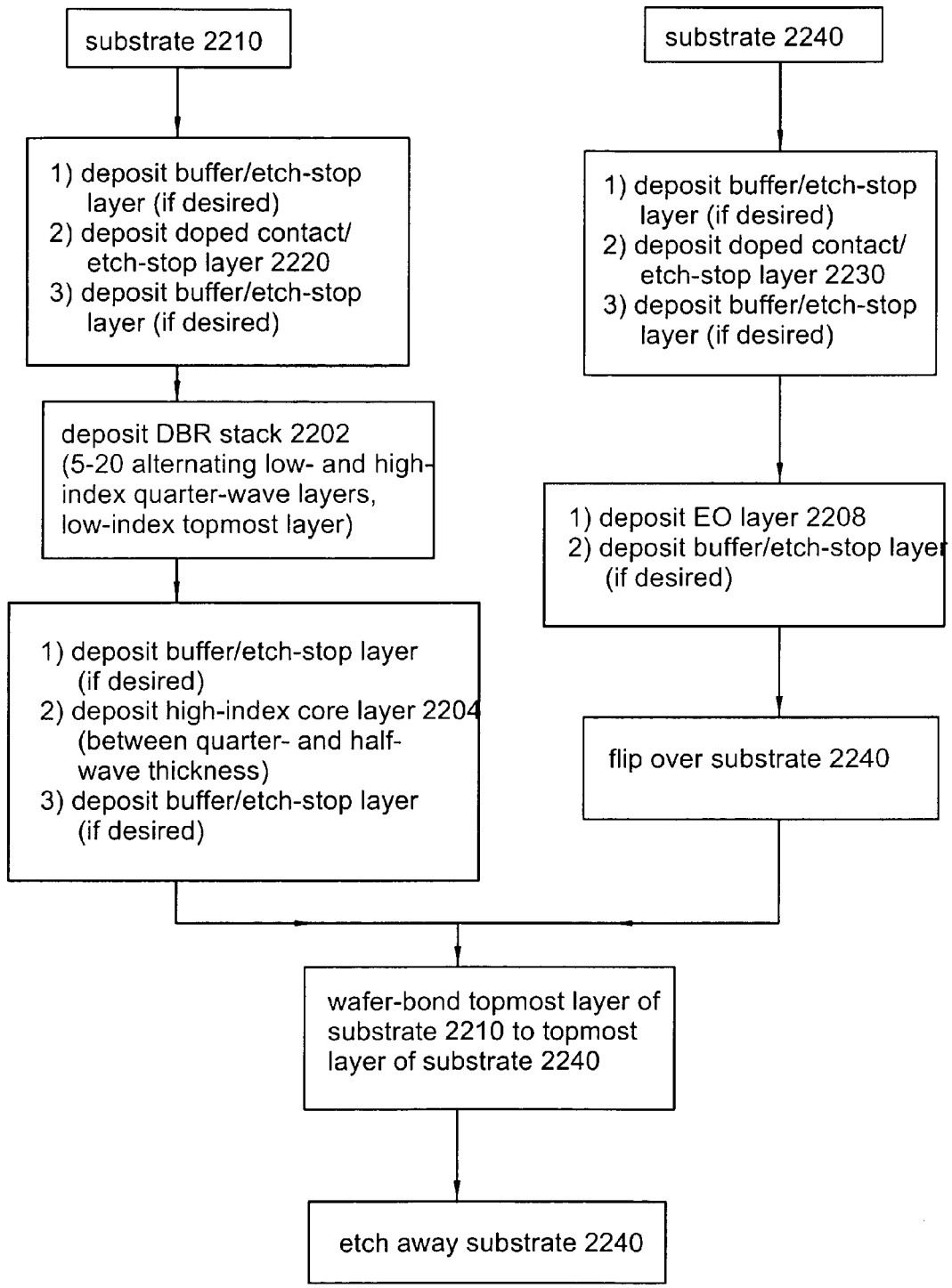
FIG. 21 is a flow diagram for a two-substrate vertical fabrication procedure for a single-DBR waveguide of the present invention.
Figure 22:
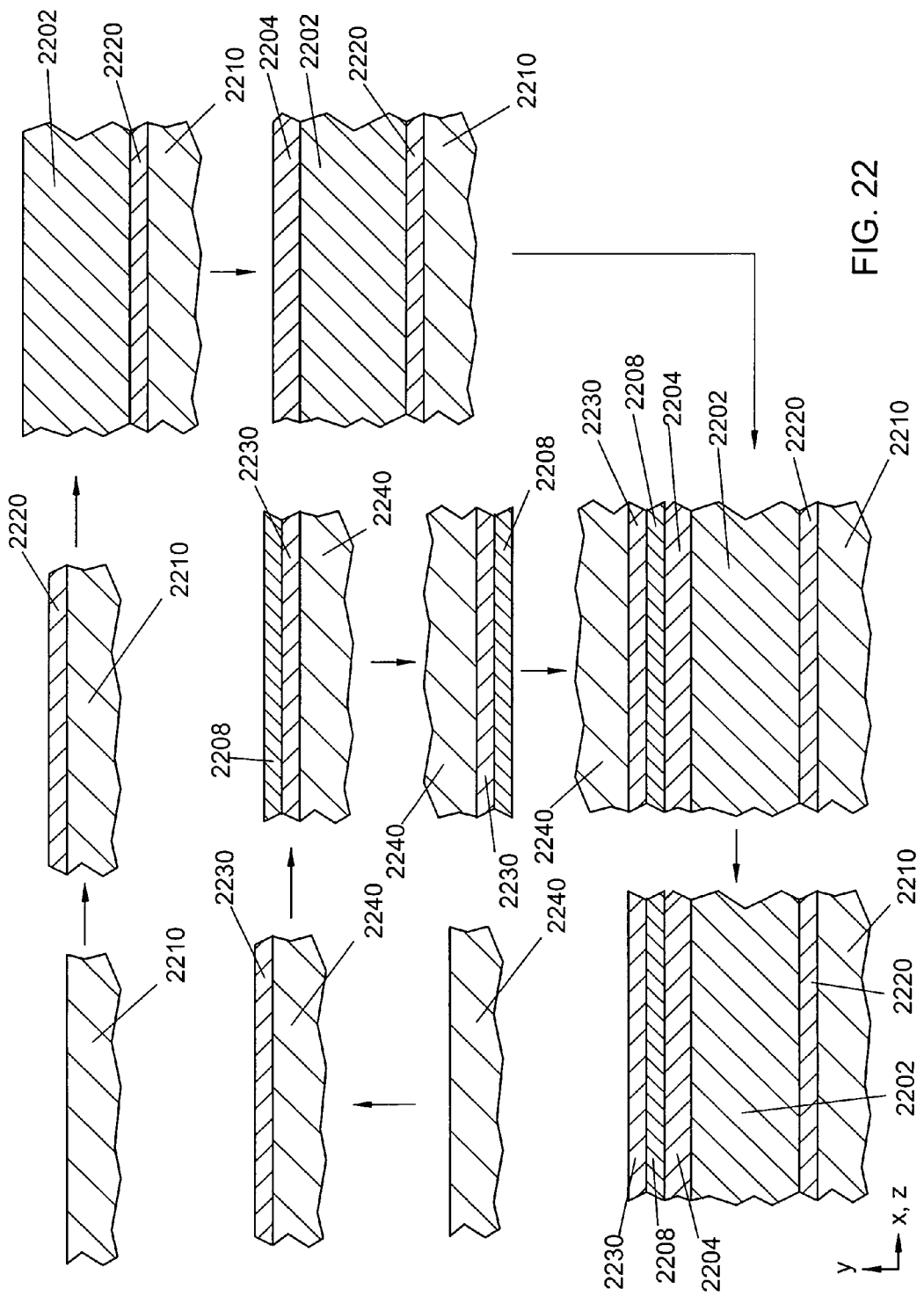
FIG. 22 is a process diagram for a two-substrate vertical fabrication procedure for a single-DBR waveguide of the present invention.

If the lattice properties of the DBR materials and the electro-active or non-linear-optical material are not substantially compatible, a group of multi-substrate vertical fabrication processes may be employed to construct surface-guided waveguides. The flowchart of FIG. 21 and process diagram of FIG. 22 illustrate a two-substrate vertical fabrication procedure wherein two separate substrates may be utilized for deposition of material layers and the resulting structures may be wafer-bonded together, eliminating the need for substantially compatible lattice properties. First, a doped electrical contact/etch-stop layer 2220 is deposited on a first substrate 2210. Buffer/etch-stop layers may optionally be deposited before and/or after deposition of contact layer 2220, and are not shown. A DBR stack 2202 of about 5 to about 20 alternating lower- and higher-index quarter-wave layers is then deposited, with the topmost layer comprising a lower-index layer. A waveguide core layer 2204 may then be deposited (after an optional buffer/etch-stop layer, if desired) comprising a higher-index material and having a layer thickness between about quarter-wave and about half-wave. A second doped electrical contact/etch-stop layer 2230 is deposited on a second substrate 2240, which need not be lattice-compatible with substrate 2210 or any of the layers deposited thereon. Buffer/etch-stop layers may optionally be deposited before and/or after deposition of contact layer 2230, and are not shown. Electro-active or non-linear-optical material layer 2208 may then be deposited (followed by an optional buffer/etch-stop layer if desired). The second substrate is then inverted, and wafer bonded to the topmost layer on the first substrate using any suitable wafer-bonding technique. In this way materials having lattice properties insufficiently compatible to allow direct deposition of a single multi-layer structure may nevertheless be incorporated into such a structure. After wafer-bonding, the second substrate 2240 may be etched away, completing the vertical fabrication of this particular structure.

Figure 23:
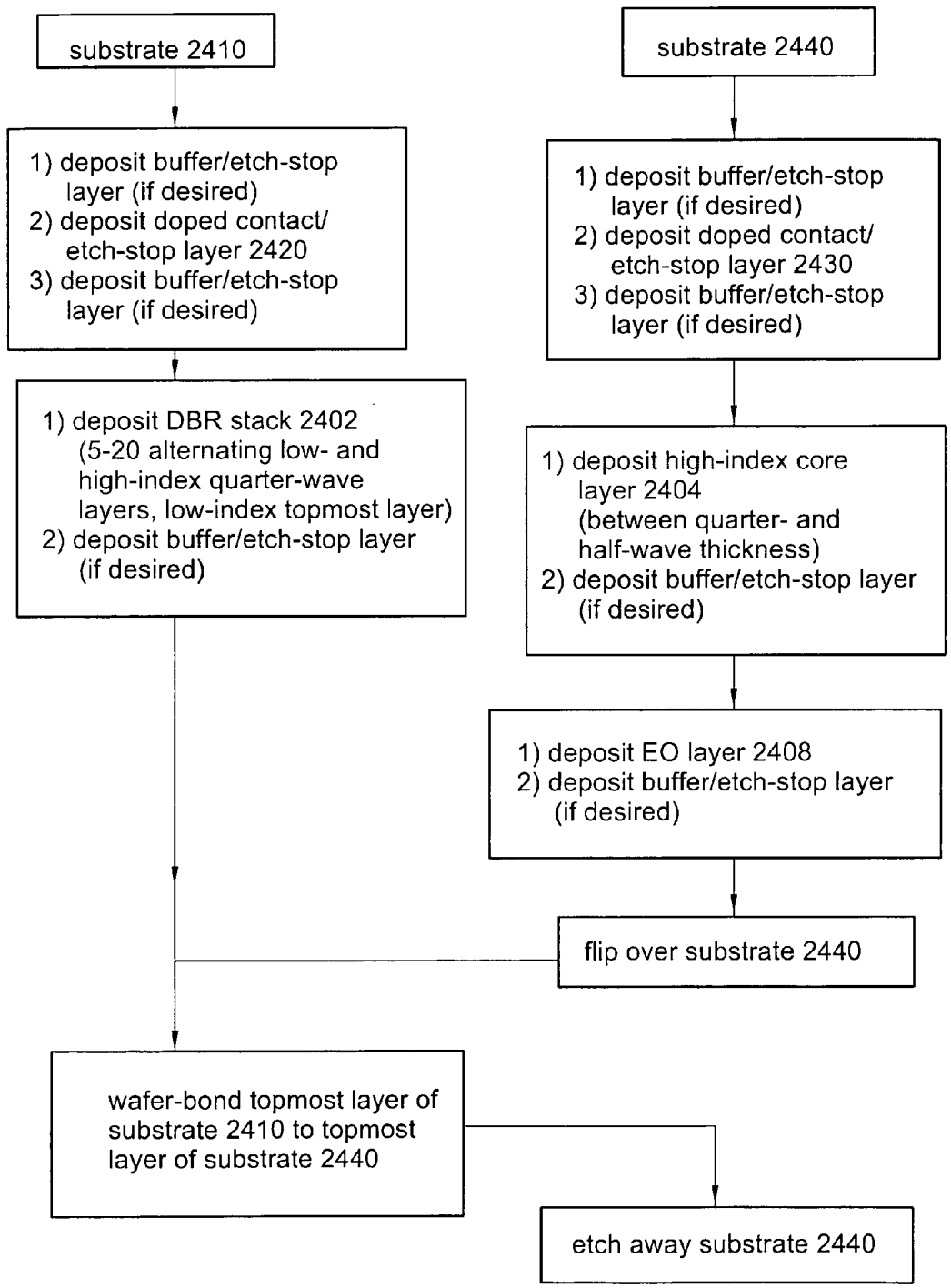
FIG. 23 is a flow diagram for a two-substrate vertical fabrication procedure for a single-DBR waveguide of the present invention.
Figure 24:
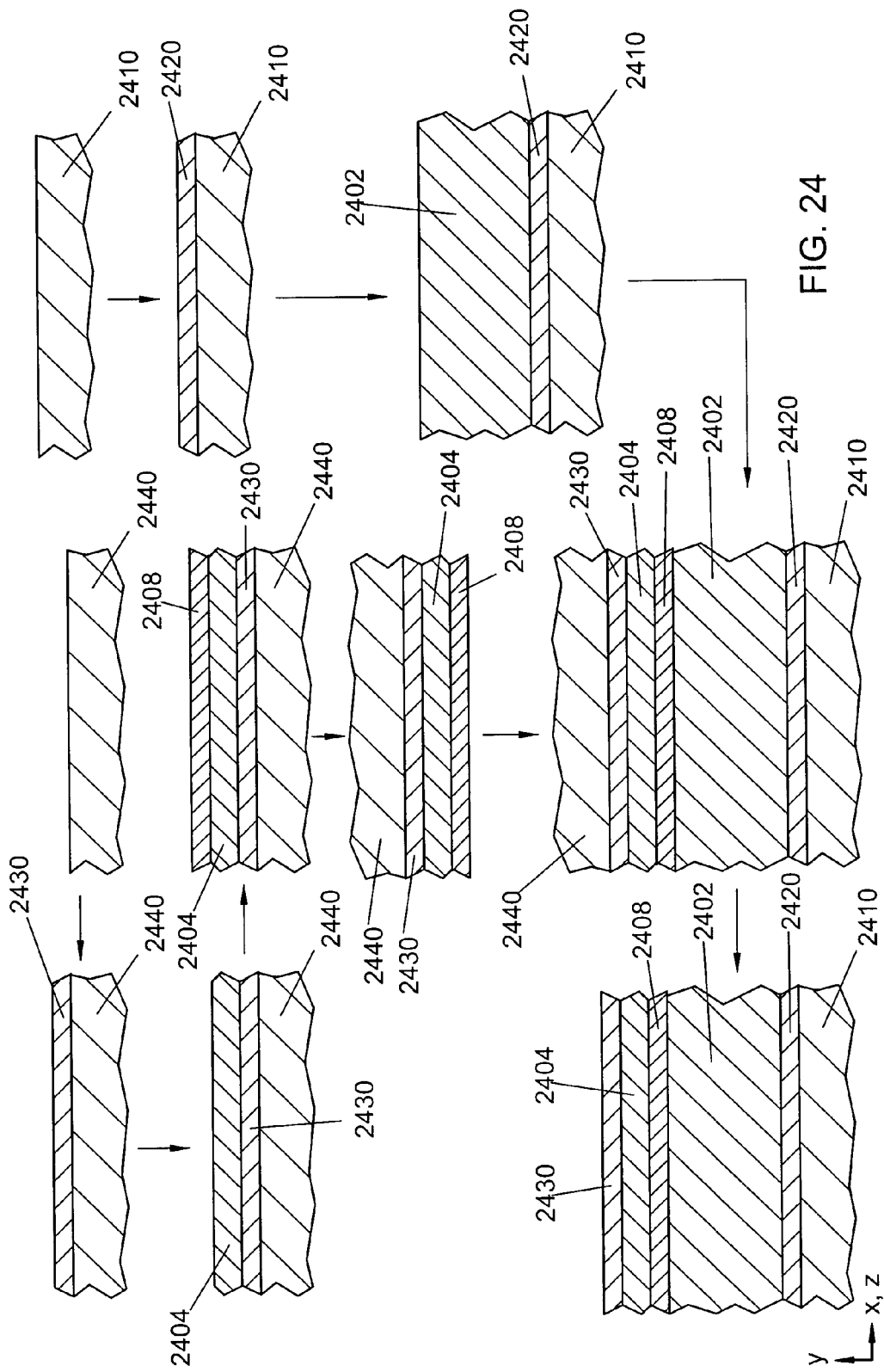
FIG. 24 is a process diagram for a two-substrate vertical fabrication procedure for a single-DBR waveguide of the present invention.
Figure 25:
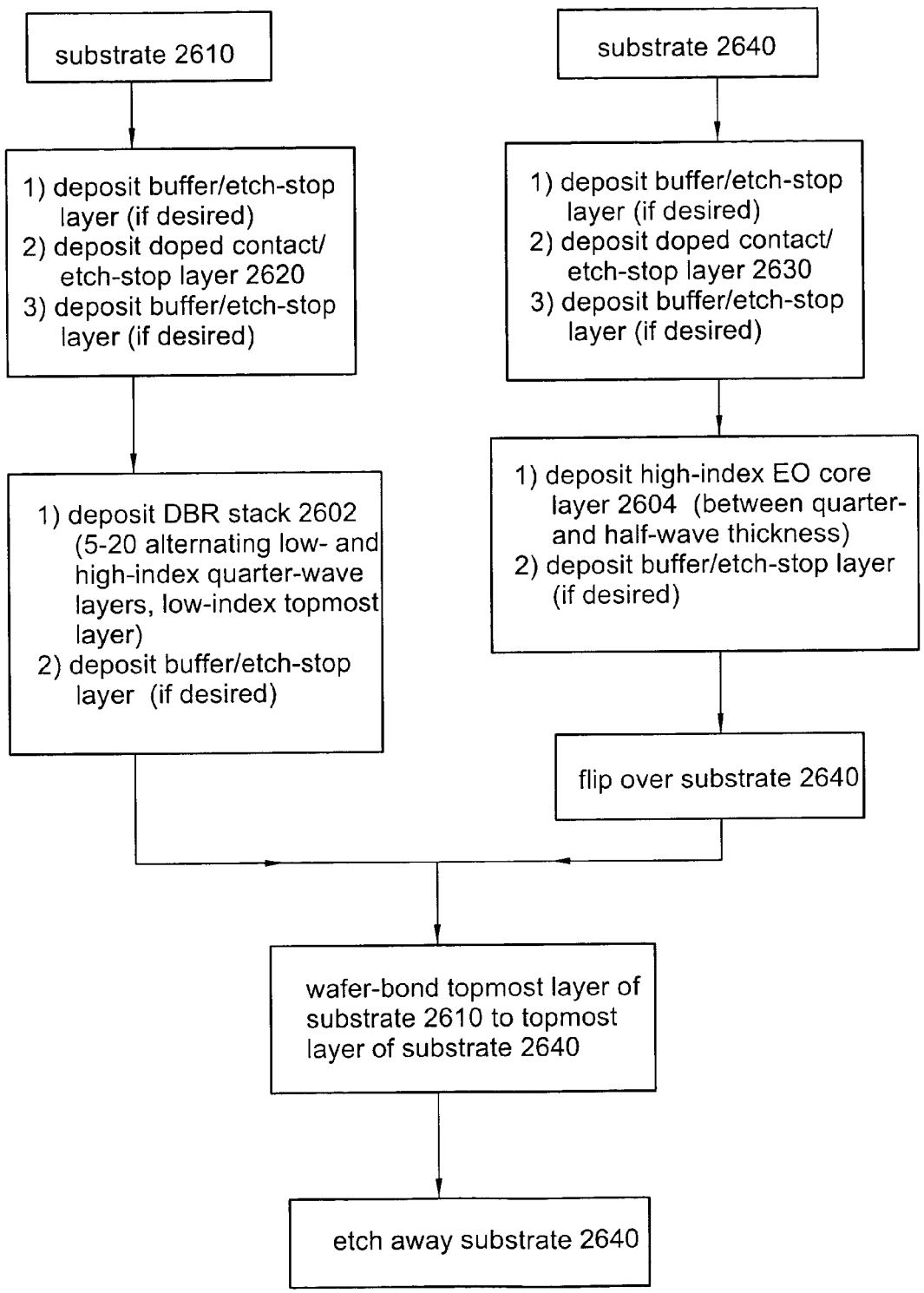
FIG. 25 is a flow diagram for a two-substrate vertical fabrication procedure for a single-DBR waveguide of the present invention.
Figure 26:
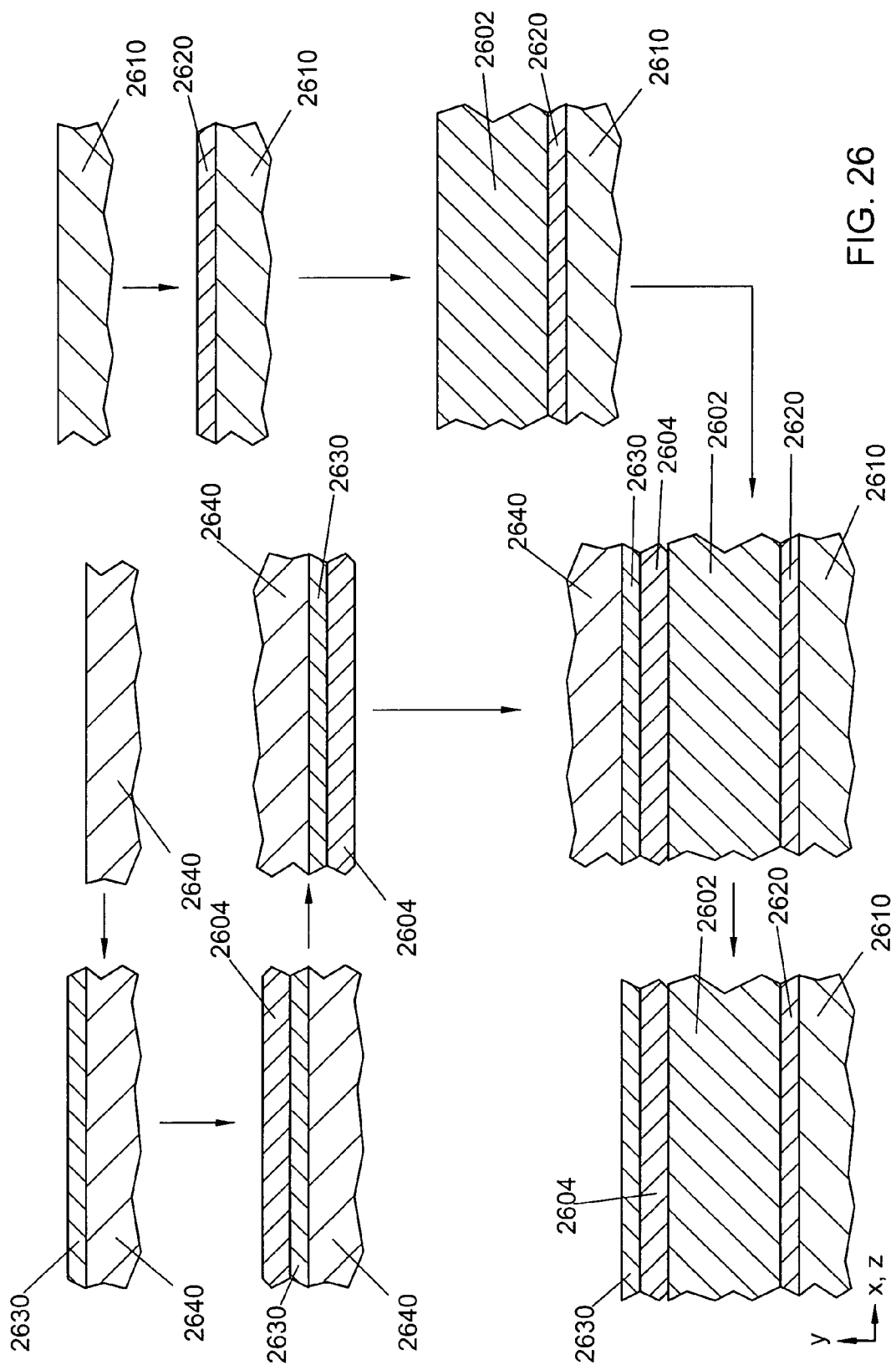
FIG. 26 is a process diagram for a two-substrate vertical fabrication procedure for a single-DBR waveguide of the present invention.

Several related alternative two-substrate vertical fabrication procedures are illustrated in FIGS. 23, 24, 25, and 26. In FIGS. 23 and 24, a doped electrical contact/etch-stop layer 2420 is first deposited on a first substrate 2410. Buffer/etch-stop layers may optionally be deposited before and/or after deposition of contact layer 2420, and are not shown. A DBR stack 2402 of about 5 to about 20 alternating lower- and higher-index quarter-wave layers is then deposited, with the topmost layer comprising a lower-index layer, after which an optional buffer/etch-stop layer may be deposited, if desired. A second doped electrical contact/etch-stop layer 2430 is deposited on a second substrate 2240, which need not be lattice-compatible with substrate 2410 or any of the layers deposited thereon. Buffer/etch-stop layers may optionally be deposited before and/or after deposition of contact layer 2430, and are not shown. A waveguide core layer 2404 may then be deposited (followed by an optional buffer/etch-stop layer, if desired) comprising a higher-index material and having a layer thickness between about quarter-wave and about half-wave. Electro-active or non-linear-optical material layer 2408 may then be deposited (followed by an optional buffer/etch-stop layer if desired). The second substrate is then inverted, and wafer bonded to the topmost layer on the first substrate using any suitable wafer-bonding technique. After wafer-bonding, the second substrate 2440 may be etched away, completing the vertical fabrication of this particular structure. The order of deposition of the core layer and electro-active or non-linear-optical layer may be reversed. FIGS. 25 and 26 illustrate an analogous fabrication procedure involving a first substrate 2610 with contact layer 2620 and DBR 2602, and a second substrate 2640 with contact layer 2630 and electro-active or non-linear-optical core layer 2604. Wafer-bonding the topmost layers of the two substrates and then etching away substrate 2640 yields the desired layer structure.

Whichever class of procedures is used (single-substrate, or two-substrate), the resulting vertical structure comprises a single DBR stack for surface guiding an optical mode and incorporates at least one electro-active or non-linear-optical layer, with contact layers above and below (if needed). Application of a control voltage across the top and bottom electrical contact layers (vertical control electric field) enables active control of the optical properties of the electro-active layer. In either group of surface-guided structures, the top and bottom electrical contact layers may be omitted and replaced with lateral electrical contacts during subsequent horizontal fabrication, enabling application of a horizontal control electric field. Application of a control optical signal enables active control of the optical properties of a non-linear optical layer.

For devices incorporating two MLR structures confining an optical mode therebetween (i.e., dual- or partial-dual-DBR devices), similar single- and multi-substrate vertical fabrication methods may be employed. A wafer may be grown comprising a suitable substrate, a bottom buffer or cladding layer (if desired or needed), a doped bottom electrical contact layer (often delta-doped in the case of III–V semiconductors and alloys), another buffer or cladding layer (if desired or needed), and a first set of alternating $\lambda/4$ layers of a pair of materials comprising a bottom DBR stack (either having sufficient index contrast to form a DBR, or which may be converted during subsequent processing to materials possessing such an index contrast; typically between 3 and 10 or more pairs of layers may be employed). A λ/2 waveguide layer (i.e., core layer), a top DBR stack of alternating λ/4 layers, and the electro-active or non-linear-optical properties required for active control of the waveguide/resonator may be incorporated into this structure in a variety of ways.

Figure 27:
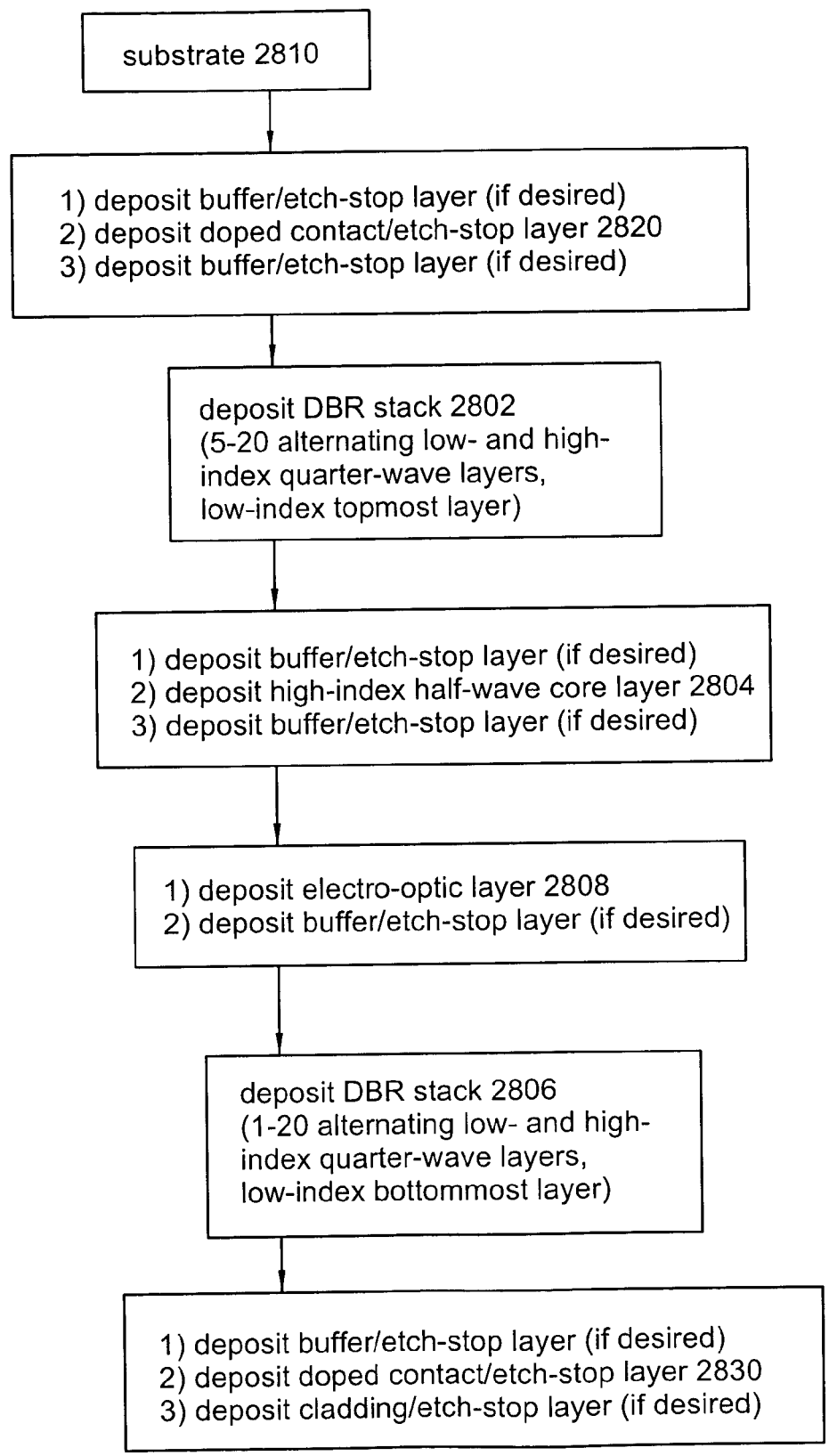
FIG. 27 is a flow diagram for a single-substrate vertical fabrication procedure for a dual-DBR waveguide of the present invention.
Figure 28:
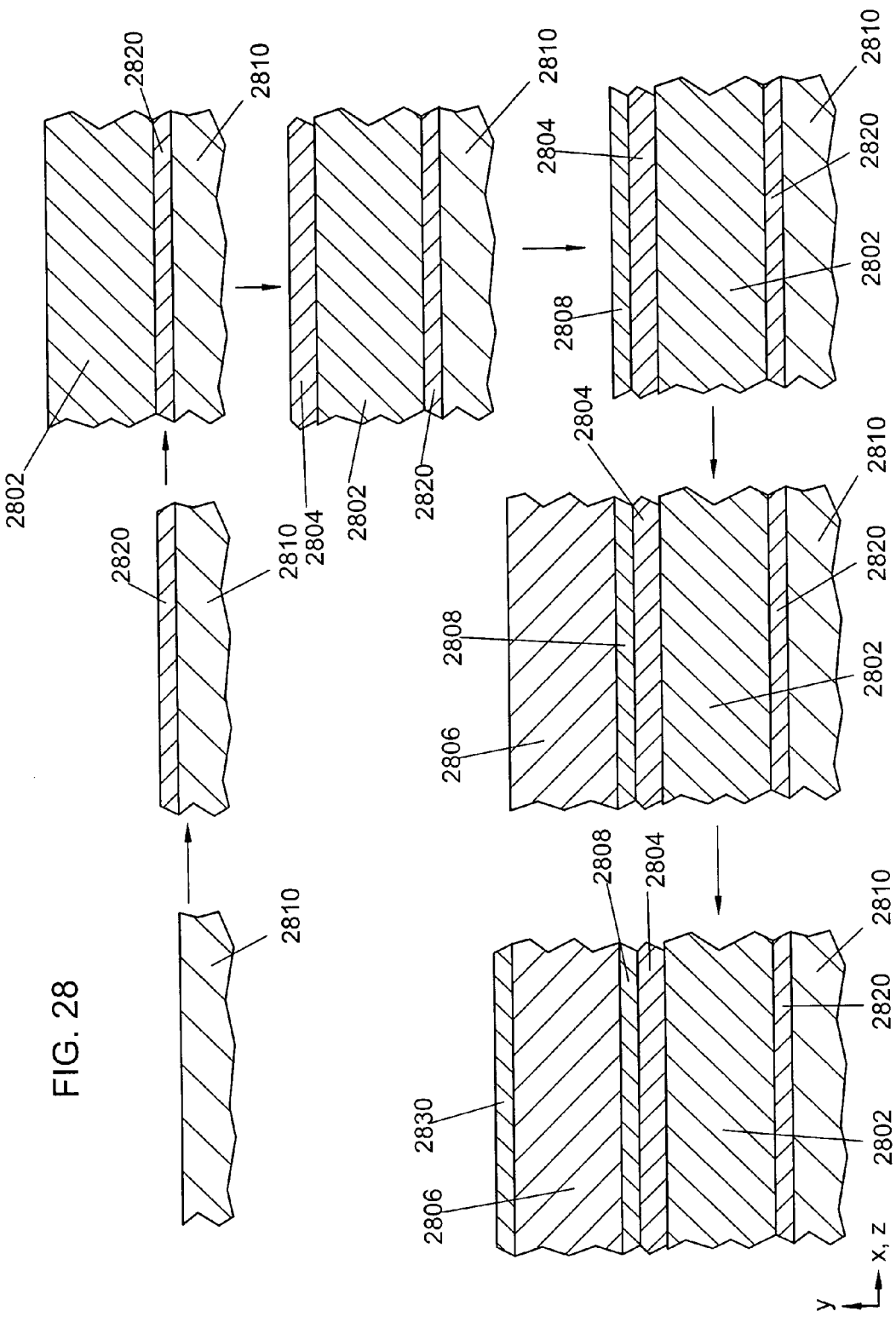
FIG. 28 is a process diagram for a single-substrate vertical fabrication procedure for a dual-DBR waveguide of the present invention.

The flow diagram of FIG. 27 and fabrication process diagram of FIG. 28 show a single-substrate vertical fabrication process wherein a bottom contact layer 2820 is deposited on a substrate 2810 (preceded and or followed by buffer/etch-stop layers if desired or needed; not shown). After deposition of bottom DBR stack 2802 (and a buffer/etch-stop layer, if desired), half-wave waveguide core layer 2804 may be deposited directly over the bottom DBR stack 2802 (followed by a buffer/etch-stop layer, if desired). An electro-active or non-linear-optical layer 2808 may be deposited next (followed by a buffer/etch-stop layer, if desired). The order of deposition of the core layer and electro-active or non-linear-optical layer may be inverted. A second set of alternating λ/4 layers (either the same pair of materials as used for bottom DBR stack 2802, or a suitable alternative pair of substantially lattice-compatible materials) may then be deposited over electro-active or non-linear-optical layer 2808 to form top DBR stack 2806. DBR stack 2806 may typically comprise from 1 to about 20 layers of alternating lower- and higher-index quarter-wave layers with a lower-index bottom-most layer, the number of layers being employed depending on the evanescent properties sought for the waveguide ultimately produced. Fewer layers in top DBR stack 2806 results in a larger evanescent portion of a supported optical mode extending upward from the waveguide beyond upper DBR stack 2806. A top electrical contact/etch-stop layer 2830 (preceded and/or followed by buffer/etch-stop layer(s) if desired) may then be deposited, substantially completing the vertical fabrication of the double DBR layer structure.

Figure 29:
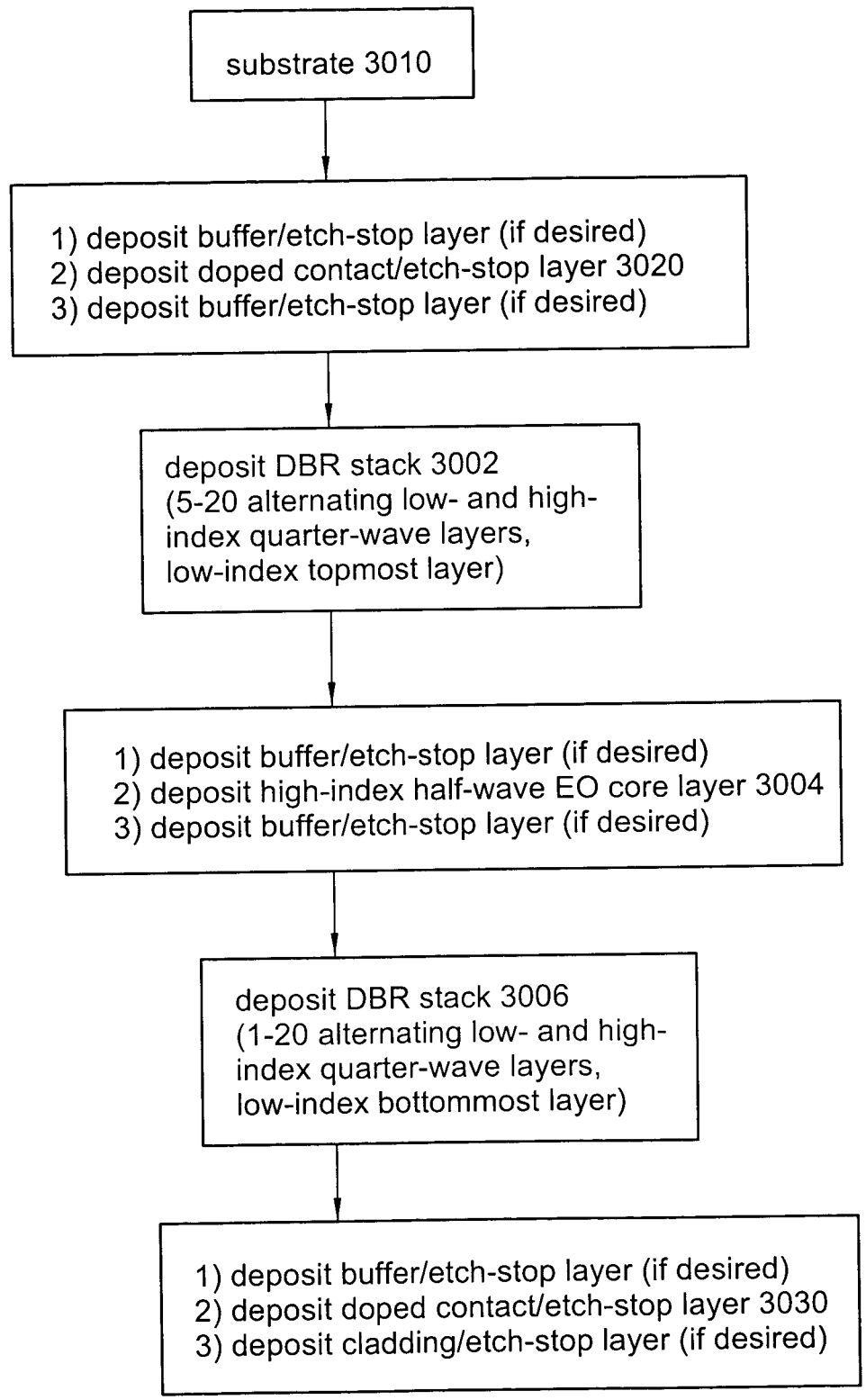
FIG. 29 is a flow diagram for a single-substrate vertical fabrication procedure for a dual-DBR waveguide of the present invention.
Figure 30:
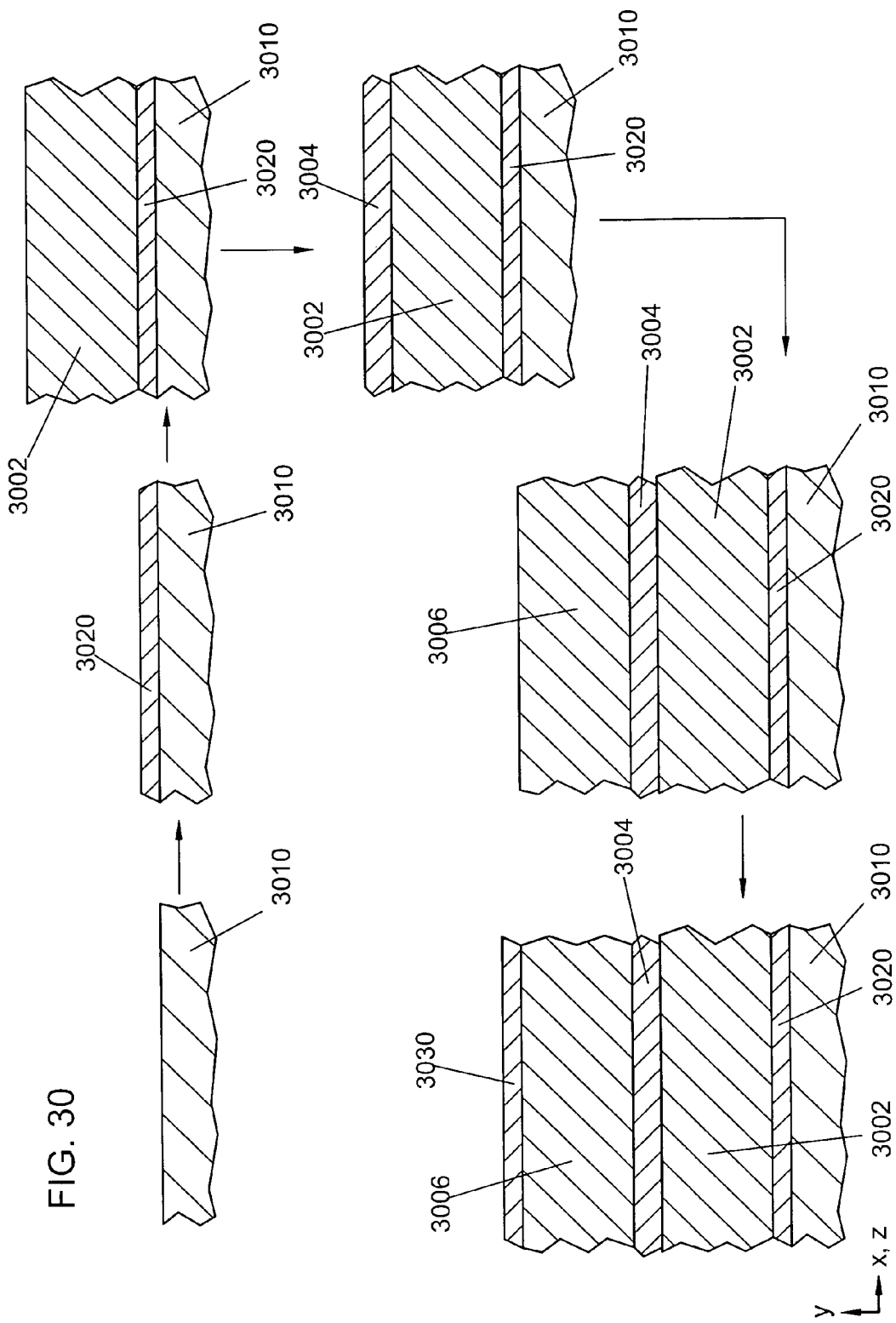
FIG. 30 is a process diagram for a single-substrate vertical fabrication procedure for a dual-DBR waveguide of the present invention.
Figure 31:
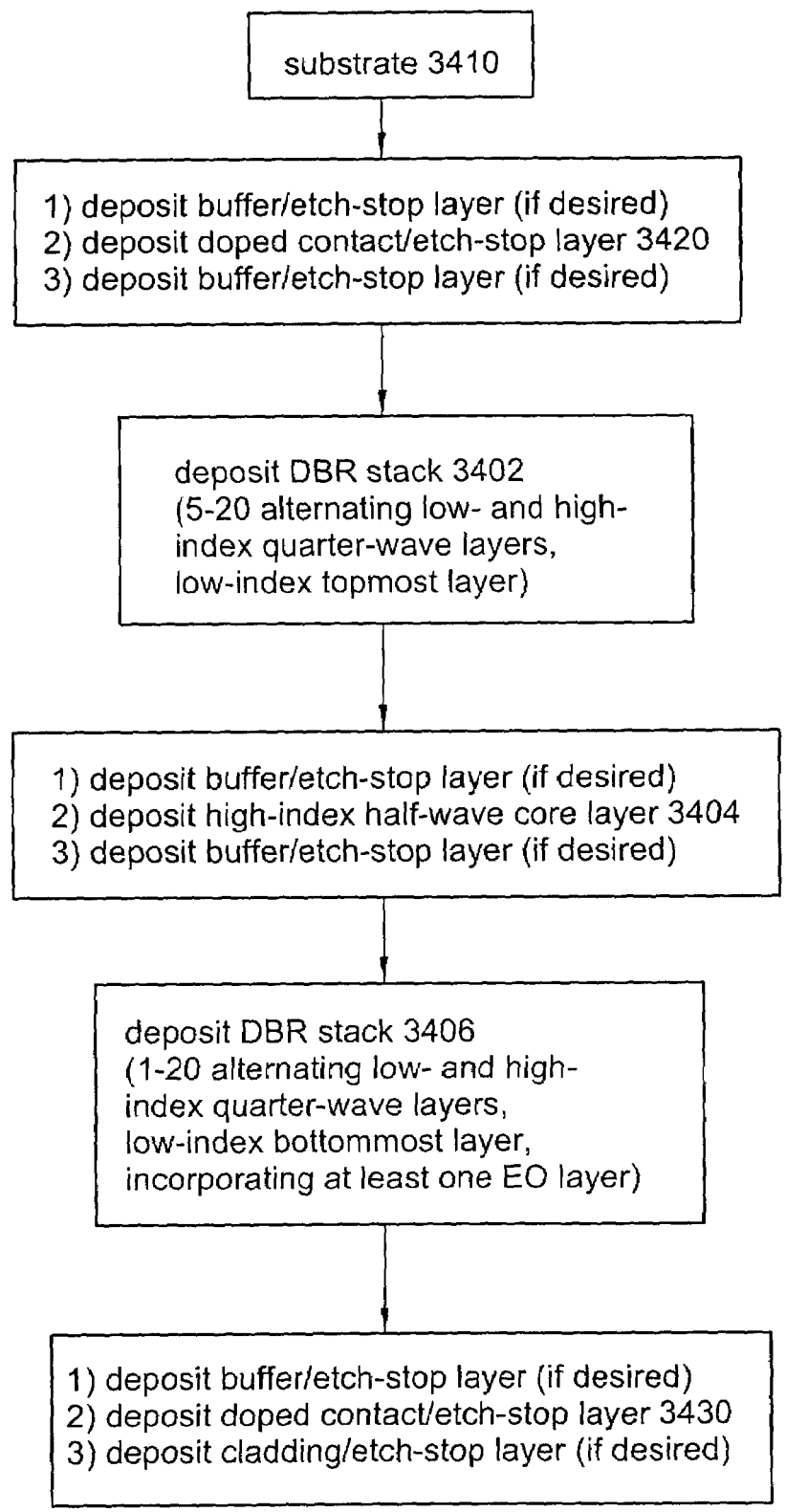
FIG. 31 is a flow diagram for a single-substrate vertical fabrication procedure for a dual-DBR waveguide of the present invention.
Figure 32:
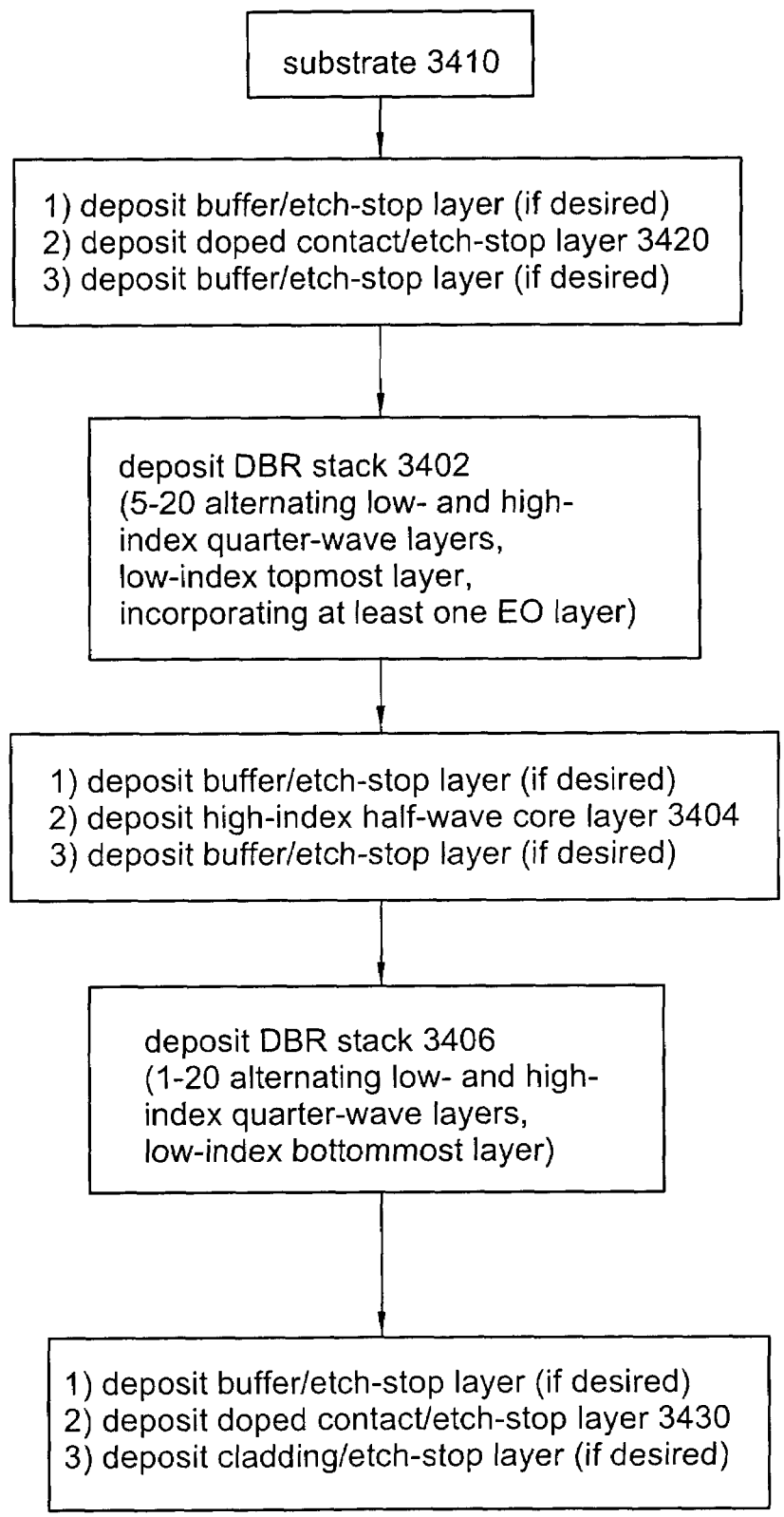
FIG. 32 is a flow diagram for a single-substrate vertical fabrication procedure for a dual-DBR waveguide of the present invention.
Figure 33:
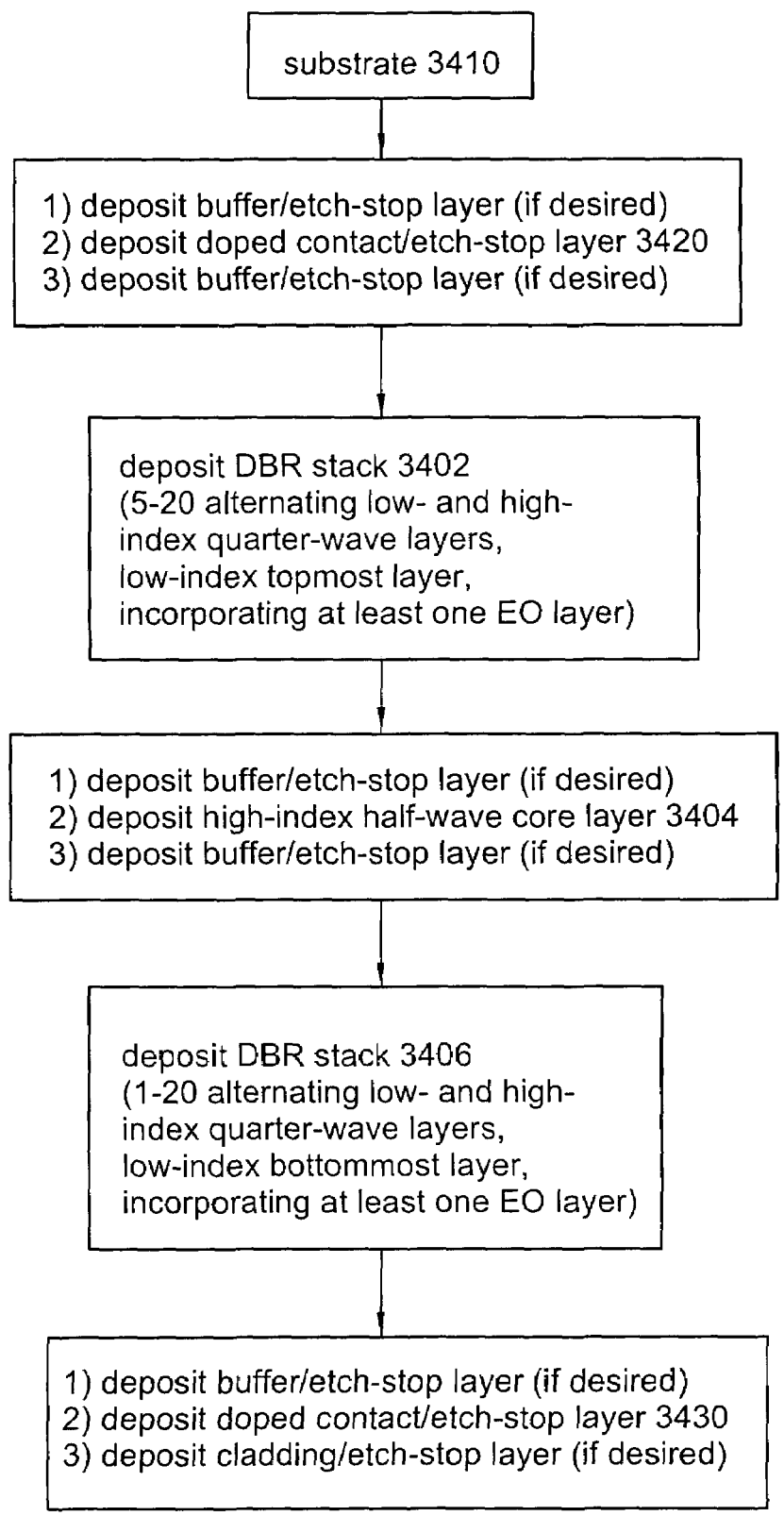
FIG. 33 is a flow diagram for a single-substrate vertical fabrication procedure for a dual-DBR waveguide of the present invention.
Figure 34:
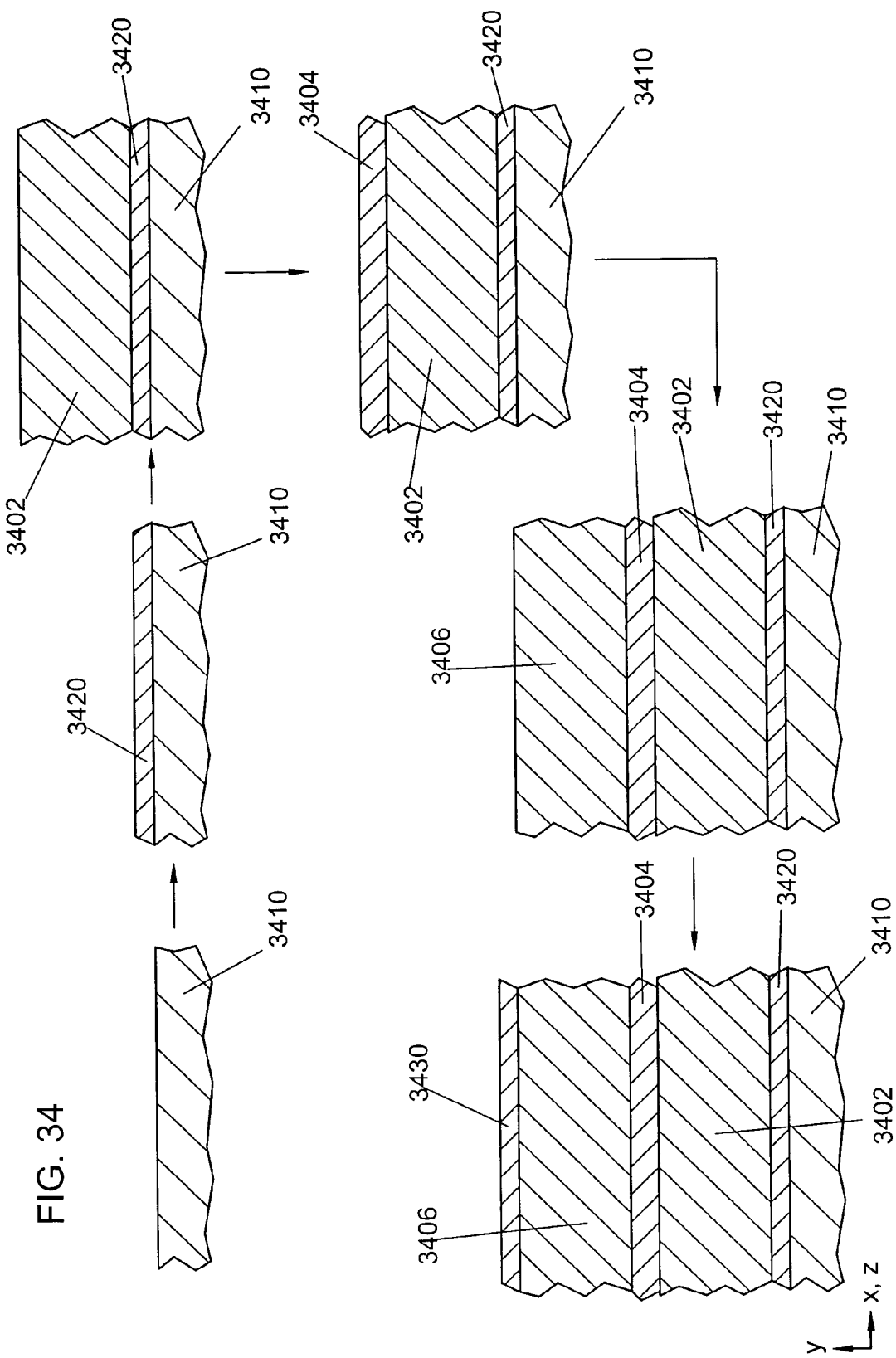
FIG. 34 is a process diagram for a single-substrate vertical fabrication procedure for a dual-DBR waveguide of the present invention.
Figure 35:
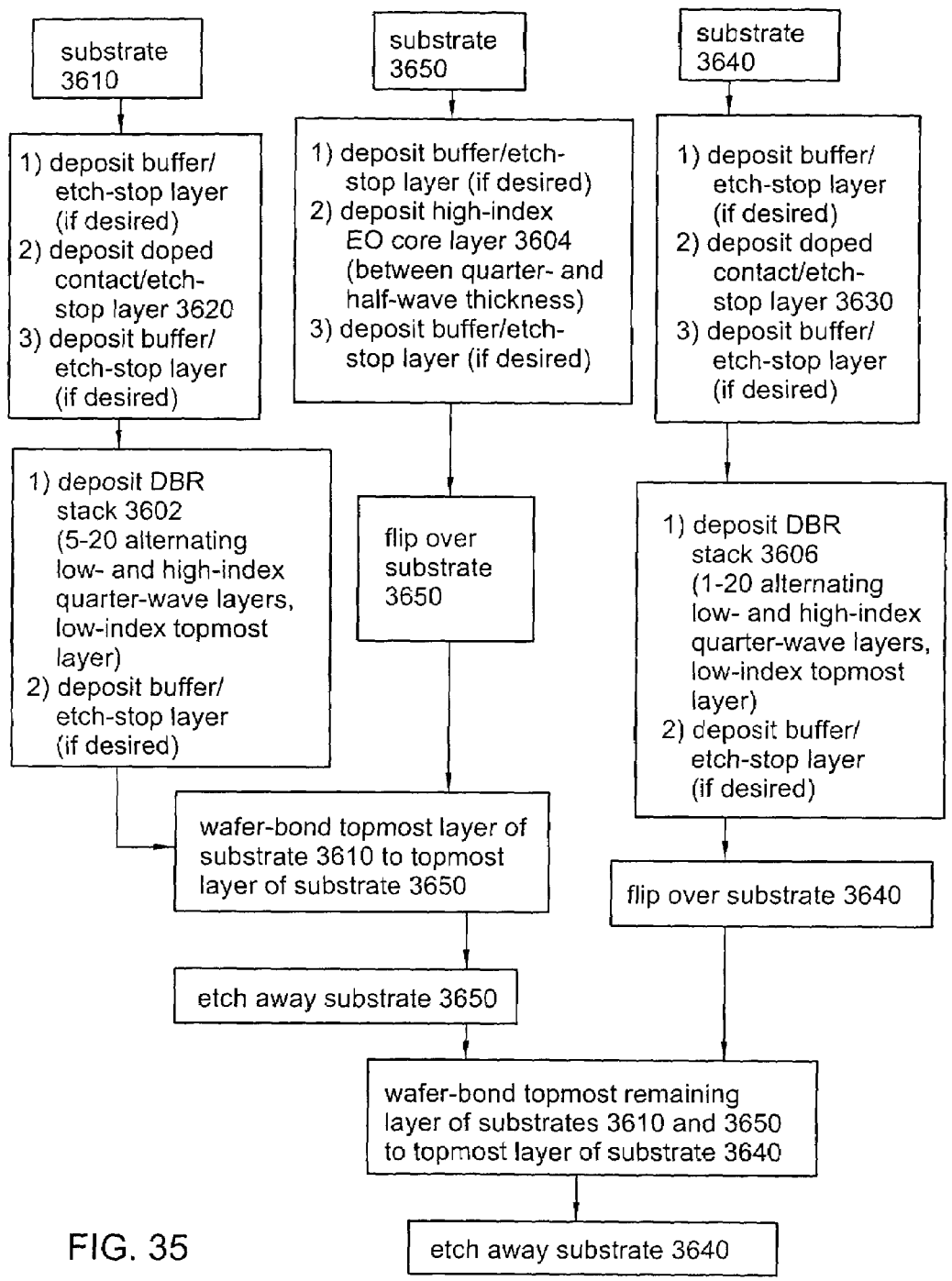
FIG. 35 is a flow diagram for a three-substrate vertical fabrication procedure for a dual-DBR waveguide of the present invention.
Figure 36:
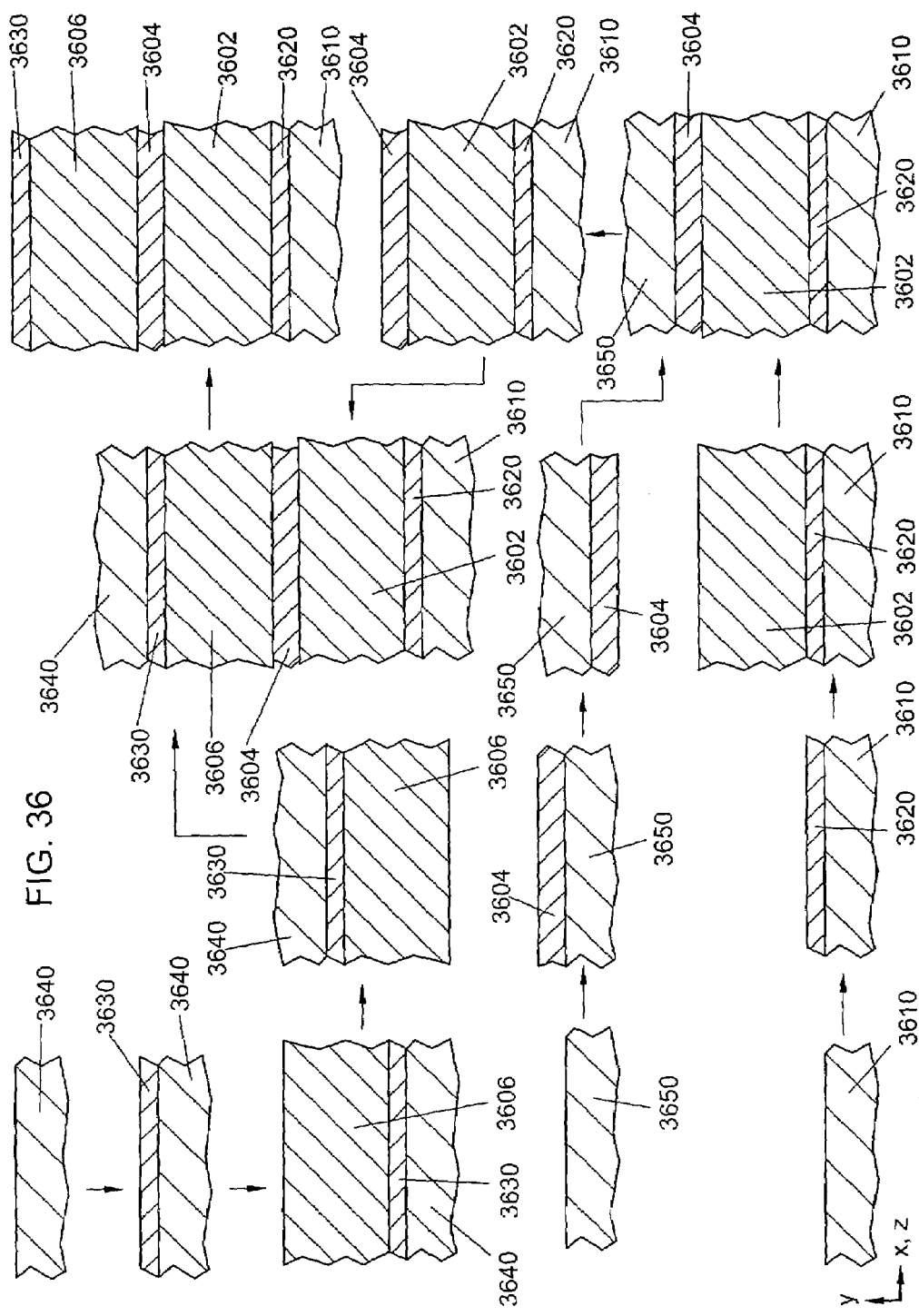
FIG. 36 is a process diagram for a three-substrate vertical fabrication procedure for a dual-DBR waveguide of the present invention.
Figure 37:
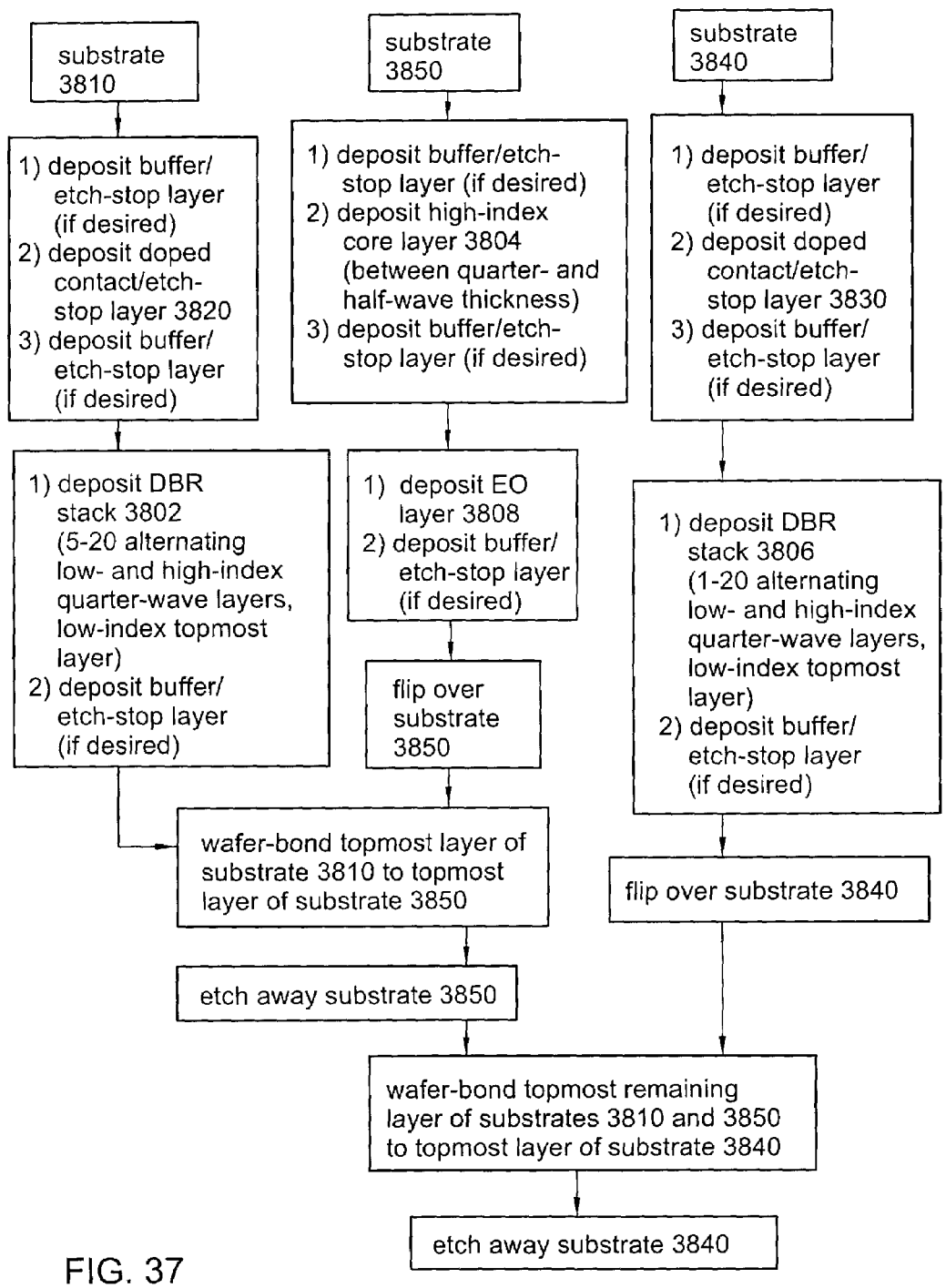
FIG. 37 is a flow diagram for a three-substrate vertical fabrication procedure for a dual-DBR waveguide of the present invention.
Figure 38:
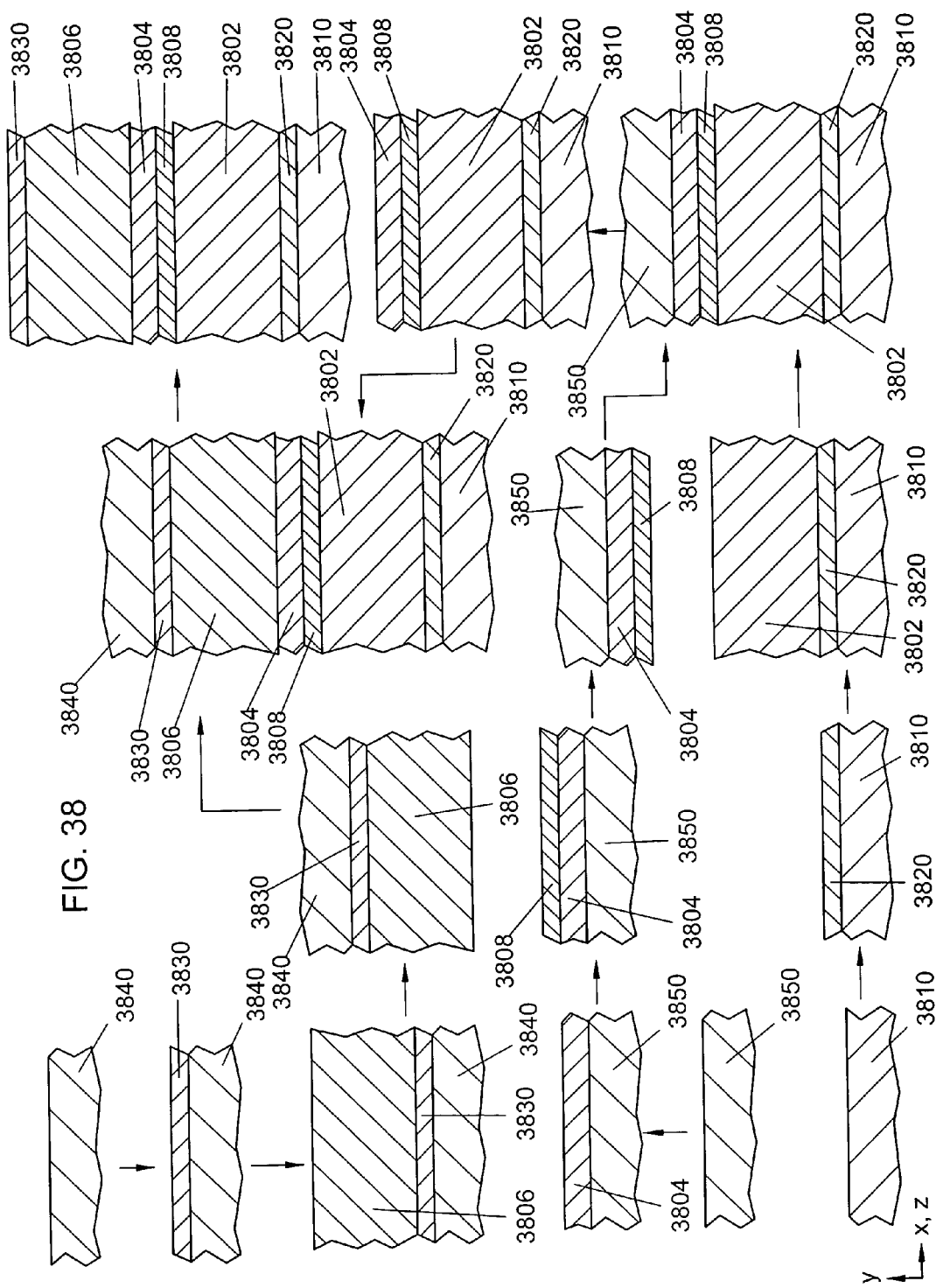
FIG. 38 is a process diagram for a three-substrate vertical fabrication procedure for a dual-DBR waveguide of the present invention.
Figure 39:
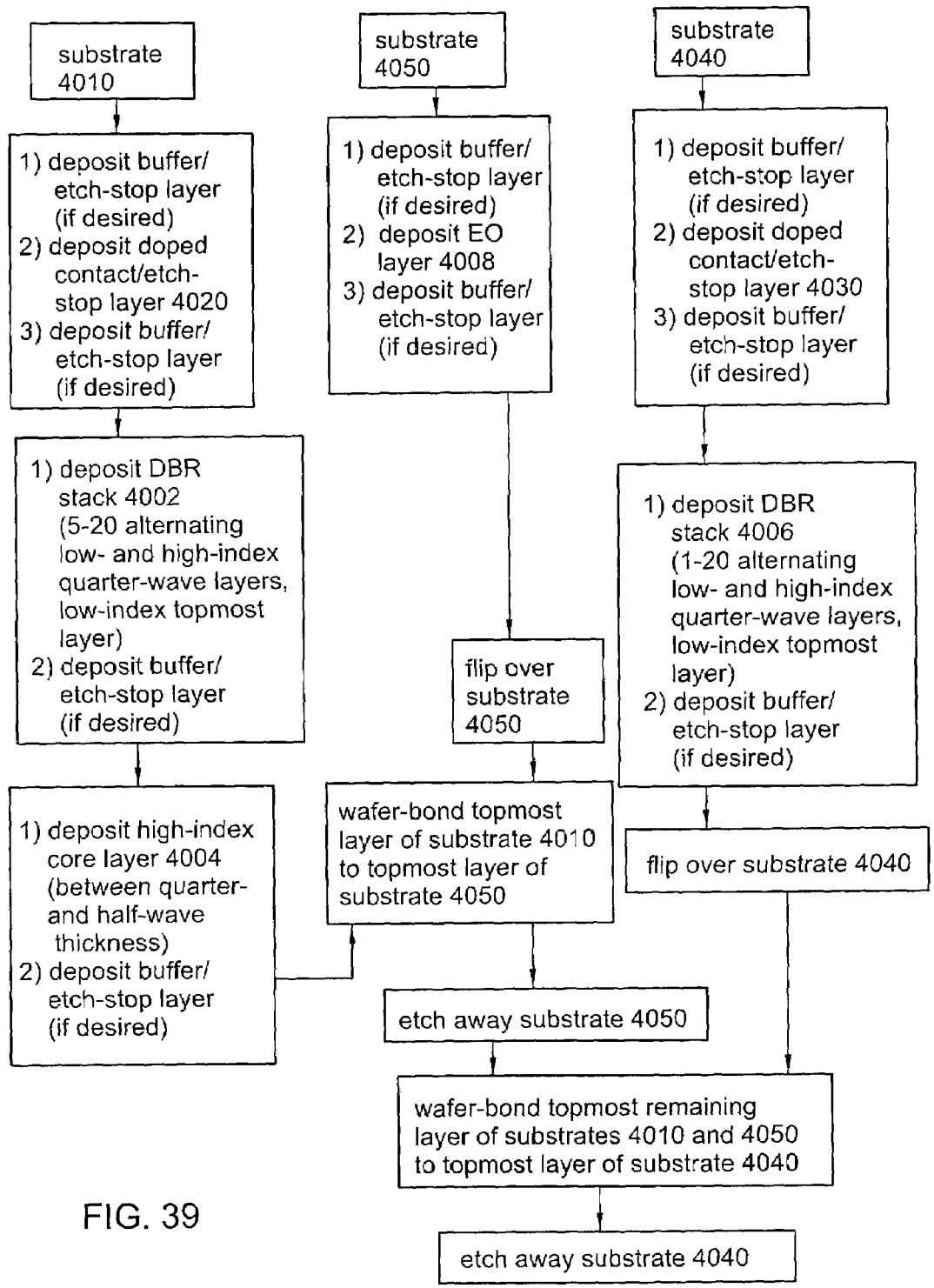
FIG. 39 is a flow diagram for a three-substrate vertical fabrication procedure for a dual-DBR waveguide of the present invention.
Figure 40:
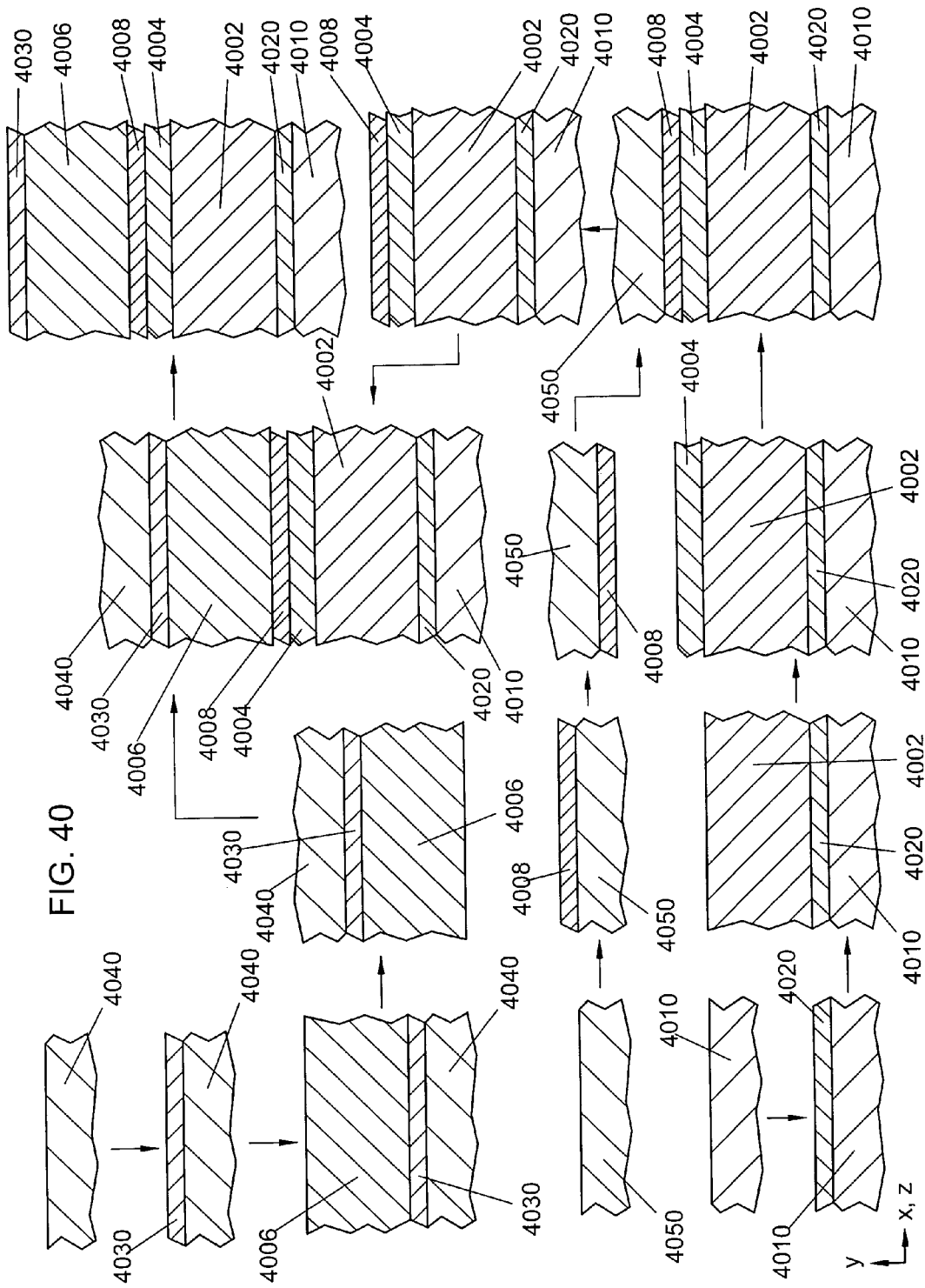
FIG. 40 is a process diagram for a three-substrate vertical fabrication procedure for a dual-DBR waveguide of the present invention.

Instead of a separate electro-active or non-linear-optical layer 2808, the single-substrate fabrication procedure of FIGS. 29 and 30 may be followed, comprising deposition on substrate 3010 of contact layer 3020, bottom DBR stack 3002, core layer 3004 comprising a half-wave layer of electro-active or non-linear-optical material, top DBR stack 3006, and top contact layer 3030. Alternatively, as illustrated in FIGS. 31, 32, 33, and 34, one or more layers of the bottom DBR 3402 and/or top DBR 3406 may comprise a layer of electro-active or non-linear-optical material. In any of these single-substrate vertical fabrication procedures the lattice properties of the electro-optic layer material must be substantially compatible with those of the λ/4 layers, waveguide layer, and or contact layers in order to form a sufficiently low-strain and/or defect-free structure. Application of a control voltage across the top and bottom contact layers (vertical control electric field) enables active control of the optical properties of the electro-active layer, wherever it is located. Application of a control optical signal enables active control of the optical properties of a non-linear optical layer.

If the lattice properties of the various layer materials are not sufficiently compatible to enable vertical fabrication of dual- or partial-dual-DBR structures as a single growth sequence on a single substrate as described above, multi-substrate vertical fabrication techniques may be employed to enable incorporation of lattice-incompatible materials into dual-or partial-dual-DBR waveguides. In each of the fabrication procedures illustrated in FIGS. 35, 36, 37, 38, 39, and 40 three substrates are employed. A bottom contact and bottom DBR stack are grown on a first substrate, an electro-active or non-linear-optical is deposited on a second substrate (alone, along with a separate core layer, or as the core layer), and a top contact and top DBR stack are grown on a third substrate. If a waveguide layer is not deposited on the second substrate, it may be deposited on either of the other substrates. The second substrate (with the electro-active or non-linear-optical layer) is inverted and wafer-bonded to the first substrate (with the bottom DBR stack), and the second substrate is etched away. The third substrate (with the top DBR stack) is then inverted and wafer-bonded to the remaining layers of the second substrate. The third substrate is removed, substantially completing the vertical fabrication of the dual-DBR layer structure. With these procedures the lattice properties of the electro-active or non-linear-optical material need not be compatible with those of either set of λ/4 layers. Application of a control voltage across the top and bottom electrical contact layers (vertical control electric field) enables active control of the optical properties of the electro-active or non-linear-optical layer. In either group of dual-DBR structures (single-substrate or multi-substrate vertical fabrication), the top and bottom electrical contact layers may be omitted and replaced with lateral electrical contacts during subsequent horizontal fabrication, enabling application of a horizontal control electric field. Application of a control optical signal enables active control of the optical properties of a non-linear optical layer.

Whichever of the above described vertical fabrication methods is employed (single- or multi-substrate), and whether a single- or dual-DBR structure is employed, the resulting multi-layer structure must be further processed (by so-called "horizontal fabrication") to produce laterally-confined waveguides and resonators according to the present invention. Such waveguides and resonators may take the form of a protruding ridge-like structure, a protruding mesa-like structure, a stepped structure, a recessed structure, and/or a buried structure on the substrate. Alternatively, such waveguides and resonators may take the form a structures of varying density, chemical composition, refractive index, or other physical property. These structures may take the form of linear segments, arcuate segments, or other open waveguide structures, or may take the form of rings, circles, ovals, racetracks, ellipses, polygons, or other closed waveguide (i.e., resonator) structures. Other topologies may be employed for more specialized integrated optical devices, such as Mach-Zender interferometers, directional couplers or 2×2 switches, and the like (as in FIGS. 1 and 2, for example). Once a wafer has been produced according to any of the vertical fabrication methods described hereinabove (or other suitably equivalent methods), any suitable spatially-selective lithographic patterning and/or etching technique(s), or other functionally equivalent spatially-selective material processing techniques, may be employed to modify portions of the multi-layer structure, thereby forming on the substrate structures (protruding, recessed, buried, chemically or physically altered, etc) of the desired topology. Generic examples are shown schematically in FIGS. 41A through 43B using a patterned-mask/etching technique. Other suitable techniques, including direct lithographic techniques requiring no mask, optical lithographic techniques, deposition, assisted deposition, re-growth, re-deposition, and other techniques and/or processes described herein, for example, may be equivalently employed.

Figure 41A:
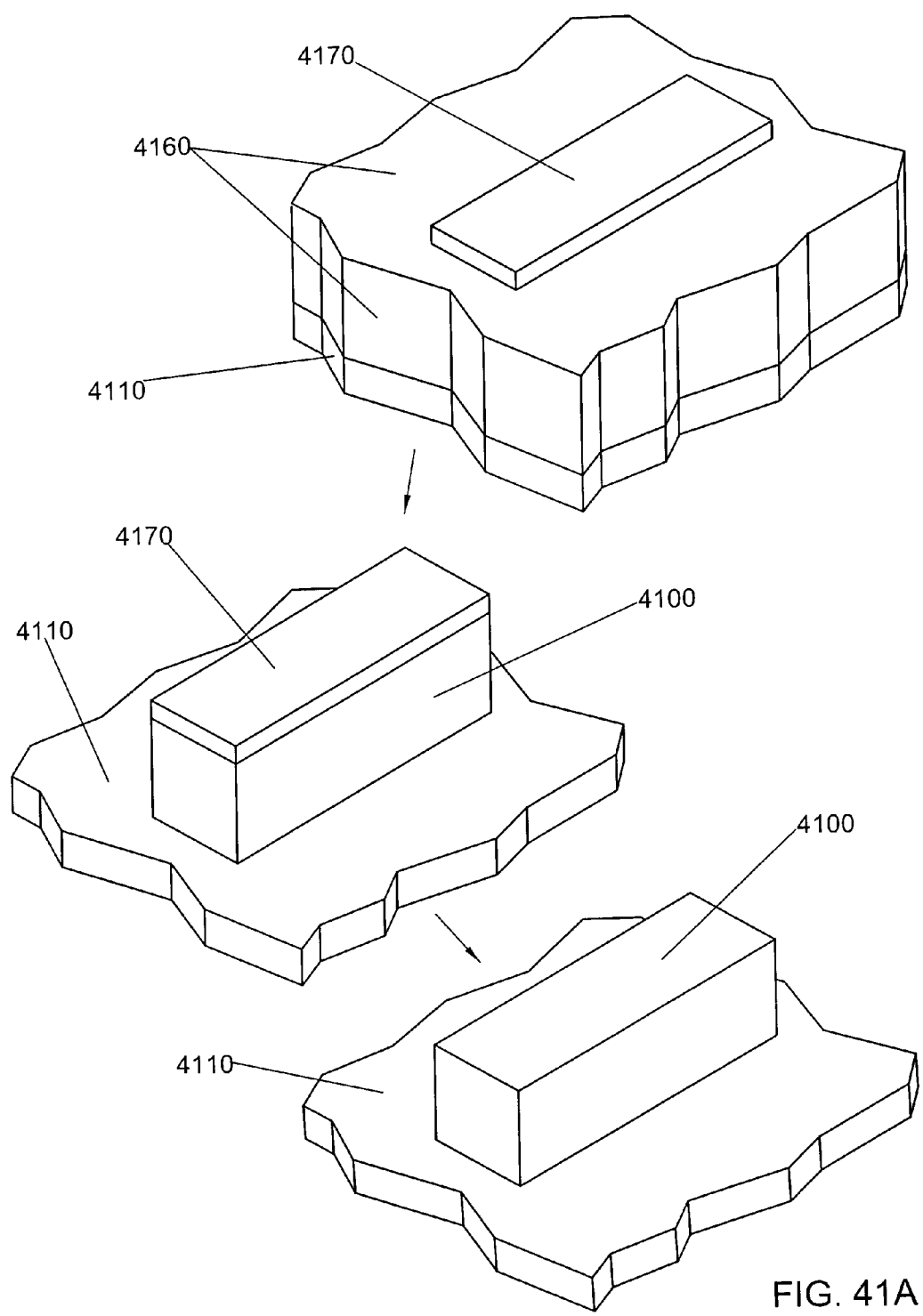
FIGS. 41A and 41B are process diagrams for horizontal fabrication of a waveguide of the present invention.
Figure 41B:
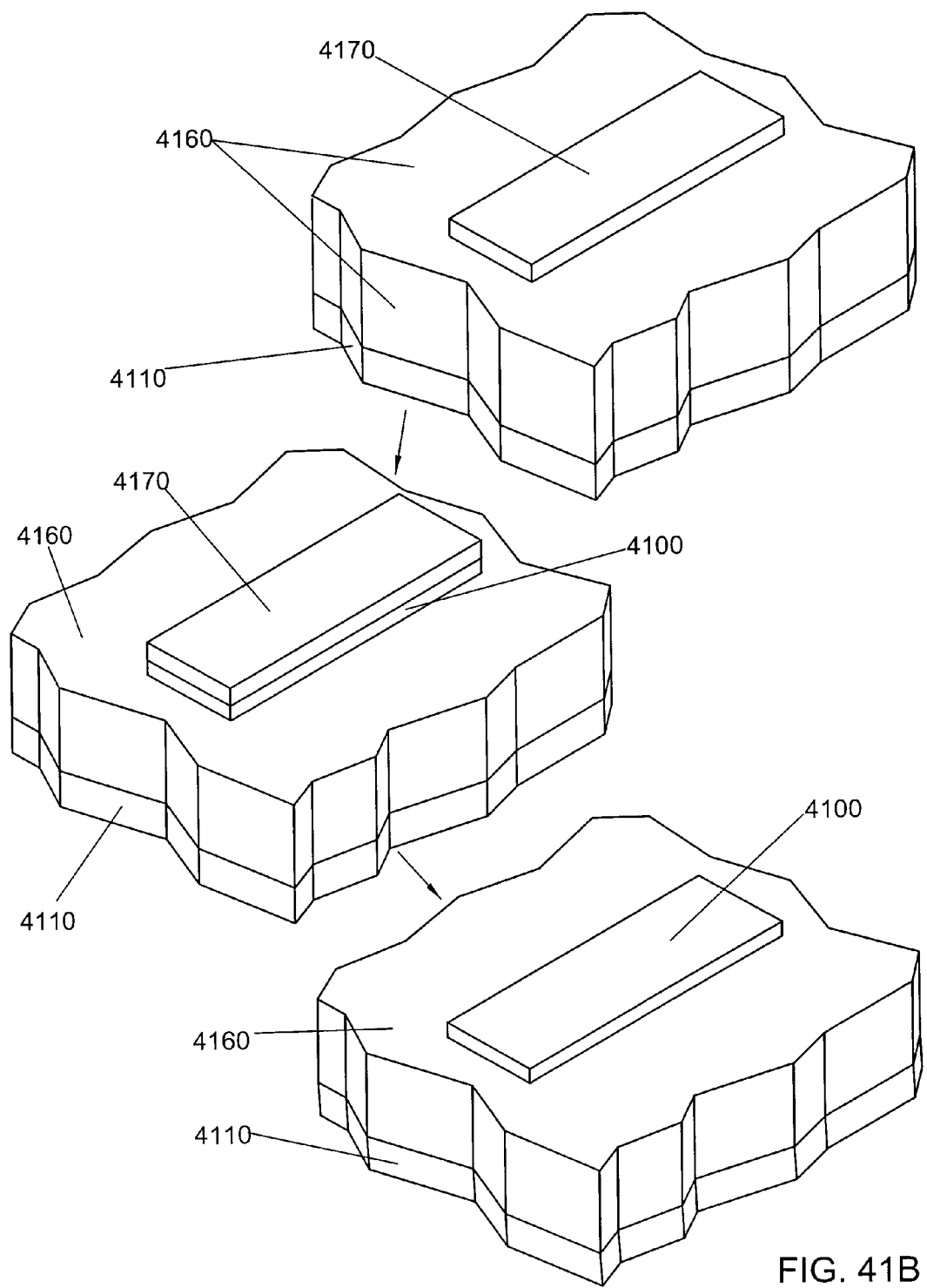
Figure 42A:
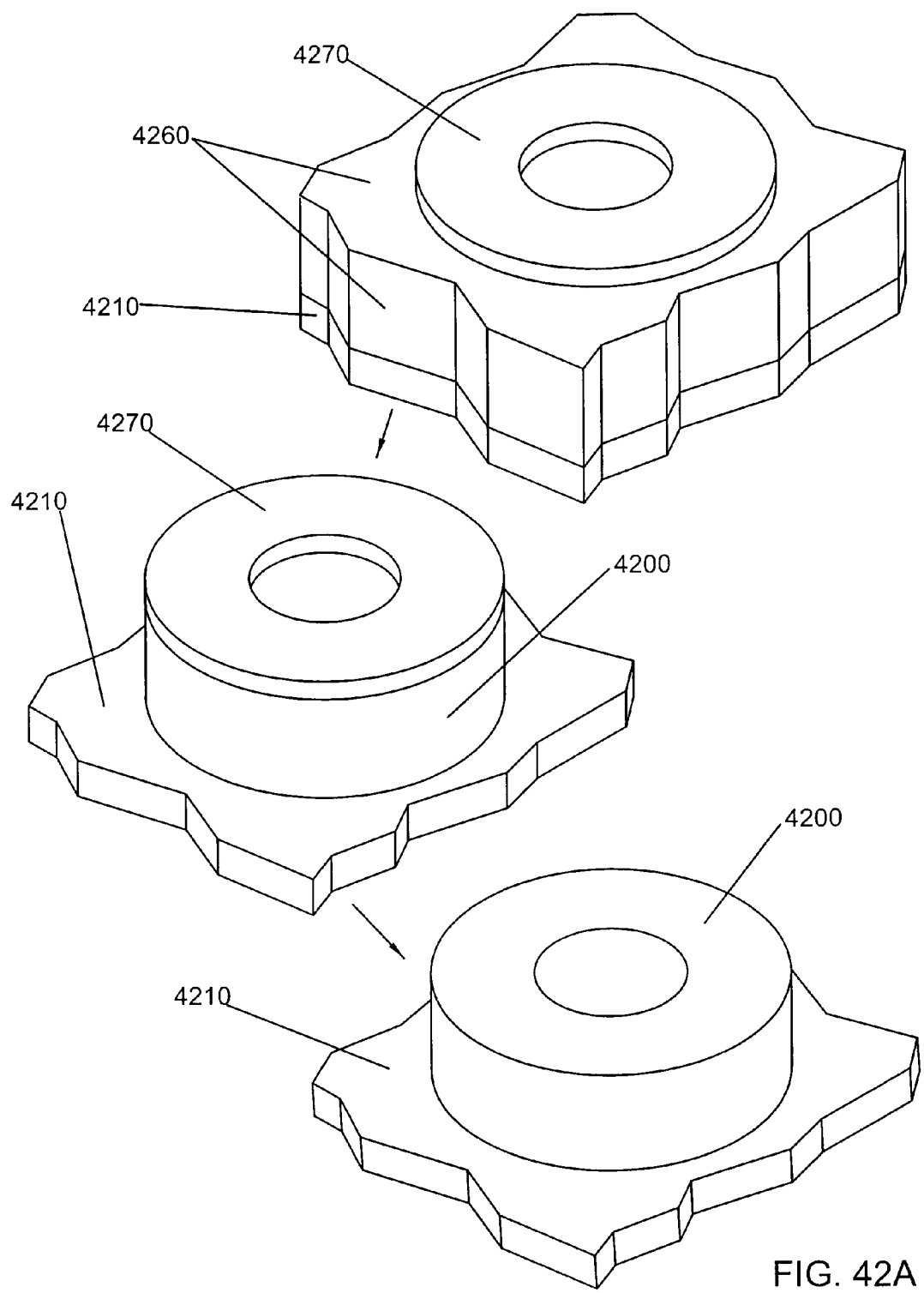
FIGS. 42A and 42B are process diagrams for horizontal fabrication of a resonator of the present invention.
Figure 42B:
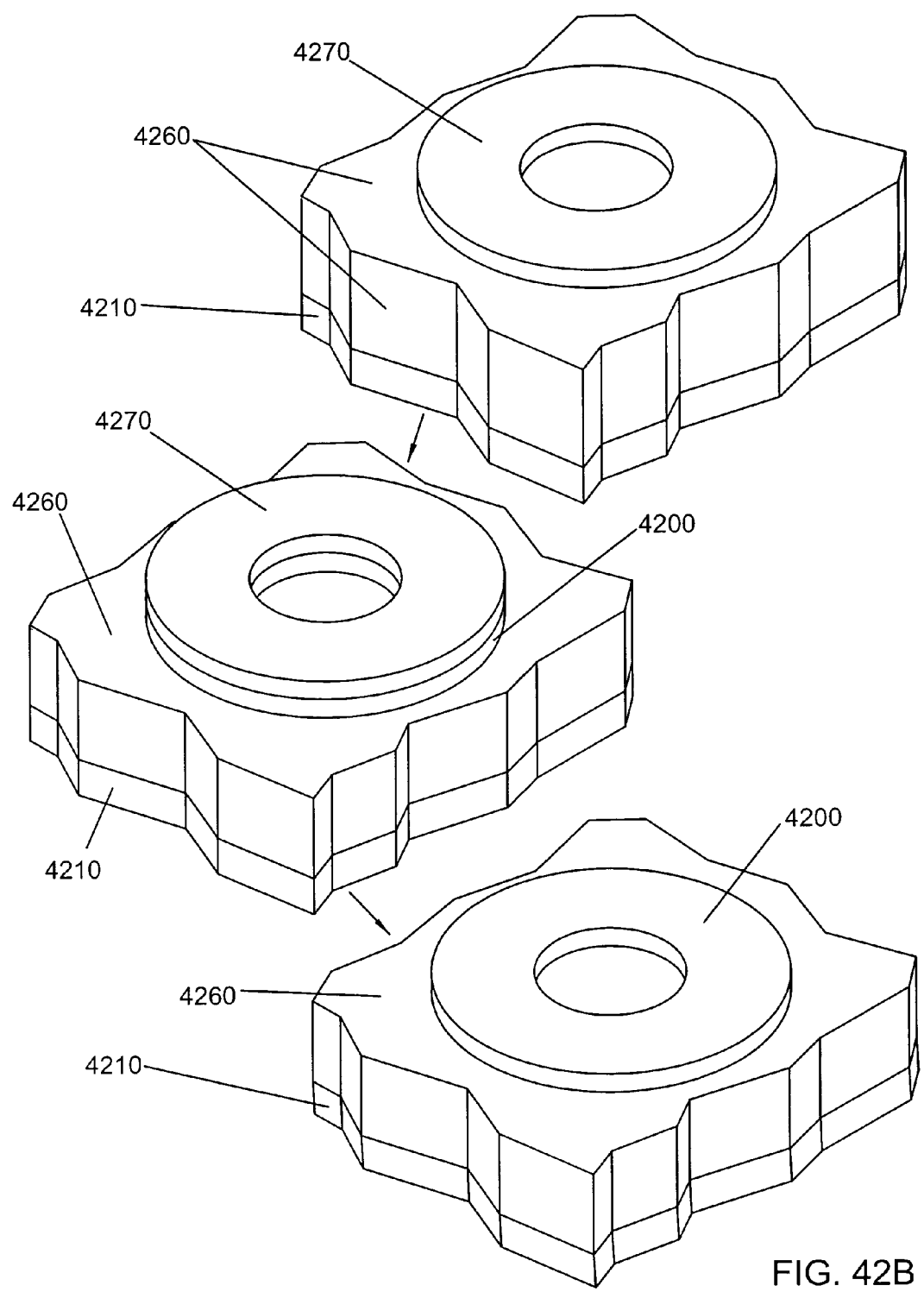
Figure 43A:
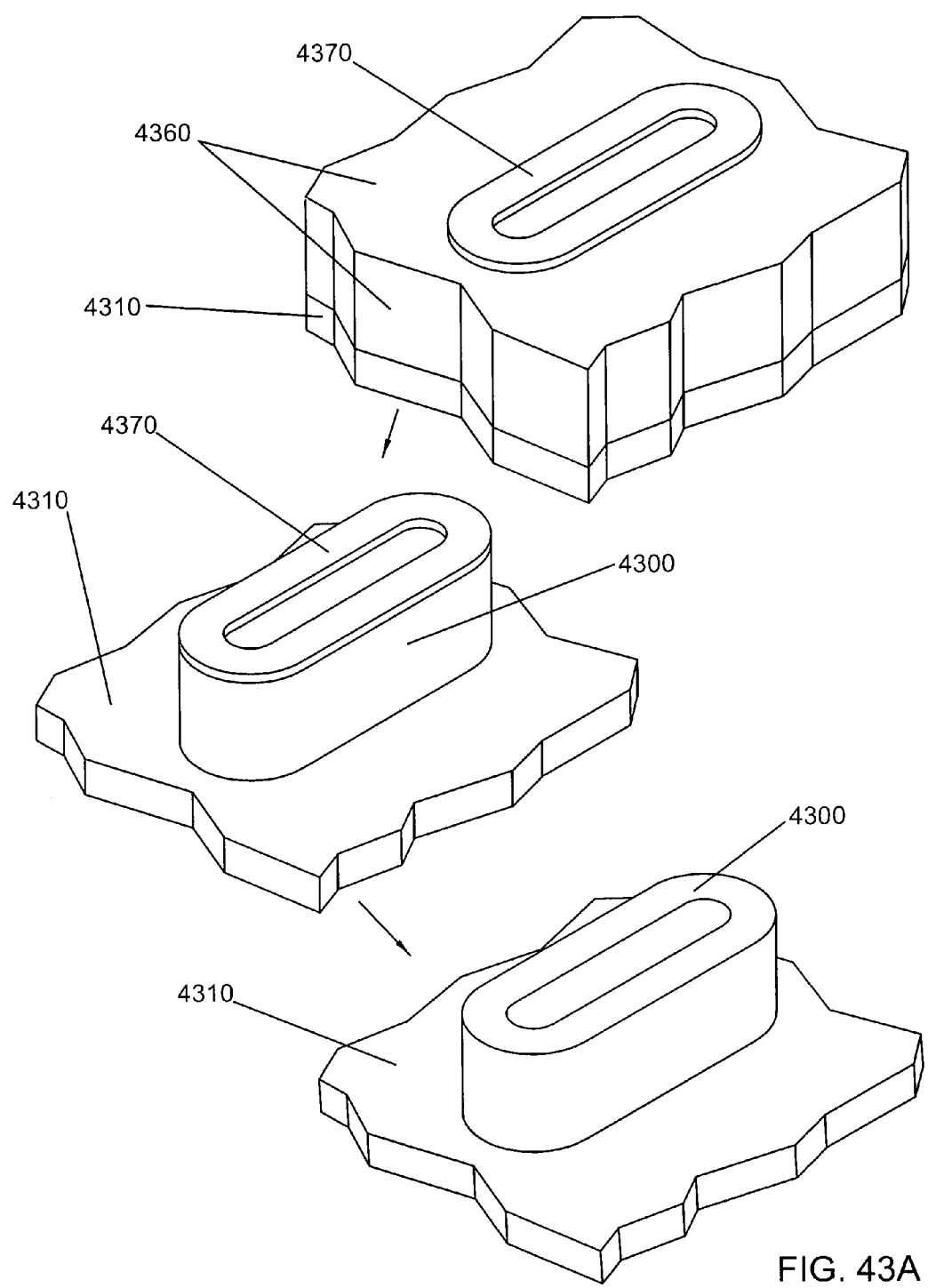
FIGS. 43A and 43B are process diagrams for horizontal fabrication of a resonator of the present invention.
Figure 43B:
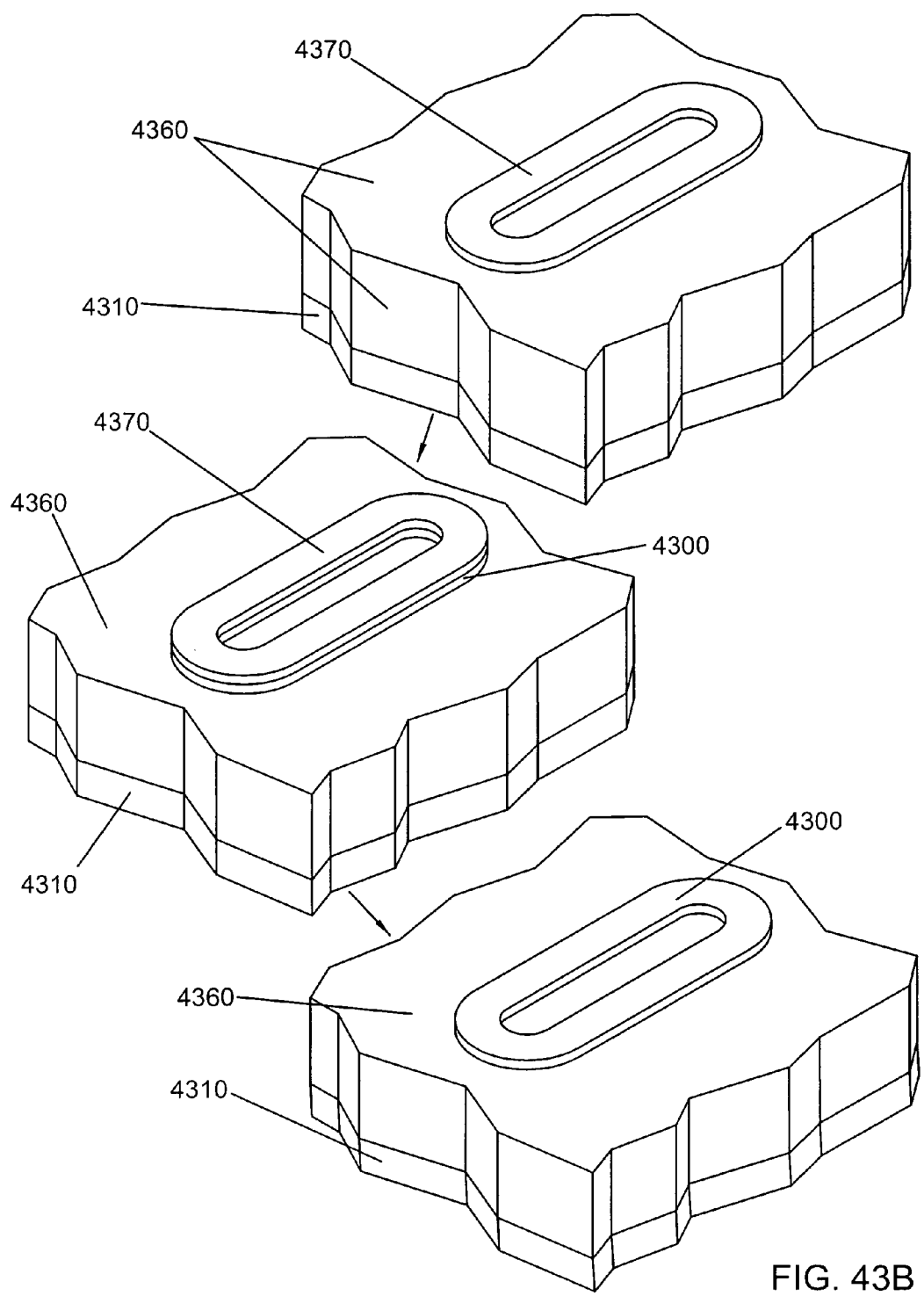

In FIG. 41A, a substrate 4110 is shown with a multi-layer structure 4160 thereon and a mask layer 4170. Mask 4170 may be deposited and spatially patterned by any suitable technique, including but not limited to lithographic techniques. The spatial pattern of mask 4170 is determined by the size, shape, and topology desired for the waveguide or resonator to be produced, and in this example mask 4170 is configured to yield a simple linear waveguide segment 4100. The un-masked portions of multi-layer structure 4160 may be substantially completely removed by any suitable technique, including but not limited to dry and/or wet etching techniques. After removal of the un-masked portions of multi-layer 4160, mask 4170 may be removed, leaving waveguide 4100 on substrate 4110. Analogous procedures are illustrated in FIGS. 42A and 43A involving substrate 4210/4310, multi-layer 4260/4360, and mask 4270/4370 yielding resonator 4200/4300. It should be noted that as multi-layer 4160/4260/4360 is removed, laterally exposed portions of the multi-layer may come under attack during some etching procedures, and the size and shape of the resulting waveguide 4100/4200/4300 may be different than the initial size and shape of mask 4170/4270/4370 (slightly smaller and/or narrower, for example). Depending on the precise nature and sequence of layers of multi-layer 4160/4260/4360, and the presence/absence of etch-stop layers therein, more complex, stepped structures may be obtained. This may be advantageous for leaving portions of contact layers exposed for later electrical connection to a control signal source, for example, or for producing localized contact layers for applying localized control signals, or for producing a waveguide/resonator 4100/4200/4300 having optical properties that vary along its length, or for other purposes. It may be desirable to perform a series of deposition and/or wafer-bonding steps alternating with spatially-selective etch steps (i.e., intermingling the "vertical fabrication" and the "horizontal fabrication"), to obtain complex waveguide/resonator structures.

The multi-layer structure may be deep-etched (i.e., most or all of the way through the multi-layer structure down toward the substrate; FIGS. 41A, 42A, and 43A). In this case modes supported by the waveguide may be strongly laterally confined by the relatively large index contrast at the sides of the waveguide. Alternatively, a relatively shallow etch may be employed (FIGS. 41B, 42B, and 43B), removing material from only the top few layers (or even a portion of only one layer). The lateral optical confinement provided by such a shallow-etched waveguide is correspondingly weaker than that provided by a deep-etched waveguide. This may provide desirable optical performance characteristic for the resulting waveguide, such as support of fewer transverse optical modes than a deep-etched waveguide or reduced optical loss induced by etched surfaces, for example. The two sides of waveguide/resonator 4100/4200/4300 may each have material removed to the same depth, or to differing depths, as desired for fabricating specific devices.

The index contrast between the sides of the waveguide structure and the surrounding lower-index medium (examples given hereinabove) may provide lateral confinement of an optical mode supported by the waveguide/resonator structure (whether single-, dual-, or partial-dual-MLR). However, the etched side surfaces will often have substantial roughness and/or numerous defects due to the etching process, degrading the propagation characteristics and/or mode quality of a supported optical mode and/or degrading the Q-factor of an optical resonator. Also, the relatively large index contrast may give rise to undesirable multi-transverse-mode behavior. It may therefore be desirable to provide some or all of the layers of the multi-layer structure (either single- or dual-MLR structures) with lateral lower-index portions having a refractive index intermediate between the higher-index of the medial portion of the respective layer and the index of the surrounding medium (usually air, but possibly some other ambient over-layer). This may provide several advantages, including: 1) a supported optical mode may be confined by the index contrast between the higher-index medial portion and the lower-index lateral portions of the layers, thereby reducing and/or limiting the number of transverse optical modes supported by the waveguide and simplifying design and operation of devices incorporating the waveguide; 2) since it is guided by the higher-index medial portion of the waveguide, the supported optical mode may interact less with the etched lateral surfaces of the waveguide, thereby limiting the degradation produced by roughness and/or defects at the etched surface; 3) the processing required to provided a layer with lateral lower-index portions may also reduce the roughness and/or defect density at the etched lateral surface of the waveguide. It may be desirable to extend these lateral intermediate-index portions across the entire width of some layers of the multi-layer waveguide structure, to provide enhanced index contrast in the MLR stack(s). Greater index contrast in the MLR stacks may result in better vertical guiding/confinement of a supported optical mode using fewer layers.

Figure 44:
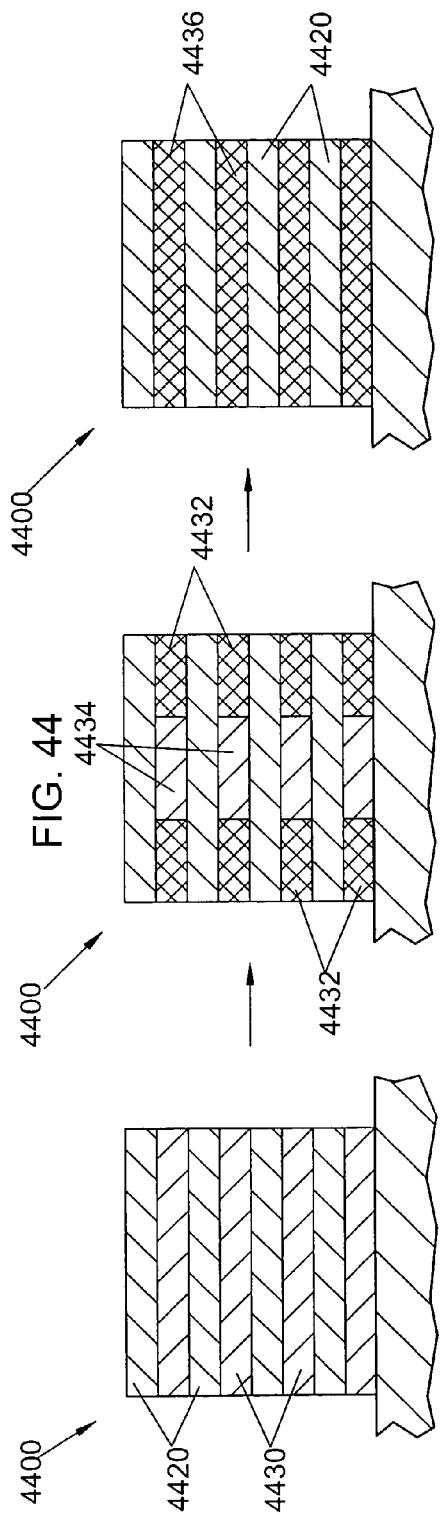
FIG. 44 is a process diagram for horizontal fabrication of a waveguide of the present invention.

Lateral lower-index portions may be readily provided in multi-layer waveguide structures (both single- and dual-MLR) fabricated using III–V semi-conductors and/or alloys, quantum wells, multi-quantum wells, and/or super-lattices thereof. These materials typically have indices between about 2.9 (AlAs) and about 3.4 (GaAs), with $Al_xGa_{1-x}As$ alloys falling between these extremes. III–V materials having substantial aluminum content may be readily oxidized to aluminum oxides ($Al_xO_y$), having indices between about 1.5 and about 1.7. This may be exploited, for example, by fabricating a MLR stack from alternating layers of GaAs 4420 and high-aluminum AlGaAs 4430 ($Al_{0.98}Ga_{0.02}As$), as shown in FIG. 44. After vertical and horizontal fabrication to produce a protruding DBR waveguide structure 4400, the wafer may be oxidized by (for example) bubbling $N_2$ through water at 85° C. and then passing the $N_2$ over the waveguide in a furnace at 425° C. The aluminum-containing layers 4430 are preferentially oxidized at a rate of about 1 µm/min (depending on layer thickness, aluminum content, and so forth), and the oxidation proceeds from the exposed edge of each aluminum-containing layer 4430 inward (process referred to hereinafter as "lateral oxidation"). Depending on the oxidation time, layer thickness, layer aluminum content, and so forth, the oxidized layer may have lateral aluminum oxide portions 4432 surrounding a central AlGaAs portion 4434. If the oxidation is permitted to proceed long enough, the entire layer may be converted to an aluminum oxide layer 4436, providing a much higher material index contrast MLR (about 1.5 to 3.4) than the original MLR layer structure (about 2.9 to 3.4). It should be noted that lateral oxidation or other lateral chemical modification of any MLR layers may proceed form one or both sides of a waveguide structure.

It should be noted that the desired thickness of layers 4430 (AlGaAs) depends on whether the oxidation is used to produce lateral oxide portions 4432 or full oxide layers 4436. If lateral oxide portions 4432 are to be produced, then the desired quarter-wave thickness for medial portions 4434 is determined based on the design wavelength and material index for the AlGaAs alloy being used, and this thickness is provided during vertical fabrication of the wafer from which MLR 4400 is made. If full aluminum oxide layers 4436 are to be produced, the desired quarter-wave thickness is determined based on the design wavelength and the material index of the aluminum oxide. This oxide-index-based thickness is provided for the AlGaAs layers 4430 during vertical fabrication of the wafer. As an example, at a design wavelength of about 1500 nm, AlGaAs layers 4430 should be about 130 nm thick to yield quarter-wave medial AlGaAs portions 4434, but should be about 270 nm thick to yield quarter-wave aluminum oxide layers 4436.

Figure 45:
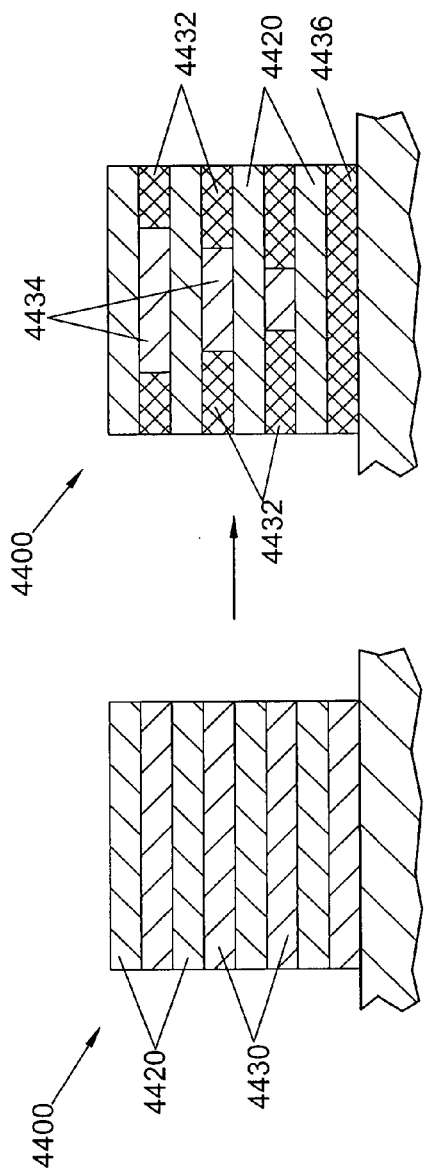
FIG. 45 is a process diagram for horizontal fabrication of a waveguide of the present invention.
Figure 46:
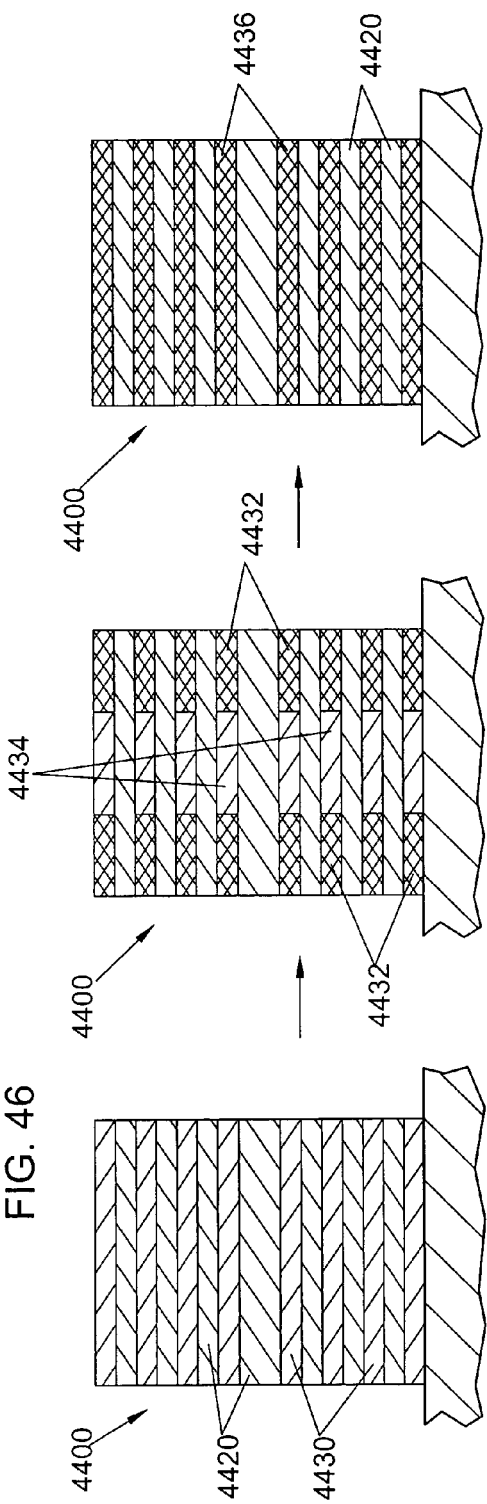
FIG. 46 is a process diagram for horizontal fabrication of a waveguide of the present invention.
Figure 47:
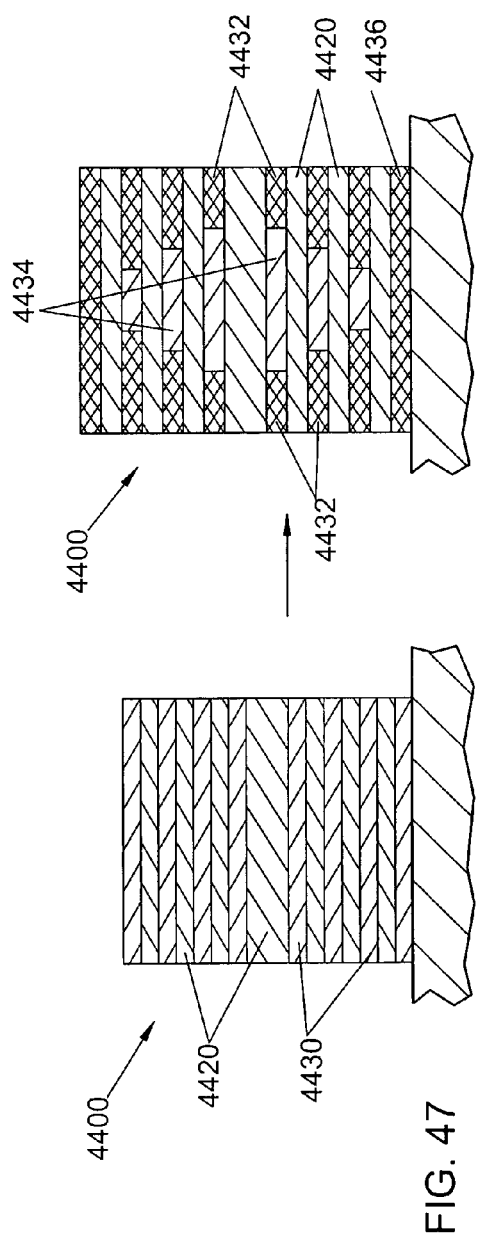
FIG. 47 is a process diagram for horizontal fabrication of a waveguide of the present invention.

FIG. 45 shows a further refinement of the lateral oxidation scheme outlined above, wherein the Al concentration of AlGaAs layers 4430 varies, decreasing with each additional AlGaAs layer 4430 added during vertical fabrication of the wafer. The lateral oxidation rate increases with increasing Al content, so that for a given oxidation time the vertically tapered MLR of FIG. 45 results, which may or may not include one or more full oxide layers 4436. (In general, the lateral oxidation rate depends on the thickness of the layer, the chemical composition of the surrounding layers, and the Al content. However, in the present circumstances, only the Al content can be independently varied.) FIGS. 46 and 47 show dual-MLR structures analogous to FIGS. 44 and 45, respectively. The transverse waveguide geometries shown in FIGS. 44 through 47 each have desirable optical characteristics. The medial AlGaAs/GaAs MLR's of FIGS. 43–47 have the advantage of horizontally confining and guiding a supported optical mode away from lateral edges of waveguide 4300 and any roughness and/or defects thereon. The higher index contrast of the GaAs/$Al_xO_y$ MLR's of FIGS. 44 and 46 enables vertical confinement and guiding of a supported optical mode using fewer MLR layers. The vertically tapered AlGaAs/GaAs MLR's of FIGS. 45 and 47 may better serve to horizontally confine and guide the optical mode.

Both improved horizontal confinement (away from potentially poor optical quality lateral waveguide surfaces), and vertical confinement with fewer layers of a higher contrast MLR, may be achieved simultaneously in a waveguide structure. As in the process of FIGS. 45 and 47, differential oxidation rates may be exploited to achieve various desired transverse layer geometries. As before, a given layer thickness provided during vertical fabrication of a wafer is determined by the design wavelength and the index of the material that eventually comprises the layer, not necessarily the index of the material deposited. In general, oxidation rates of III–V semi-conductors increase with increasing aluminum content. A MLR wafer may be fabricated from alternating layers of $Al_{0.98}Ga_{0.02}As$ 4530 and $Al_{0.96}Ga_{0.04}As$ 4520 (FIG. 48). Following horizontal processing to form a protruding structure 4500, lateral oxidation may be initiated and permitted to proceed until each entire $Al_{0.98}Ga_{0.02}As$ layer 4530 has been converted to a substantially complete aluminum oxide layer 4536, while a medial portion 4524 of each $Al_{0.96}Ga_{0.04}As$ layer 4520 remains, flanked by lateral aluminum oxide portions 4522. The resulting waveguide structure then comprises a high-index-contrast central DBR portion ($Al_{0.96}Ga_{0.4}As/Al_xO_y$; about 2.9 to about 1.5) surrounded laterally by a lower-index medium ($Al_xO_y$; about 1.5). As the oxidation of layers 4520 and 4530 progresses, medial portion 4524 may come under attack and begin to oxidize from above and below. Some experimentation may be required to determine, for a given set of layer compositions and oxidation conditions, the appropriate thicknesses for layers 4520 and 4530 to achieve the desired thicknesses for layers 4536 and 4524. Other material combinations may be amenable to a scheme similar to that of FIG. 48. Layers 4520 and 4530 may comprise quarter-wave layers of AlAs/InAs superlattice material, for example, with the AlAs fraction of layers 4530 being higher than the AlAs fraction of layers 4520. The after horizontal fabrication to form ridge waveguide 4500, lateral oxidation may be employed to produce $Al_xO_y$ layers 4536 (from substantially complete oxidation of layers 4530) alternating with layers having AlAs/InAs superlattice medial portion 4524 and lateral $Al_xO_y$ portions 4522. During vertical fabrication of the wafer, the thicknesses provided for layers 4520 and 4530 are chosen to yield the desired thicknesses for layers 4536 and 4524. For both of these schemes (and functionally equivalent schemes using other material combinations), the lower-index aluminum oxide lateral portions 4522 of the resulting DBR waveguide laterally confine a supported optical mode away from the lateral surfaces of waveguide 4500, while the high index contrast of medial AlAs/InAs portions 4524 and aluminum oxide layers 4536 provide vertical confinement with fewer DBR layers.

It may be desirable to provide asymmetric lateral lower-index portions of layers of a waveguide. This may be the case, for example, when a dual-DBR waveguide will be used for transverse-coupling to another optical element on only one side of the waveguide. As shown in FIGS. 49 and 50, wider lower-index lateral portions 4622 may be provided on the non-coupling side of the waveguide 4600, thereby reducing or substantially eliminating any evanescent portion of a waveguide optical mode extending beyond the non-coupling side of the waveguide. Narrower lateral portions 4624 may be provided on the coupling side of the waveguide 4600, thereby enabling an evanescent portion of an optical mode guided by medial higher-index medial portions 4620 to extend beyond the coupling side of waveguide 4600. The differing widths may be achieved by masking the coupling side of waveguide 4600 during a portion of the lateral oxidation process, reducing the extent to which the oxidation progresses across the layers from the coupling side of waveguide 4600.

It may be desirable to ensure that the lateral oxidation proceeds from one side of the waveguide only, so as to avoid material defects that may arise when counter-propagating oxidation fronts meet within a waveguide structure along a boundary layer or interface. A shallow etch may be performed to provide lateral optical confinement for the waveguide structure. A deeper etch may be done farther away (i.e., far enough so as to substantially eliminate interaction between the supported optical mode and the deep-etched side surface). Lateral oxidation may then proceed from the deep-etched side across the waveguide in only one direction, with no boundary layer or interface being formed.

Specific examples of combinations of materials for fabricating active optical waveguides and resonators will now be discussed, along with advantages and limitations of each and wavelength ranges over which each might be suitable. Each combination may be used to fabricate single-, dual-, and/or partial dual MLR waveguides and resonators. Some material combinations may be suitable for both single- and multi-substrate vertical fabrication, while others may only be suitable for multi-substrate vertical fabrication. These examples may be preferred combinations for particular uses and/or applications, but should not be construed as limiting the scope of inventive concepts disclosed and/or claimed herein. Other combinations of materials satisfying the general structural and functional criteria set forth herein may be employed without departing from inventive concepts disclosed and/or claimed herein.

Preferred electro-active (i.e., electro-absorptive and/or electro-optic) or non-linear-optical materials for use in waveguides and resonators according to the present invention may be quantum-well (QW) and multi-quantum-well (MQW) materials. A quantum well typically comprises a thin layer of a lower bandgap material sandwiched between barrier layers of a higher bandgap material. Thin is defined here as sufficiently thin that the effective bandgap of the quantum well differs from the bulk bandgap of the lower bandgap material due to spatial confinement effects, and typical quantum well layers may be on the order of 1–20 nm thick. The optical properties of such quantum wells may be tailored to a certain degree by the composition of the materials used (selected for bandgap, index, etc.), and may be actively controlled by application of a control electric field to a greater degree than bulk semiconductor materials. In particular, a quantum well may function as an electro-absorptive and/or an electro-optic material, via the quantum-confined Stark effect (QCSE), the Franz-Keldysh effect (FKE), the quantum-confined Franz-Keldysh effect (QCFKE), and/or other mechanisms. The use of multiple quantum well layers separated by barrier layers (on the order of tens of nanometers thick) yields a multi-quantum-well material, wherein the electro-absorptive and/or electro-optic properties of the individual quantum well layers are additive. The quantum well and barrier layers are sufficiently thin that for optical wavelengths typically used in the waveguides and resonators of the present invention, the optical mode behaves substantially as if the multi-quantum-well layer were a uniform layer having an index equal to the average index of the layers of the multi-quantum well.

An exemplary waveguide or resonator according to the present invention may include a MLR stack(s) comprising alternating quarter-wave layers of GaAs (index of about 3.5) and $Al_xGa_{1-x}As$ (index between about 2.9 and 3.4). The aluminum fraction x may lie between about 0.8 and 1.0, preferably between about 0.9 and 1.0, most preferably between about 0.92 and about 0.98. The fabrication of high optical quality DBR stacks with this material combination is technologically mature and well characterized. A core layer may preferably comprise GaAs, InGaAs, or AlGaAs, and doped GaAs, InGaAs, or AlGaAs may preferably be used for electrical contact layers. Either p-type of n-type doping may be used for the contact layers, and delta doping may be preferred. Buffer, cladding, and/or etch-stop layers, if present, may preferably comprise GaAs, and the waveguide may preferably rest on a GaAs substrate (which may possibly be doped to serve as the bottom contact layer). Other suitable materials may be equivalently employed for the substrate and/or the core, buffer, cladding, and/or etch-stop layers.

For a single-substrate vertical fabrication of a single- or dual-MLR device using GaAa/AlGaAs MLR stack(s), a multi-quantum-well material comprising GaAs quantum well layers and $Al_xGa_{1-x}As$ barrier layers may be employed as the electro-active material. This MQW material is lattice-compatible with the GaAs/AlGaAs MLR stack(s), thereby enabling single-substrate vertical fabrication. The wavelength range over which the useful electro-absorptive and/or electro-optic properties of this MQW material may extend is from about 0.7 µm to about 0.8 µm, which determines the possible design wavelengths for the waveguide and the corresponding quarter-wave thicknesses for the MLR stack layers. The MQW material may comprise the entire core layer (FIGS. 15–16 and 29–30), or may comprise a separate layer (FIGS. 17–18 and 27–28). Waveguides of these compositions may be further processed by lateral oxidation of the AlGaAs layers, as shown in FIGS. 44–47 and 49, thereby providing lateral aluminum oxide portions having a lower index (about 1.5–1.7) than the medial AlGaAs portions and confining a supported optical mode away from the lateral edges of the waveguide. Permitting lateral oxidation to proceed until substantially complete oxidation of the AlGaAs MLR stack layers (FIGS. 44, 46 and 50) results in a higher index contrast $GaAs/Al_xO_y$ MLR stack (about 3.4 to about 1.5). In this and other cases where an entire quarter-wave layer is converted by lateral oxidation, the quarter-wave layer thickness for the initial material deposited must be determined based on the index of the final material present after lateral processing (oxidation or otherwise).

For a single-substrate vertical fabrication of a single- or dual-MLR device using GaAa/AlGaAs MLR stack(s), a multi-quantum-well material comprising GaAs quantum well layers and $Al_xGa_{1-x}As$ barrier layers may be employed as the electro-active material in place of one or more layers of a MLR stack. This MQW material is lattice-compatible with the GaAs/AlGaAs MLR stack(s), thereby enabling single-substrate vertical fabrication. The wavelength range over which the useful electro-absorptive and/or electro-optic properties of this MQW material may extend is from about 0.7 µm to about 0.8 µm, which determines the possible design wavelengths for the waveguide and the corresponding quarter-wave thicknesses for the MLR stack layers. The MQW material may comprise one or more layers of the MLR stack(s) (FIGS. 19–20 and 31–34). Waveguides of these compositions may be further processed by lateral oxidation of the AlGaAs and/or GaAs/AlGaAs MQW layers, as shown in FIGS. 44–47 and 49, thereby providing lateral aluminum oxide portions having a lower index (about 1.5–1.7) than the medial AlGaAs and/or MQW portions and confining a supported optical mode away from the lateral edges of the waveguide. Permitting lateral oxidation to proceed until substantially complete oxidation of some of the MLR stack layers (FIGS. 44, 46, and 50) results in a higher index contrast $GaAs/Al_xO_y$ MLR stack (about 3.4 to about 1.5). In this and other cases where an entire quarter-wave layer is converted by lateral oxidation, the quarter-wave layer thickness for the initial material deposited must be determined based on the index of the final material present after lateral processing (oxidation or otherwise).

For a single-substrate vertical fabrication of a single- or a dual-MLR device using GaAa/AlGaAs MLR stack(s), a multi-quantum-well material comprising GaAs or AlGaAs barrier layers and $In_xGa_{1-x}As$ quantum well layers may be employed as the electro-active material. This MQW material is lattice-compatible with the GaAs/AlGaAs MLR stack(s), thereby enabling single-substrate vertical fabrication. The wavelength range over which the useful electro-absorptive and/or electro-optic properties of this MQW material may extend is from about 0.9 µm to about 1.1 µm, which determines the possible design wavelengths for the waveguide and the corresponding quarter-wave thicknesses for the MLR stack layers. The MQW material may comprise the entire core layer (FIGS. 15–16 and 29–30), or may comprise a separate layer (FIGS. 17–18 and 27–28). Waveguides of this configuration may be further processed by lateral oxidation of the AlGaAs layers, as shown in FIGS. 44–47 and 49, thereby providing lateral aluminum oxide portions having a lower index (about 1.5–1.7) than the medial AlGaAs portions and confining a supported optical mode away from the lateral edges of the waveguide. Permitting lateral oxidation to proceed until substantially complete oxidation of the AlGaAs MLR stack layers (FIGS. 44, 46, and 50) results in a higher index contrast $GaAs/Al_xO_y$ DBR stack (about 3.4 to about 1.5). In this and other cases where an entire quarter-wave layer is converted by lateral oxidation, the quarter-wave layer thickness for the initial material deposited must be determined based on the index of the final material present after lateral processing (oxidation or otherwise).

For a single-substrate vertical fabrication of a single- or dual-MLR device using GaAa/AlGaAs DBR stack(s), a multi-quantum-well material comprising GaAs or AlGaAs barrier layers and $In_xGa_{1-x}As_{1-y}N_y$ quantum well layers may be employed as the electro-active material. The fraction x may range between about 0.05 and about 0.30, preferably between about 0.1 and about 0.3, and most preferably about 0.15. The fraction y may range between about 0.001 and about 0.04, preferably about 0.02. This MQW material is lattice-compatible with the GaAs/AlGaAs MLR stack(s), thereby enabling single-substrate vertical fabrication. The wavelength range over which the useful electro-absorptive and/or electro-optic properties of this MQW material may extend is from about 1.1 µm to about 1.45 µm (at about y=0.02) and may be extended with further development. This wavelength range determines the possible design wavelengths for the waveguide and the corresponding quarter-wave thicknesses for the MLR stack layers. The MQW material may comprise the entire core layer (FIGS. 15–16 and 29–30), or may comprise a separate layer (FIGS. 17–18 and 27–28). Waveguides of this configuration may be further processed by lateral oxidation of the AlGaAs layers, as shown in FIGS. 44–47 and 49, thereby providing lateral aluminum oxide portions having a lower index (about 1.5–1.7) than the medial AlGaAs portions and confining a supported optical mode away from the lateral edges of the waveguide. Permitting lateral oxidation to proceed until substantially complete oxidation of the AlGaAs MLR stack layers (FIGS. 44, 46, and 50) results in a higher index contrast GaAs/$Al_xO_y$ MLR stack (about 3.4 to about 1.5). In this and other cases where an entire quarter-wave layer is converted by lateral oxidation, the quarter-wave layer thickness for the initial material deposited must be determined based on the index of the final material present after lateral processing (oxidation or otherwise).

A waveguide or resonator according to the present invention may include a MLR stack(s) comprising alternating quarter-wave layers of $Al_{0.96}Ga_{0.04}As$ (index of about 2.9 to 3.0) and $Al_yO_z$ (index between about 1.5 and 1.7). The MLR stack layers deposited during vertical fabrication (FIGS. 15–18 and 27–30) comprise alternating layers of $Al_{0.96}Ga_{0.04}As$ (quarter-wave thickness based on an index of about 3.0) and $Al_{0.98}Ga_{0.02}As$ (quarter-wave thickness based on an index of about 1.6), for example. Other aluminum fractions may be equivalently employed, including AlAs, and the aluminum fraction of the lower-aluminum layers may vary with distance from the substrate, yielding a tapered waveguide structure. The electro-active layer may comprise any of the MQW materials listed thus far (GaAs/AlGaAs, GaAs/InGaAs, GaAs/InGaAsN). Lateral oxidation of the waveguide proceeds more rapidly in the AlGaAs MLR layers having the higher Al content. The lateral oxidation is allowed to proceed just to completion in the $Al_{0.98}Ga_{0.02}As$ MLR layers, thereby leaving medial portions of $Al_{0.96}Ga_{0.04}As$ between lateral $Al_xO_y$ portions in the $Al_{0.96}Ga_{0.04}As$ layers (FIGS. 48 and 50). The resulting MLR stack comprises low-index quarter-wave aluminum oxide layers alternating with layers having a high-index quarter-wave $Al_{0.96}Ga_{0.04}As$ medial portion surrounded by low-index aluminum oxide lateral portions. A core layer may preferably comprise one of the electro-active MQW materials, GaAs, or AlGaAs, and doped GaAs or InGaAs may preferably be used for electrical contact layers. Either p-type of n-type doping may be used for the contact layers, and delta doping may be preferred. Buffer, cladding, and/or etch-stop layers, if present, may preferably comprise GaAs or AlGaAs, and the waveguide may rest on a GaAs or AlGaAs substrate. Other suitable materials may be equivalently employed for the substrate and/or the core, buffer, cladding, and/or etch-stop layers.

For operation in the 1.2 µm to 1.7 µm region, InGaAsP MQW material grown on an InP substrate is the best characterized and most technologically mature material available for use as an electro-optic and/or electro-absorptive layer. The bulk bandgap of the InGaAsP material may be varied over this wavelength range by varying the stoichiometry. Quantum well layers about 10 nm thick with a 1.6 µm bulk bandgap separated by barrier layers about 20 nm thick with a 1.2 µm bulk bandgap may provide desirable electro-optic and/or electro-absorptive behavior at an operating wavelength of about 1.5 µm, for example. Other bandgaps and/or layer thicknesses may be equivalently employed. Unfortunately, the lattice properties of InGaAsP are not sufficiently compatible with those of the GaAs/AlGaAs system to enable single-substrate vertical fabrication of sufficiently low-strain and/or defect-free waveguide structures. Multi-substrate vertical fabrication may be employed, however, to produce such structures, as illustrate in FIGS. 21–26 and 35–40. The MLR stack(s) (GaAs/AlGaAs, GaAs/$Al_xO_y$, or AlGaAs/$Al_xO_y$) may be deposited onto GaAs or equivalent substrate(s), for example, while the InGaAsP MQW may be deposited onto an InP or equivalent substrate. The InGaAsP MQW may be wafer-bonded over the MLR, and the InP substrate may then be etched away, yielding a single-MLR structure. A second MLR may be wafer-bonded over the MQW layer and the corresponding GaAs substrate etched away, yielding a dual-MLR structure. In this way the desired wavelength-dependent electro-optic and/or electro-absorptive properties may be incorporated into the waveguide despite the lack of lattice compatibility of the required materials.

Alternatively, the MLR stack(s) may be fabricated using materials that are lattice-compatible with the InGaAsP MQW system. A waveguide or resonator according to the present invention may include MLR stack(s) comprising alternating quarter-wave layers of InP (index of about 3.4) and aluminum oxide (index about 1.55 at 1.5 µm). The MLR stack deposited during vertical fabrication (FIGS. 15–18 and 27–30) initially comprises alternating layers of InP (quarter-111 wave thickness based on an index of about 3.4) and $Al_xIn_{1-x}As$ (quarter-wave thickness based on an index of about 1.55), for example. The aluminum fraction may vary between about 0.5 and about 1.0, preferably between about 0.8 and about 1.0. AlAs/InAs super-lattice material (of substantially the same average composition) may be employed instead of AlInAs. Lateral oxidation of the waveguide results in substantially complete conversion of the AlInAs layers to aluminum oxide (as in FIGS. 44 and 46), thereby yielding a MLR stack comprising alternating quarter-wave layers of high-index InP and low-index aluminum oxide. A waveguide core layer may preferably comprise InP, and doped InGaAs or InGaAsP may preferably be used for electrical contact layers. Either p-type of n-type doping may be used for the contact layers, and delta doping may be preferred. Buffer, cladding, and/or etch-stop layers, if present, may preferably comprise InP, InGaAs, or InGaAsP, and the waveguide may rest on an InP substrate.

Other suitable materials may be equivalently employed for the substrate and/or the core, buffer, cladding, and/or etch-stop layers.

For a single-substrate vertical fabrication of a single- or dual-MLR device using InP/Al$_x$O$_y$ MLR stack(s), a multi-quantum-well material comprising higher-bandgap InGaAsP barrier layers and lower bandgap InGaAsP quantum well layers may be employed as the electro-active material. This MQW material is lattice-compatible with the InP/AlInAs MLR stack(s) initially deposited, thereby enabling single-substrate vertical fabrication. The wavelength range over which the useful electro-absorptive and/or electro-optic properties of this MQW material may extend is from about 1.2 µm to about 1.7 µm, which determines the possible design wavelengths for the waveguide and the corresponding quarter-wave thicknesses for the MLR stack layers. The MQW material may comprise the entire core layer (FIGS. 15–16 and 29–30), or may comprise a separate layer (FIGS. 17–18 and 27–28). Waveguides of these compositions are further processed by lateral oxidation of the AlInAs layers, as shown in FIGS. 44 and 46, thereby producing a high index contrast InP/Al$_x$O$_y$ MLR stack (about 3.2 to about 1.5). In this and other cases where an entire quarter-wave layer is converted by lateral oxidation, the quarter-wave layer thickness for the initial material deposited must be determined based on the index of the final material present after lateral processing (oxidation or otherwise).

For a single-substrate vertical fabrication of a single- or dual-MLR device using InP/Al$_x$O$_y$ MLR stack(s), a multi-quantum-well material comprising higher-bandgap InGaAsP barrier layers and lower bandgap InGaAsP quantum well layers may be employed as the electro-active material in place of one or more layers of a MLR stack. This MQW material is lattice-compatible with the InP/AlInAs MLR stack(s) initially deposited, thereby enabling single-substrate vertical fabrication. The wavelength range over which the useful electro-absorptive and/or electro-optic properties of this MQW material may extend is from about 1.2 µm to about 1.7 µm, which determines the possible design wavelengths for the waveguide and the corresponding quarter-wave thicknesses for the MLR stack layers. The MQW material may comprise one or more layers of the MLR stack(s) (FIGS. 19–20 and 31–34). Waveguides of these compositions are further processed by lateral oxidation of the AlInAs layers (if present), as shown in FIGS. 44 and 46, thereby producing a high index contrast InP/Al$_x$O$_y$ MLR stack (about 3.2 to about 1.5). In this and other cases where an entire quarter-wave layer is converted by lateral oxidation, the quarter-wave layer thickness for the initial material deposited must be determined based on the index of the final material present after lateral processing (oxidation or otherwise).

A waveguide or resonator according to the present invention may include a MLR stack(s) comprising alternating quarter-wave layers of Al$_x$In$_{1-x}$As (index of about 3.2) and Al$_y$O$_z$ (index between about 1.5 and 1.7). The MLR stack layers deposited during vertical fabrication (FIGS. 15–18 and 27–30) comprise alternating layers of Al$_x$In$_{1-x}$As (quarter-wave thickness based on an index of about 3.2) and Al$_{x'}$In$_{1-x'}$As (quarter-wave thickness based on an index of about 1.6), with x<x'. The fraction x may range from about 0.8 to about 0.9, while x' may range between about 0.9 and about 1.0. Alternatively, AlAs/InAs super-lattice layers may be employed having relative AlAs and InAs sub-layer thicknesses yielding average Al/In fractions of x/1−x and x'/1−x' for the initially deposited MLR layers. In either case (AlInAs or AlAs/InAs super-lattices), the aluminum fraction x of the lower-aluminum layers may vary with distance from the substrate, yielding a tapered waveguide structure. The electro-active layer may comprise InGaAsP MQW materials as described hereinabove. Lateral oxidation of the waveguide proceeds more rapidly in the Al$_x$In$_{1-x}$As MLR layers having the higher Al content. The lateral oxidation is allowed to proceed just to completion in the Al$_{x'}$In$_{1-x'}$As MLR layers, thereby leaving medial portions of Al$_x$In$_{1-x}$As between lateral Al$_y$O$_z$ portions in the Al$_x$In$_{1-x}$As layers (FIGS. 48 and 50). The resulting DBR stack comprises low-index quarter-wave aluminum oxide layers alternating with layers having a high-index quarter-wave Al$_x$In$_{1-x}$As medial portion surrounded by low-index aluminum oxide lateral portions. In the instance where the Al$_x$In$_{1-x}$As medial portion comprises a super-lattice material, the sub-layers are typically sufficiently thin that for optical wavelengths typically used in the waveguides and resonators of the present invention, the optical mode behaves substantially as if the super-lattice layer were a uniform layer having an index equal to the average index of the sub-layers of the super-lattice. A core layer may preferably comprise InGaAsP electro-active MQW material, and doped InP, InGaAs, or InGaAsP may preferably be used for electrical contact layers. Either p-type or n-type doping may be used for the contact layers, and delta doping may be preferred. Buffer, cladding, and/or etch-stop layers, if present, may preferably comprise InP, InGaAs, or InGaAsP, and the waveguide may rest on an InP substrate. Other suitable materials may be equivalently employed for the substrate and/or the core, buffer, cladding, and/or etch-stop layers.

The GaAs-compatible MQW materials discussed previously (GaAs/AlGaAs; GaAs/InGaAs; GaAs/InGaAsN) may be used with InP-compatible MLR stack(s) using the multi-substrate vertical fabrication processes of FIGS. 21–26 and 35–40 in similar manner to the use of InGaAsP MQW layers with GaAs/AlGaAs MLR stack(s) described above.

A specific layer sequence is given in the table in the Appendix for a dual-DBR waveguide structure for the 1.5 µm region. The waveguide is vertically fabricated according to the three-substrate scheme of FIGS. 35 and 36 (electro-active core on InP) and horizontally fabricated according to FIGS. 41, 42, or 43 and FIG. 48 or 50. Layer composition and refractive index is given for the layers as initially deposited and after lateral oxidation. Quarter-wave thicknesses are determined based on the layer index after oxidation. The DBR stacks comprise alternating AlGaAs/Al$_x$O$_y$ layers and the electro-active core layer comprises InGaAsP MQW material. This specific structure is exemplary only, and should not be construed as limiting the scope of inventive concepts disclosed and/or claimed herein.

Any and all specific material combinations and operating wavelength ranges given here are exemplary, and should not be construed as limiting the scope of inventive concepts disclosed and/or claimed herein. In particular, as new material combinations and systems are developed which facilitate enhanced material lattice compatibility and more extensive operating wavelength ranges, such materials may be employed in waveguides and resonators of the present invention while remaining within the scope of inventive concepts disclosed and/or claimed herein.

Waveguides and resonators according to the present invention may find wide applicability in the field of fiber-optic telecommunications and modulation and/or routing of optical signal power transmission. Such resonators and waveguides may be readily incorporated into integrated optical devices, and their unique optical properties enable operation at lower operating drive voltages than currently deployed devices, more efficiently transfer of optical power to/from integrated optical devices, and/or lower insertion loss for optical devices. While the following exemplary devices employ a fiber-optic taper transverse-coupled to a multi-layer waveguide of the present invention, analogous devices may be equivalently implemented using other low-index transmission optical waveguides transverse-coupled to the multi-layer waveguide, including various fiber-optic waveguides, planar waveguide circuit waveguides, and so forth.

Figure 51:
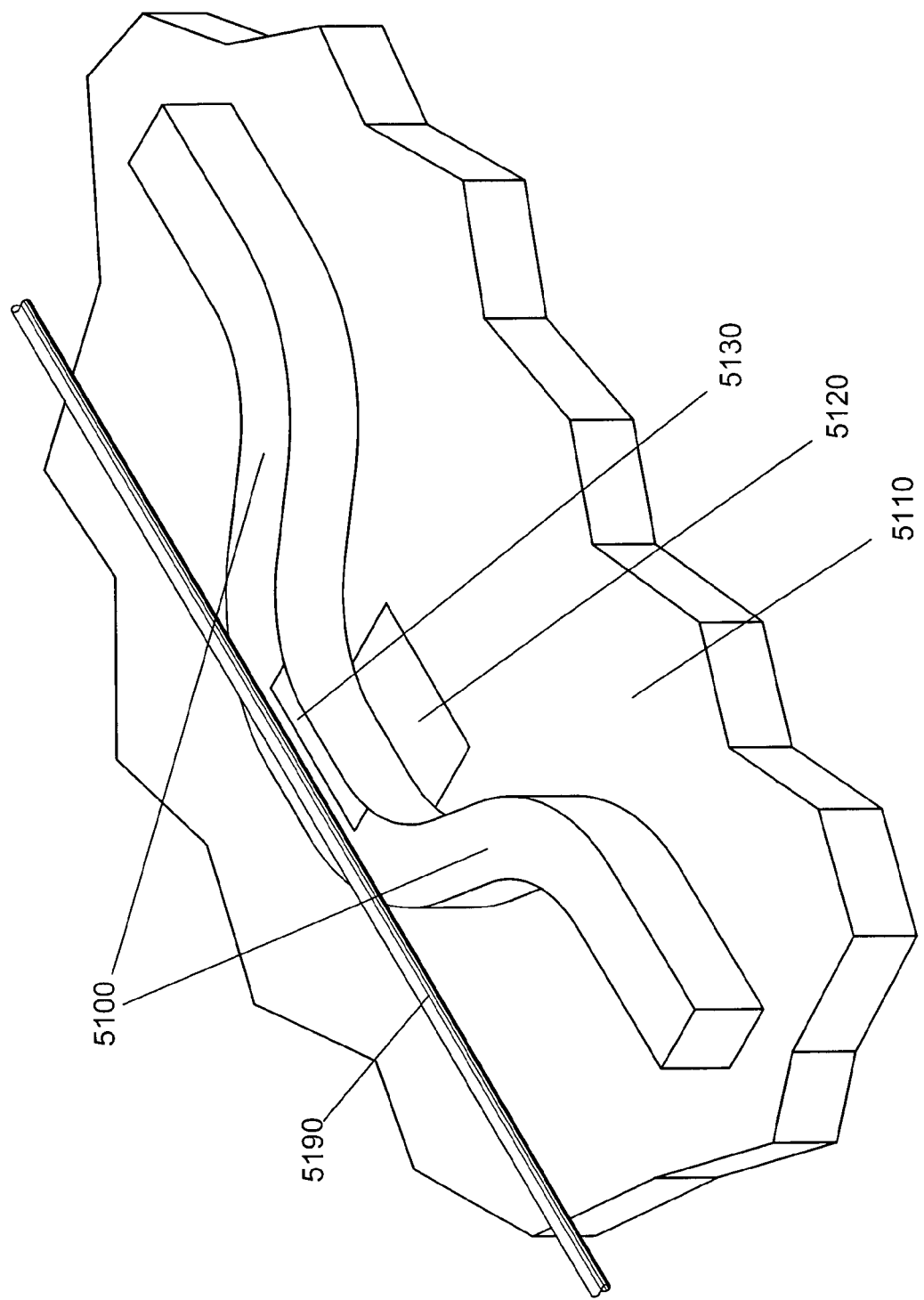
FIG. 51 shows a fiber-optic taper transverse-coupled to an optical waveguide on a substrate according to the present invention.

An optical waveguide 5100 fabricated according to the present invention on substrate 5110 is shown in FIG. 51 transverse-coupled to a transmission optical waveguide, in this example fiber-optic taper 5190. The waveguide/taper assembly is shown as surface-transverse-coupled in the exemplary embodiment of FIG. 51, but fiber taper 5190 may equivalently be side-transverse-coupled to waveguide 5100, and the ensuing discussion applies to either transverse-coupling geometry. Modal index matching may be adjusted for substantially negligible transfer of optical signal between fiber taper 5190 and waveguide 5100, thereby allowing optical signal to be transmitted substantially undisturbed through fiber taper 5190 and/or waveguide 5100. Alternatively, modal index matching may be adjusted for substantially complete transfer of optical signal between fiber taper 5190 and waveguide 5100. This simple configuration may be employed to provide a variety of optical devices having low insertion loss. For example, the device of FIG. 51 may serve as an input coupler for efficiently transferring optical signal power from an optical fiber to an optical device integrated onto substrate 5110. The efficient optical signal power transfer enabled by transverse-coupling yields a device exhibiting low insertion loss. The device of FIG. 51 may be similarly employed as an output coupler for efficiently transferring optical signal power from an optical device integrated onto substrate 5110 to an optical fiber. Waveguide 5100 may be designed and fabricated for passive modal index matching to fiber-taper 5190 or other transmission optical waveguide. Alternatively, waveguide 5100 may include one or more active layers for enabling active control of modal-index matching and optical signal power transfer (yielding an input/output coupler that may be turned on/off in response to an applied control signal).

If waveguide 5100 includes an active layer, then application of a control signal enables control of the modal index of a guided optical mode of waveguide 5100, in turn enabling control of the relative modal index matching condition between the optical mode of waveguide 5100 and a propagating optical mode of optical fiber taper 5190 and optical signal power transfer therebetween. An electronic control signal may be employed, for example, applied to an electro-active layer through contact electrodes 5120 and 5130, the electrodes typically including a metal film to enable application of control signals to contact layers in the multi-layer waveguide structure. The waveguide/taper assembly may therefore be used for altering optical signal transmission through fiber taper 5190, for example, and would potentially require substantially lower control voltage due to the highly dispersive MLR stack. A device as shown in FIG. 51 may be used as a variable optical attenuator (VOA), with the level of attenuation varying with the amount of optical signal power transferred out of the optical fiber and into the waveguide (which in turn depends on the modal-index-matching condition resulting from a control voltage applied to electrodes 5120/5130). If electrodes 5120/5130 are adapted for receiving high-speed signals, device 5100 may function as a non-resonant high-speed modulator for an optical signal carried by fiber-optic taper 5190. The device of FIG. 51 may also be used as a 2×2 optical switch, enabling controlled transfer (or not, as desired) of optical signals between waveguide 5100 and fiber-optic taper 5190.

Waveguide 5100 may alternatively include an electro-absorptive layer. Application of a control voltage through contact electrodes 5120 and 5130 may enable control of optical loss in waveguide 5100, in turn enabling control of transmission of an optical signal through fiber-optic taper 5190. Waveguide 5100 may alternatively include a non-linear-optical layer. Application of an optical signal may therefore enable control of optical loss of waveguide 5100 and/or modal-index-matching between waveguide 5100 and fiber-optic taper 5190, in turn enabling control of transmission of an optical signal through fiber-optic taper 5190.

For this and subsequent embodiments of the present invention, some consideration of the size and placement of contact electrodes is required. For a surface-guiding and/or surface-coupled waveguide, an upper electrode (such as 5130) preferably does not extend across the entire width of the upper surface of the waveguide, but is confined along one or both sides of the waveguide upper surface so as to reduce electrode-induced optical loss for the surface-guided optical mode. An upper contact layer of the waveguide structure (which may generally introduce less optical loss than a metal film) may preferably extend across substantially the entire width of the waveguide for applying the bias voltage thereto through electrical contact with the electrode. For a non-surface-guiding and side-coupled waveguide, a contact electrode may extend across the top surface of a waveguide. Similarly, a lower contact electrode (such as 5120) preferably does not extend under the waveguide, but provides electrical contact with a lower contact layer of the waveguide which does extend under the waveguide across substantially the entire width thereof. The length of the electrodes should preferably be chosen to result in the desired degree of optical signal power transfer according to the equations shown hereinabove.

Figure 52:
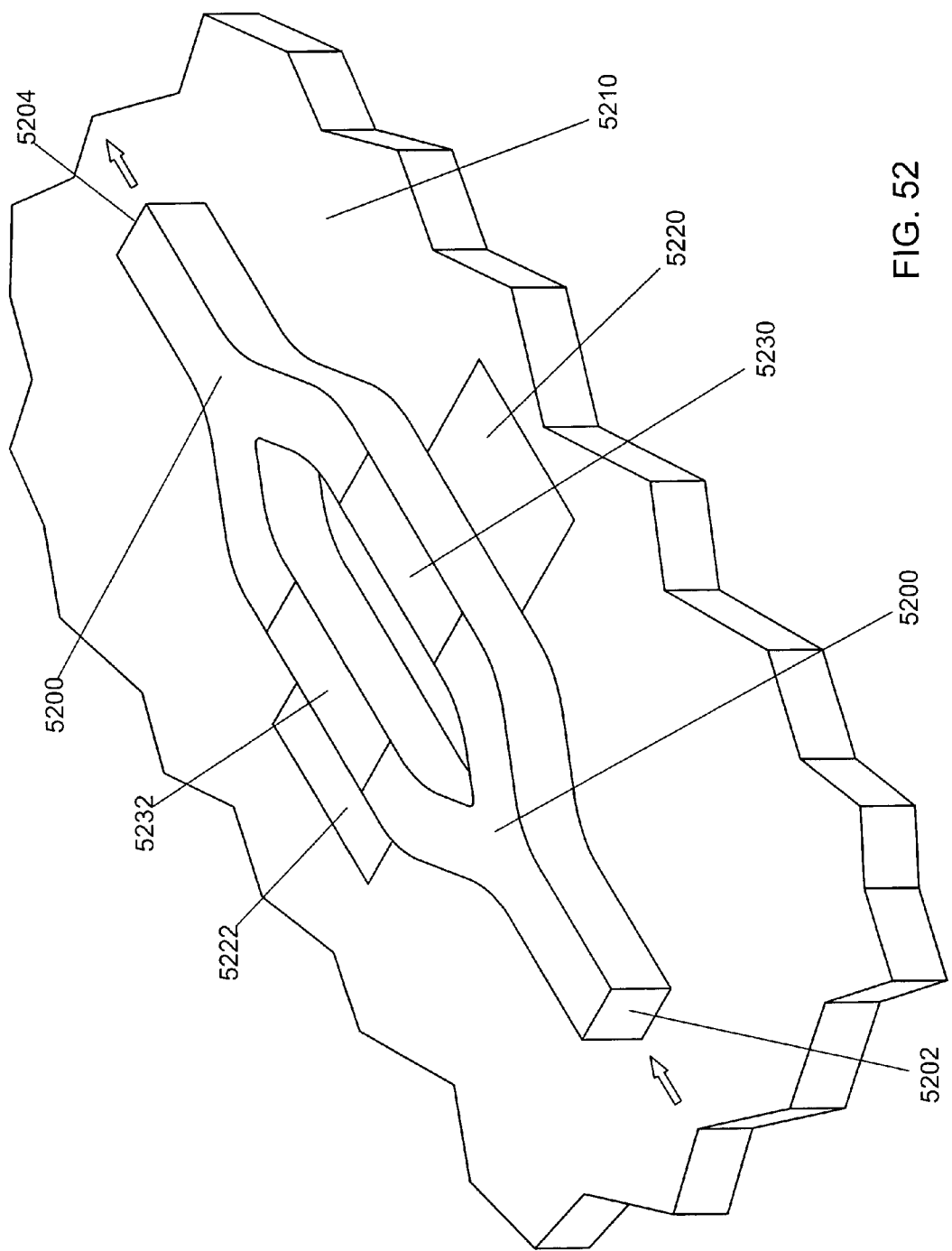
FIG. 52 shows a Mach-Zender interferometer optical modulator on a substrate according to the present invention.

FIG. 52 shows a simple Mach-Zender interferometer modulator 5200, similar to the prior-art device of FIG. 1, fabricated according to the present invention on a substrate 5210 and including an electro-optic layer. The optical signal to be modulated may enter modulator 5200 through entrance face 5202 (end-coupling) and divide into a fraction entering the two branches of modulator 5200. Application of control voltages through contact electrodes 5220/5222/5230/5232 enable control of the relative modal indices of optical signal fractions propagating through the two branches of modulator 5200, in turn enabling the control the relative phase of the optical signal fractions at exit face 5204. When the fractions constructively interfere at 5204, the transmission of modulator 5200 is substantially maximal (except for insertion loss). When the fractions destructively interfere at 5204, the transmission of modulator 5200 is minimal (preferably nearly zero). The highly dispersive properties of the DBR stack(s) of modulator 5200 result in a substantially lower V, for modulator 5200 (less than 1 volt; potentially less than about 100 mV) than for the lithium niobate modulator of FIG. 1 (as much as 5 to 10 volts). A high-speed driver for amplifying high-speed electronic control signals is therefore not needed to control modulator 5200. Modulator 5200 may be a single- or dual-MLR device. Modulator 5200 may also include an electro-absorptive layer, thereby enabling control of optical loss. This may be useful for controlling overall transmission, or for balancing intensities in the two branches of the interferometer for modulation contrast enhancement.

Alternatively, modulator 5200 may include a non-linear-optical layer for enabling control of relative phase and/or optical loss by application of an optical control signal.

Figure 53:
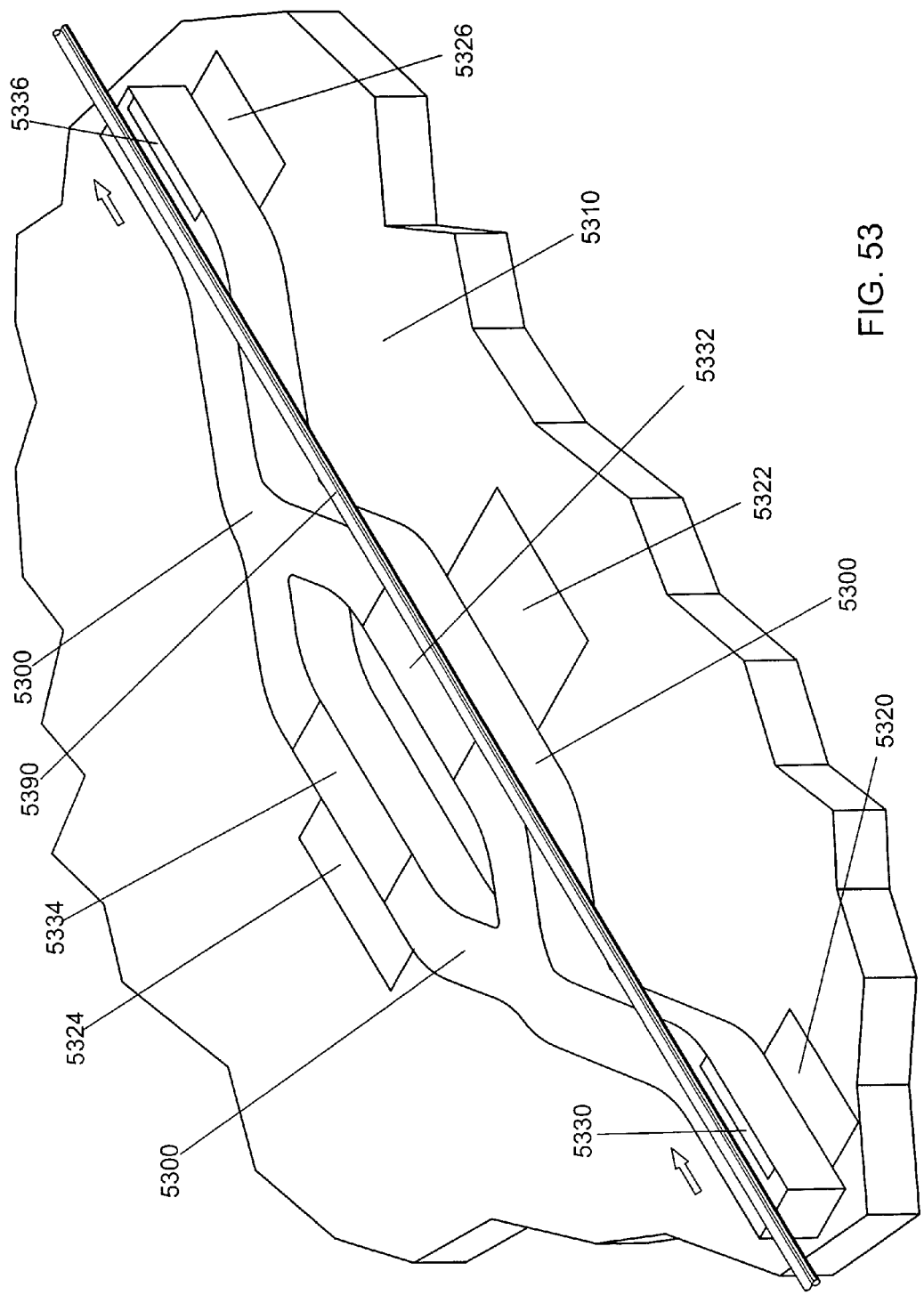
FIG. 53 shows a fiber-optic taper transverse-coupled to a Mach-Zender interferometer optical modulator on a substrate according to the present invention.
Figure 54:
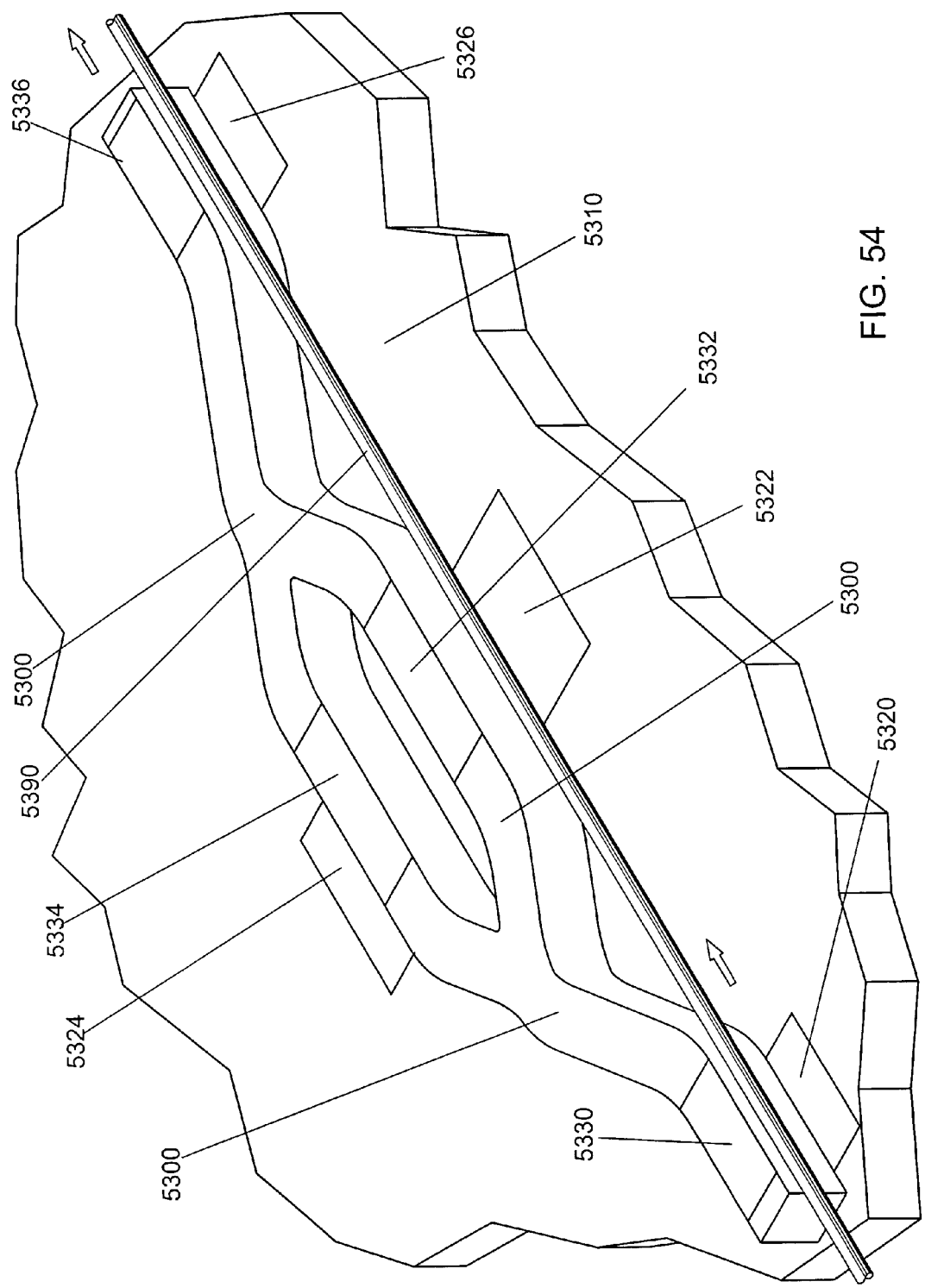
FIG. 54 shows a fiber-optic taper transverse-coupled to a Mach-Zender interferometer optical modulator on a substrate according to the present invention.

While the device of FIG. 52 requires lower high-speed control voltage, the optical signal to be modulated must still enter through end face 5202 and exit through end face 5204 (end-coupling), and modulator 5200 therefore may exhibit relatively high insertion loss (as high as about 12–15 dB; similar to the prior art device of FIG. 1). FIG. 53 shows a Mach-Zender interferometer modulator 5300 fabricated according to the present invention as a waveguide structure on substrate 5310 transverse-surface-coupled to a fiber-optic taper 5390 at an input region and an output region. The optical signal of fiber-taper 5390 may be transferred to modulator 5300 by application of an input control voltage through contact electrodes 5320/5330 to impose the needed modal index matching condition to achieve nearly complete transfer of optical power from fiber-taper 5390 to waveguide 5300. This input control voltage need not be modulated, and may therefore be adjusted to the required level without the need for any high-speed driver. Once within modulator 5300, high-speed control voltages (or optical control signals) may be applied through contact electrodes 5322/5332/5324/5334 to control transmission through modulator 5300 in a manner completely analogous to that described hereinabove for modulator 5200. An output control voltage (which need not be modulated) applied through contact electrodes 5326/5336 may be adjusted to achieve nearly complete transfer of any optical power transmitted through modulator 5300 back into fiber taper 5390 in an output region of modulator 5300. This embodiment has the desirable low $V_\pi$ of the device of FIG. 52, but with extremely low insertion loss (less than about 3 dB, potentially even less than about 1 dB). An optical detector integrated onto substrate 5310 at exit face 5304 may serve as a useful diagnostic tool for monitoring the performance of the device of FIG. 53. FIG. 54 shows a similar Mach-Zender modulator waveguide 5300 side-transverse-coupled to fiber-optic waveguide 5390. If appropriately designed and sufficiently accurately fabricated, passive modal index matching may be employed at the input and output regions, eliminating the need for electrodes 5320/5330/5326/5336.

Figure 58:
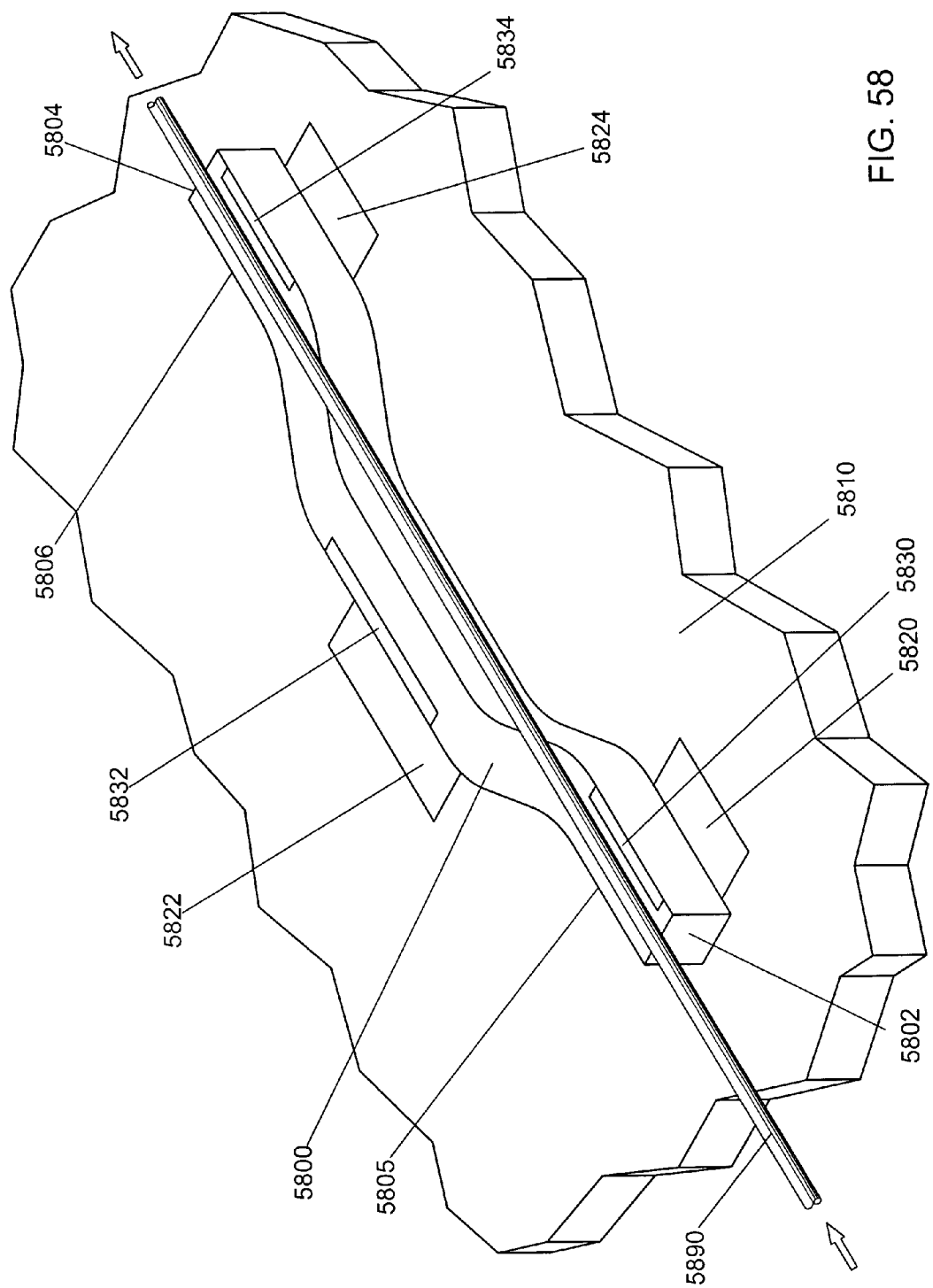
FIGS. 58 and 59 show a fiber-optic taper transverse-coupled to an optical waveguide on a substrate according to the present invention so as to form a Mach-Zender interferometer optical modulator.

FIG. 58 illustrates an alternative Mach-Zender interferometer optical modulator according to the present invention. This device may be used for controlled modulation of light transmission through a tapered optical fiber. A fiber-optic taper 5890 is shown transversely-surface-coupled to a waveguide 5800 at separate input and output coupling regions 5805 and 5806, respectively. The modal index of waveguide 5800 and the lengths of the coupling regions 5805 and 5806 may be designed so that about half of the optical power is transferred from waveguide 5800 to fiber-optic taper 5890 at each of the regions 5805 and 5806 without application of any bias voltage (passive modal-index-matching). Alternatively, an input bias voltage may be applied to the input coupling region 5805 (active modal-index-matching) through contact electrodes 5820/5830, each typically comprising a metal film to enable application of a bias voltage to contact layers in the multi-layer waveguide structure. The applied bias voltage is chosen to transfer about half of the optical signal power between waveguide 5800 and fiber-optic taper 5890. The output coupling region 5806 may be similarly passive modal-index-matched or active modal-index-matched (by biasing contact electrodes 5824/5834). When employed, input and output bias voltages applied are typically not substantially altered once the appropriate voltage levels are determined for a desired degree of transverse optical coupling, therefore no high-speed driver electronics are required for the input or output bias.

The intermediate segments (between the coupling regions) of the fiber-optic taper 5890 and the waveguide 5800 may function respectively as the two arms of a Mach-Zender interferometer, through which two fraction of the optical signal propagate. Application of a modulator control voltage through contact electrodes 5822/5832 enables control of the modal index of the modulator fraction of the optical signal in waveguide 5800 in the intermediate segment thereof. Control of the modal index in turn enables control of the relative phase of the modulator fraction and the fiber-optic taper fraction of the optical signal as they reach the output coupling region. The relative phase may be adjusted to achieve substantially constructive interference of the optical signal fractions in the fiber-optic taper (i.e., maximal transmission through the tapered optical fiber), or alternatively to achieve substantially destructive interference of the optical signal fractions in the fiber-optic-taper (i.e., minimal transmission through the tapered optical fiber), thereby achieving the desired result of controlled modulation of the overall transmission of optical power through fiber-optic taper 5890.

The modulator control voltage may be varied between two operational levels corresponding respectively to maximal transmission (constructive interference in the fiber-optic taper) and minimal transmission (destructive interference in the fiber-optic taper). The difference between the operational voltage levels is $V_\pi$, which may be less than one volt (and potentially even less) for the modulator of FIG. 58 incorporating a dispersion-engineered multi-layer waveguide according to the present invention. The modulator may therefore be operated without the need of a high voltage RF driver or amplifier, reducing the size, expense, and power requirements of the modulator, and eliminating bandwidth restrictions potentially imposed by a driver. The insertion loss of the device may be quite low (less than 3 dB, perhaps less than 1 dB), particularly compared to the end-coupled device of FIG. 1. The spatial-mode-matching requirements and resulting insertion losses of the modulator of FIG. 1 are not present in the modulator of FIG. 58. An optical detector integrated onto substrate 5810 at exit face 5804 of waveguide 5800 may serve as a useful diagnostic tool for monitoring the performance of the device of FIG. 58. Alternatively, waveguide 5800 may be optically coupled at its input end face 5802 and/or its output end face 5804 to other optical elements, including optical sources and/or optical detectors, integrated onto substrate 5810.

While shown as substantially identical structures in the Figures, the input and output coupling regions of the Mach-Zender device need not be symmetric. Whether biased (active) or passive, each coupling region may be specifically and separately configured depending on the operational characteristics desired for a specific device. By appropriately fabricating, configuring, controlling, biasing, and/or adjusting the input and/or output coupling regions, one or all of the average optical transmission level, transmission differential, the contrast ratio, the power-off transmission state, and/or the power-on transmission state of the modulator may be varied, for example. Equivalently, one may set desired minimum and maximum transmission levels for the modulator. Incorporation of an electro-absorptive layer in waveguide 5800 enables control of overall optical loss of the modulator. Optical control signals may be employed for control of a waveguide 5800 incorporating a non-linear-optical layer.

Figure 59:
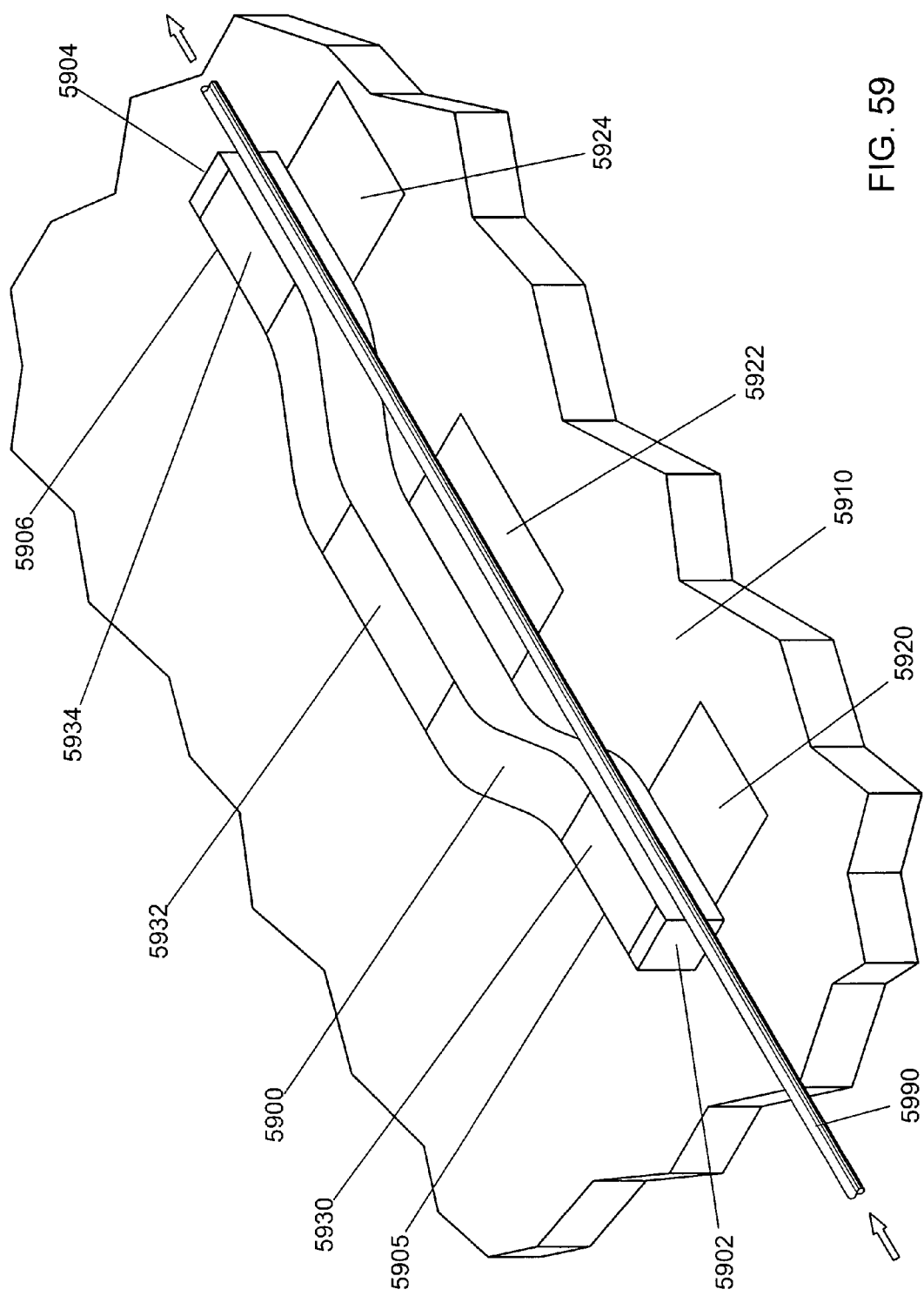

An alternative Mach-Zender interferometer optical modulator according to the present invention is shown in FIG. 59. In this case a fiber-optic taper 5990 is transversely-side-coupled to a waveguide 5900 according to the present invention at input and output coupling regions 5905 and 5906, respectively. Intermediate segments of waveguide 5900 and fiber-optic taper 5990 form respectively the two arms of a Mach-Zender interferometer. The modal index of waveguide 5900 and the lengths of the coupling regions 5905 and 5906 may be designed so that about half of the optical power is transferred between an optical mode of waveguide 5900 and a propagating optical mode of fiber-optic taper 5990 at each of the regions 5905 and 5906 without application of any bias voltage (passive modal index matching). Alternatively, an input bias voltage may be applied via contact electrodes 5920/5930, and an output bias voltage may be applied via contact electrodes 5924/5934, as described hereinabove (active modal index matching). A modulator control voltage may be applied via contact electrodes 5922/5932. An optical detector integrated onto substrate 5910 at exit face 5904 of waveguide 5900 may serve as a useful diagnostic tool for monitoring the performance of the device of FIG. 59. Alternatively, waveguide 5900 may be optically coupled at its input face 5902 and/or at its output face 5904 to other optical elements, including optical sources and/or optical detectors, integrated onto substrate 5910. The operational characteristics and advantages, including low insertion loss and low $V_\pi$, of the modulator of FIG. 59 are similar to those of the modulator of FIG. 58.

Instead of operating as an electro-optic Mach-Zender interferometer modulator, the devices depicted in FIGS. 58 and 59 may be implemented as electro-absorptive modulators. Waveguide 5800 or 5900 may be fabricated with at least one electro-absorptive layer thereof. The input and output coupling regions (5805 and 5806, or 5905 and 5906) may be biased or unbiased, and fabricated, configured, controlled, biased, and/or otherwise adjusted to provide substantially complete transfer of optical power between waveguide 5800 or 5900 and fiber-optic taper 5890 or 5990, respectively. Application of a control voltage to the intermediate portion of waveguide 5800 or 5900 through electrodes 5822/5832 or 5922/5932 may alter the optical transmission through waveguide 5800 or 5900 between substantially minimal and substantially maximal transmission. In this way the overall transmission through fiber-optic taper 5890 or 5990 may be similarly modulated between substantially minimal and substantially maximal transmission. Such an electro-absorptive modulator has low insertion loss (less than about 3 dB) and would require a drive voltage comparable to current electro-absorptive modulators. It may be desirable to provide the intermediate portion of fiber-optic taper 5890/5990 with a optical loss mechanism, so that any optical signal not transferred to waveguide 5800/5900 is not transmitted through taper 5890/5990.

Figure 60:
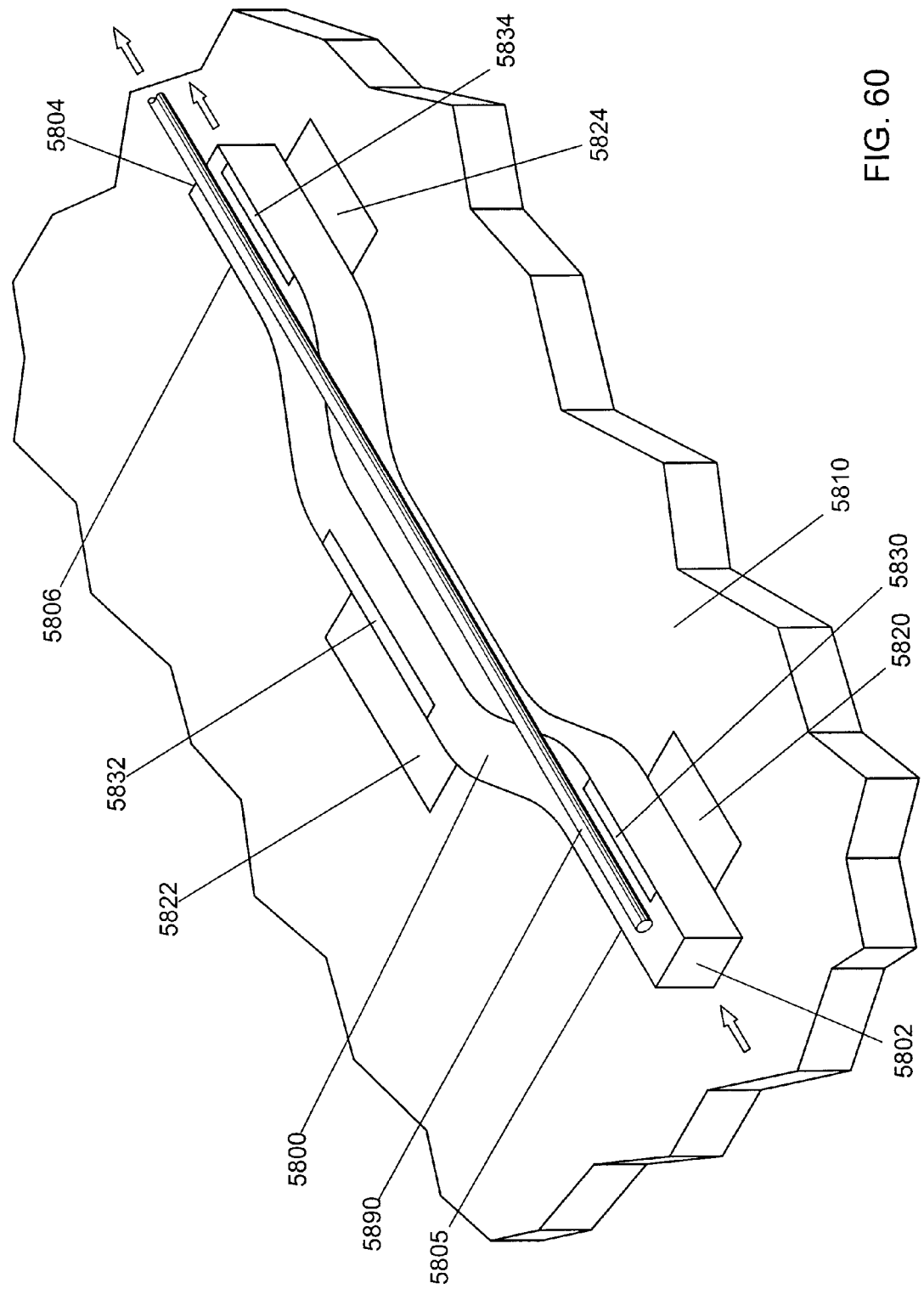
FIGS. 60 and 61 show a fiber-optic taper transverse-coupled to an optical waveguide on a substrate according to the present invention so as to form a Mach-Zender interferometer optical modulator.
Figure 61:
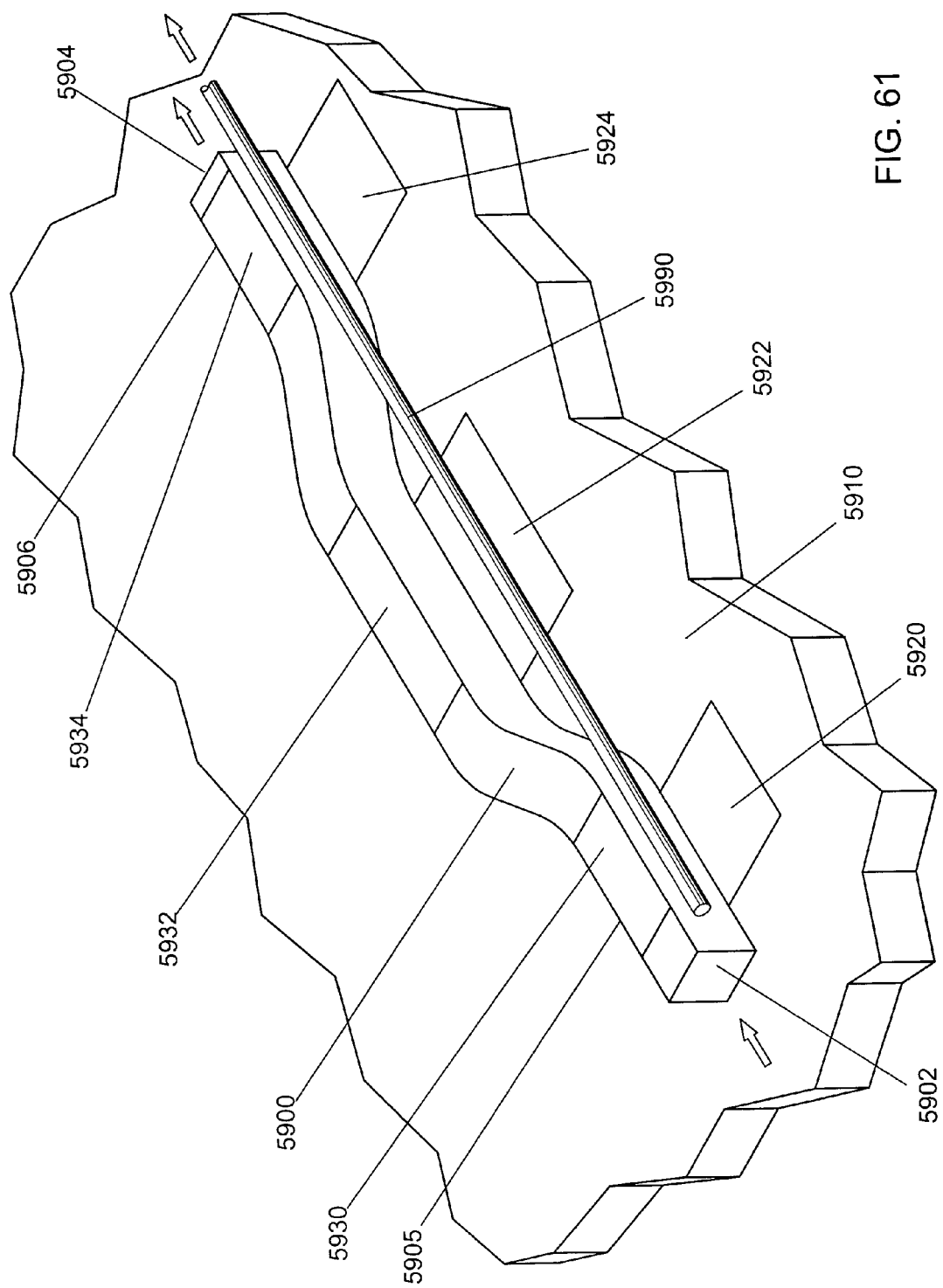

Instead of modulating optical transmission through a tapered optical fiber, the devices of FIGS. 58 and 59 may be used instead to modulate optical transmission from the waveguide to the optical fiber as in FIGS. 60 and 61. This may be particularly advantageous when a device of FIG. 60 or FIG. 61 is combined with an optical source (preferably a diode laser) integrated onto the same substrate as the waveguide and coupled into the waveguide at an input end 5802 (FIG. 60) or 5902 (FIG. 61). Control voltages applied to input and output coupling regions may be employed to control the overall transmission of light from the waveguide into the tapered optical fiber (active modal-index-matching), or passive modal-index-matching may be employed. Application of high-speed control voltages to the intermediate region of the waveguide enables high-speed modulation of transmission of light from the waveguide into the tapered optical fiber. When implemented with an integrated optical source such as a diode laser, the devices of FIGS. 60 and 61 each solve simultaneously the problems of: i) efficient coupling of light from the source into an optical fiber; and ii) high-speed, low voltage modulation of transmission of light from the source through the fiber.

Figure 2:
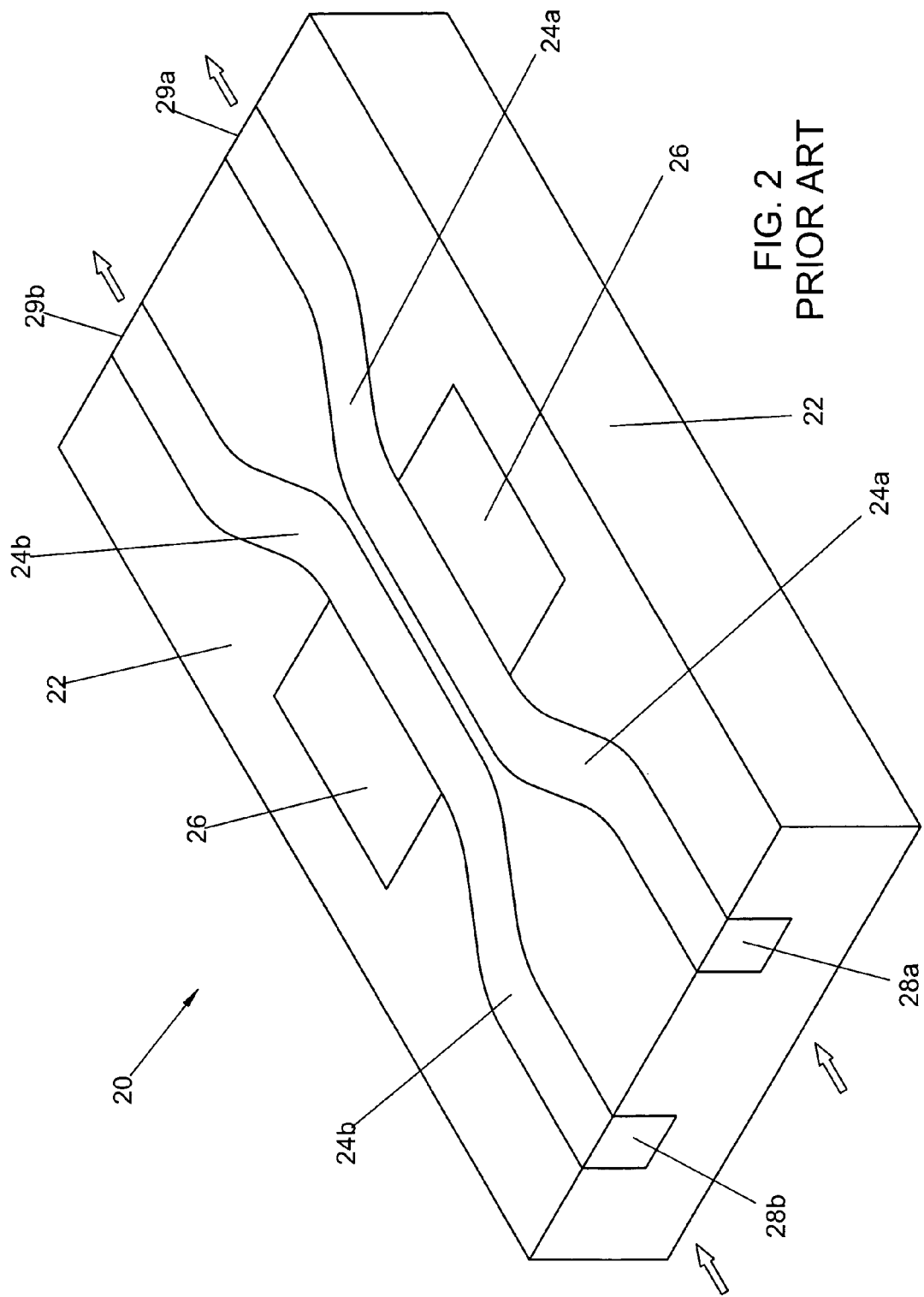
FIG. 2 shows a prior-art directional coupler fabricated on an electro-optic crystal substrate.
Figure 55:
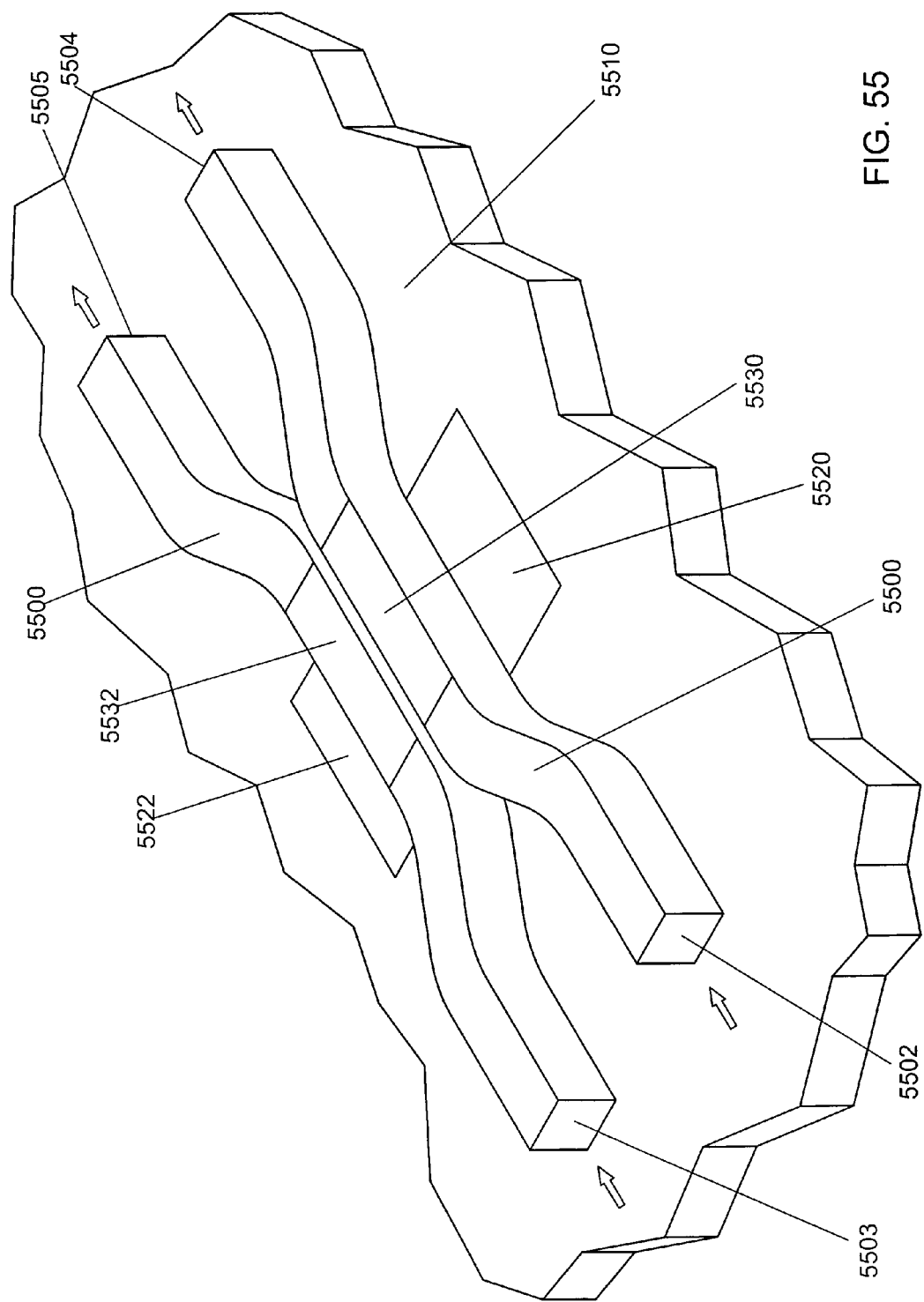
FIG. 55 shows an optical switch on a substrate according to the present invention.

FIG. 55 shows a simple 2×2 switch 5500, similar to the prior-art device of FIG. 2, fabricated according to the present invention on a substrate 5510. The optical signal to be controlled may enter coupler 5500 through entrance face 5502 or 5503 (end-coupled). Application of control voltages through contact electrodes 5520/5522/5530/5532 enable control of the relative modal indices of coupler optical modes propagating through the coupling region of coupler 5500, in turn enabling the control the relative optical power reaching exit faces 5504 and 5505. The highly dispersive properties of the MLR stack(s) of coupler 5500 result in a substantially lower $V_0$ for coupler 5500 (less than 1 volt; potentially less than about 100 mV) than for the lithium niobate coupler of FIG. 2 (as much as 5 to 10 volts). A high-speed driver for amplifying high-speed electronic control signals is therefore not needed to control coupler 5500. Coupler 5500 may be a single- or dual-MLR device. Switch 5500 may also include an electro-absorptive layer, thereby enabling control of optical loss. This may be useful for controlling overall transmission, or for balancing intensities in the two arm of the switch. Alternatively, switch 5500 may include a non-linear-optical layer for enabling control of relative phase and/or optical loss by application of an optical control signal.

Figure 56:
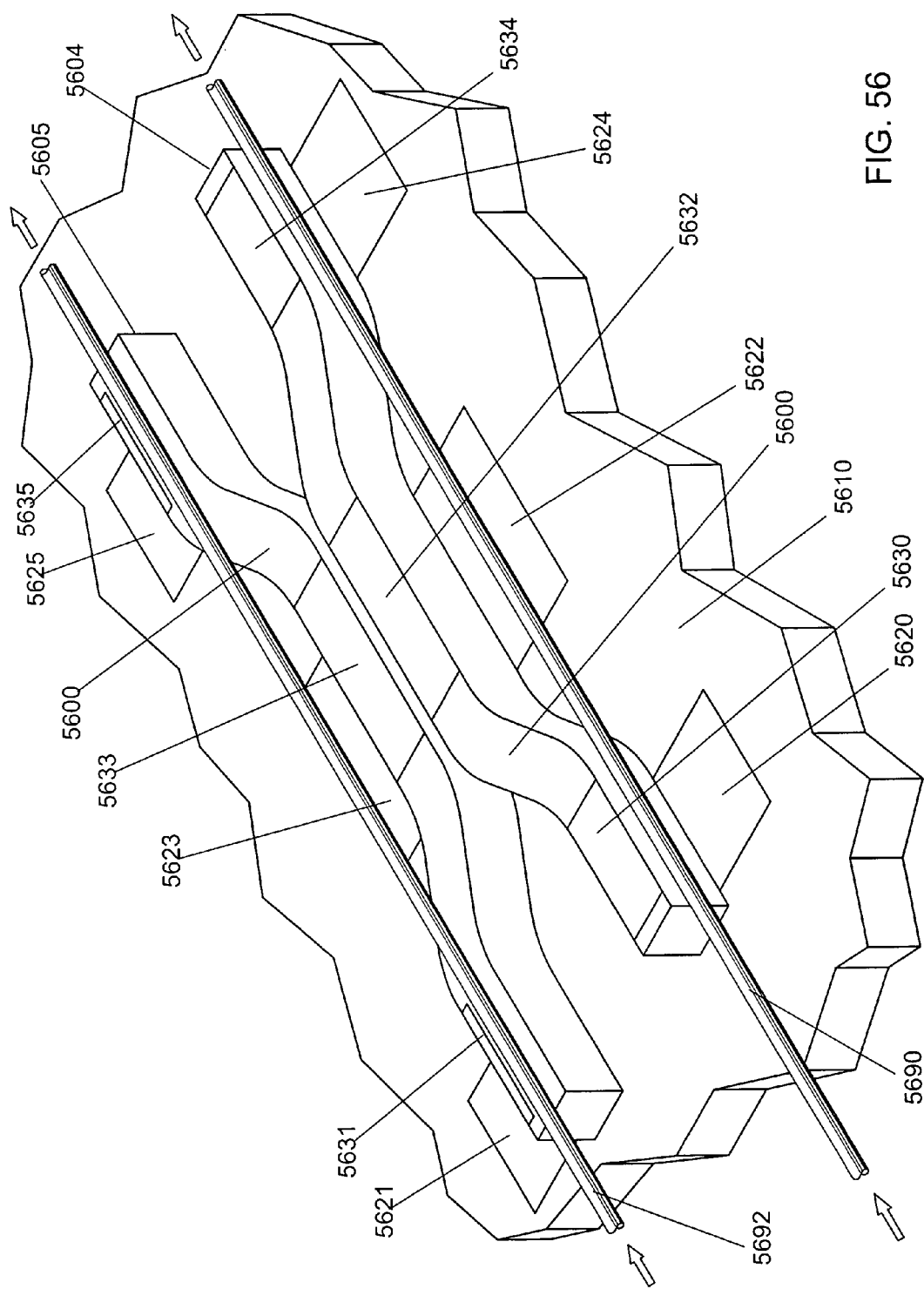
FIG. 56 shows a pair of fiber-optic tapers transverse-coupled to an optical switch on a substrate according to the present invention.

While the device of FIG. 55 requires lower high-speed control voltage, the optical signal to be controlled must still enter through end faces 5502 or 5503 and exit through end faces 5504 and 5505, and switch 5500 therefore exhibits relatively high insertion loss (as high as about 12–15 dB). FIG. 56 shows a 2×2 switch 5600 fabricated according to the present invention on substrate 5610, transverse-side-coupled to a first fiber-optic taper 5690 at an input region and an output region, and transverse-surface-coupled to a second fiber-optic taper 5692 at an input region and an output region. The optical signal from fiber-taper 5690 or 5692 may be transferred to coupler 5600 by application of a control voltage through contact electrodes 5620/5630 or 5621/5631, respectively, to impose the needed index matching condition to achieve nearly complete transfer of optical power from one of the fiber-tapers 5690 or 5692 to coupler 5600. This input control voltage need not be modulated, and may therefore be adjusted to the required level without the need for any high-speed driver. Once within coupler 5600, high-speed control voltages may be applied through contact electrodes 5622/5632/5623/5633 to control transfer of optical power within coupler 5600 in a manner completely analogous to that described hereinabove for coupler 5500. Output control voltages applied through contact electrodes 5624/5634 and 5625/5635 may be adjusted to achieve nearly complete transfer of any optical power transmitted through coupler 5600 back into fiber tapers 5690 and/or 5692 in output regions of coupler 5600. This embodiment has the desirable low $V_0$ of the device of FIG. 55, but with extremely low insertion loss (less than about 3 dB, potentially even less than about 1 dB). Optical detectors integrated onto substrate 5610 at exit faces 5604 and 5605 may serve as a useful diagnostic tool for monitoring the performance of the device of FIG. 56. Switch 5600 may be fabricated as a transverse-side-coupled device or a transverse-surface-coupled device, and both possibilities illustrated in FIG. 56. Fiber-taper 5690 is shown side-coupled to switch 5600, while fiber-taper 5692 is shown surface-coupled to switch 5600. The two separate waveguides of switch 5600 are shown transverse-side-coupled in FIG. 56. If appropriately designed and sufficiently accurately fabricated, passive modal index matching may be employed at the input and output regions, eliminating the need for electrodes 5620/5630/5621/5631/5624/5634/5625/5635.

The embodiment of FIG. 51 may be configured to function as a 2×2 switch, with the fiber-optic taper 5190 and waveguide 5100 serving as the two optical pathways of the switch. Application of a control voltage to electrodes 5120/5130 (or application of an optical control signal) alters the modal-index matching condition between taper 5190 and waveguide 5100, so that entering optical signals either remain within the component through which they entered (taper 5190 or waveguide 5100), or are transferred to the other component. The dispersive MLR structure of the waveguide enables switching at low $V_0$.

Figure 57:
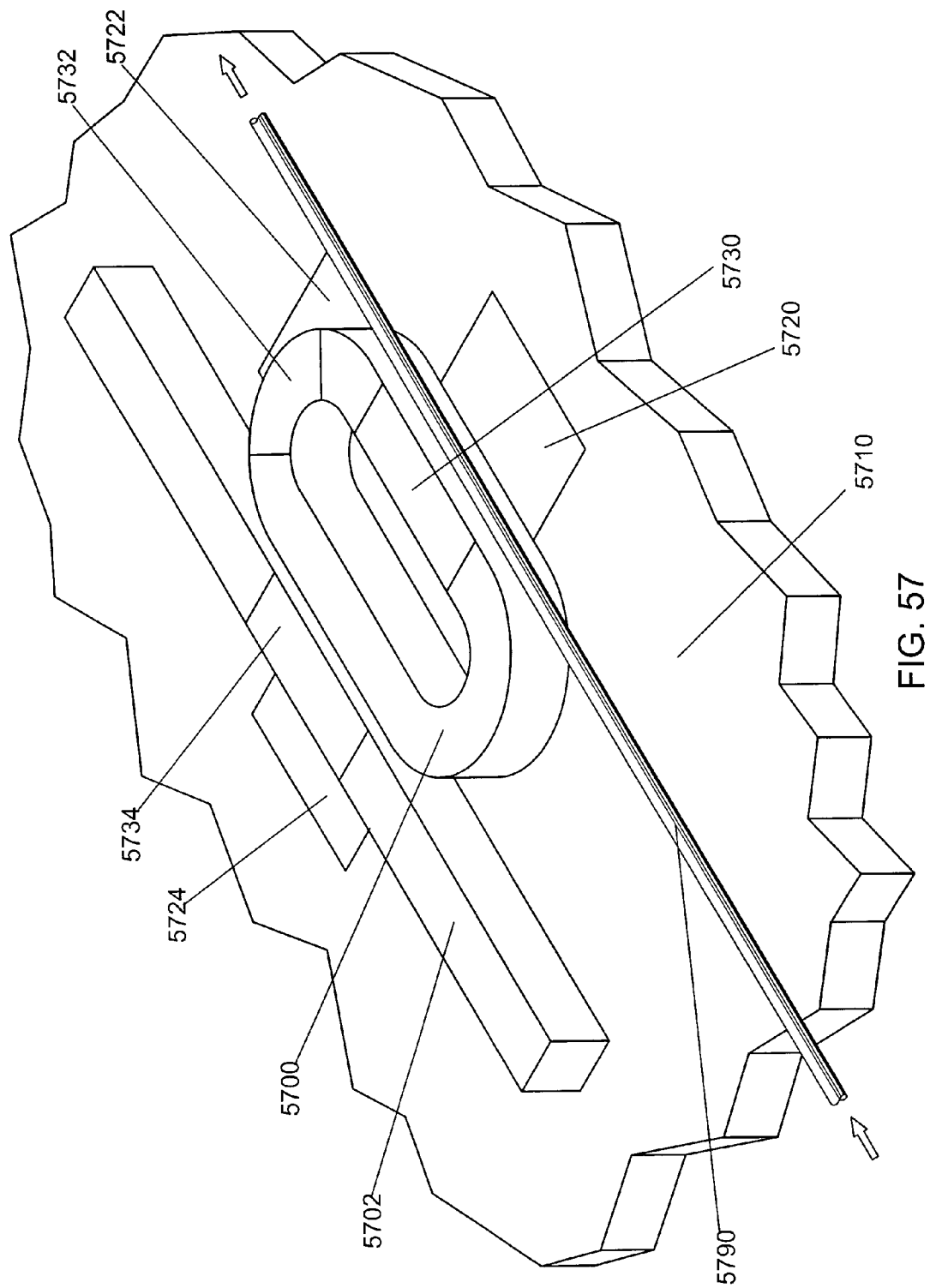
FIG. 57 shows a fiber-optic taper transverse-coupled to an optical resonator on a substrate in turn transverse-coupled to a loss-control optical waveguide according to the present invention.

A resonant optical power control device similar to those described in earlier-cited applications A13 and A22 is shown in FIG. 57. An optical resonator 5700 and a modulator waveguide 5702 are fabricated according to the present invention as transverse-side-coupled structures on substrate 5710. A fiber-taper 5790 is shown transverse-side-coupled to resonator 5700. A specific wavelength component of an optical signal propagating through fiber-taper 5690, resonant with a resonance of resonator 5700, may transfer into resonator 5700. A desired level of optical power transfer may be achieved through application of a control voltage through contact electrodes 5720/5730 to control modal index matching between the fiber-taper 5790 and the resonator 5700. Alternatively, passive modal-index matching may be employed. The resonance frequency of the resonator 5700 may be controlled by application of a control voltage through contact electrodes 5722/5732, by changing a modal index of resonant optical mode of resonator 5700. A level of optical loss for resonator 5700 may be controlled by application of a control voltage through contact electrodes 5724/5734, by changing modal index matching conditions between resonator 5700 and waveguide 5702 and/or by changing optical absorption characteristics of waveguide 5702. Changing the level of optical loss of resonator 5700 in this way in turn enables controlled modulation of transmission of resonant optical signals through fiber-taper 5790. Such devices, their operation, and their fabrication are disclosed in greater detail in earlier-cited application A7. Resonator 5700 and/or modulator waveguide 5702 may alternatively include a non-linear-optical layer for enabling control of resonant frequency and/or optical loss by application of an optical control signal.

For purposes of the present disclosure and appended claims, the conjunction "or" is to be construed inclusively (e.g., "a dog or a cat" would be interpreted as "a dog, or a cat, or both"), unless: i) it is explicitly stated otherwise, e.g., by use of "either . . . or", "only one of . . . ", or similar language; or ii) two or more of the listed alternatives are mutually exclusive within the particular context, in which case "or" would encompass only those combinations involving non-mutually-exclusive alternatives. The present invention has been set forth in the forms of its preferred and alternative embodiments. It is nevertheless intended that modifications to the disclosed active optical waveguides and resonators, and methods of fabrication and use thereof, may be made without departing from inventive concepts disclosed and/or claimed herein.

APPENDIX

| | thickness (nm) | composition before lateral oxidation | composition after oxidation |
|---|---|---|---|
| substrate | n/a | GaAs | GaAs |
| contact | 100 | n-delta doped InGaAs | n-delta doped InGaAs |
| buffer | 500–1000 nm | GaAs | GaAs |
| DBR stack | 230 | $Al_{0.98}Ga_{0.02}As$ | $Al_xO_y$ |
| | 130 | $Al_{0.94}Ga_{0.06}As$ | bilateral $Al_xO_y$ medial $Al_{0.94}Ga_{0.06}As$ |
| | 230 | $Al_{0.98}Ga_{0.02}As$ | $Al_xO_y$ |
| | 130 | $Al_{0.94}Ga_{0.06}As$ | bilateral $Al_xO_y$ medial $Al_{0.94}Ga_{0.06}As$ |
| | 230 | $Al_{0.98}Ga_{0.02}As$ | $Al_xO_y$ |
| | 130 | $Al_{0.94}Ga_{0.06}As$ | bilateral $Al_xO_y$ medial $Al_{0.94}Ga_{0.06}As$ |
| | 230 | $Al_{0.98}Ga_{0.02}As$ | $Al_xO_y$ |
| | 130 | $Al_{0.94}Ga_{0.06}As$ | bilateral $Al_xO_y$ medial $Al_{0.94}Ga_{0.06}As$ |
| | 230 | $Al_{0.98}Ga_{0.02}As$ | $Al_xO_y$ |
| | 130 | $Al_{0.94}Ga_{0.06}As$ | bilateral $Al_xO_y$ medial $Al_{0.94}Ga_{0.06}As$ |
| | 230 | $Al_{0.98}Ga_{0.02}As$ | $Al_xO_y$ |
| MQW EO core | 50 | InGaAsP 1.2 µm bandgap | InGaAsP 1.2 µm bandgap |
| | 9 | InGaAsP 1.6 µm bandgap | InGaAsP 1.6 µm bandgap |
| | 20 | InGaAsP 1.2 µm bandgap | InGaAsP 1.6 µm bandgap |
| | 9 | InGaAsP 1.6 µm bandgap | InGaAsP 1.6 µm bandgap |
| | 20 | InGaAsP 1.2 µm bandgap | InGaAsP 1.6 µm bandgap |
| | 9 | InGaAsP 1.6 µm bandgap | InGaAsP 1.6 µm bandgap |
| | 20 | InGaAsP 1.2 µm bandgap | InGaAsP 1.6 µm bandgap |
| | 9 | InGaAsP 1.6 µm bandgap | InGaAsP 1.6 µm bandgap |
| | 20 | InGaAsP 1.2 µm bandgap | InGaAsP 1.6 µm bandgap |
| | 9 | InGaAsP 1.6 µm bandgap | InGaAsP 1.6 µm bandgap |
| | 50 | InGaAsP 1.2 µm bandgap | InGaAsP 1.6 µm bandgap |
| DBR stack | 230 | $Al_{0.98}Ga_{0.02}As$ | $Al_xO_y$ |
| | 130 | $Al_{0.94}Ga_{0.06}As$ | bilateral $Al_xO_y$ medial $Al_{0.94}Ga_{0.06}As$ |
| | 230 | $Al_{0.98}Ga_{0.02}As$ | $Al_xO_y$ |
| | 130 | $Al_{0.94}Ga_{0.06}As$ | bilateral $Al_xO_y$ medial $Al_{0.94}Ga_{0.06}As$ |
| | 230 | $Al_{0.98}Ga_{0.02}As$ | $Al_xO_y$ |
| | 130 | $Al_{0.94}Ga_{0.06}As$ | bilateral $Al_xO_y$ medial $Al_{0.94}Ga_{0.06}As$ |
| | 230 | $Al_{0.98}Ga_{0.02}As$ | $Al_xO_y$ |
| | 130 | $Al_{0.94}Ga_{0.06}As$ | bilateral $Al_xO_y$ medial $Al_{0.94}Ga_{0.06}As$ |
| | 230 | $Al_{0.98}Ga_{0.02}As$ | $Al_xO_y$ |
| | 130 | $Al_{0.94}Ga_{0.06}As$ | bilateral $Al_xO_y$ medial $Al_{0.94}Ga_{0.06}As$ |
| | 230 | $Al_{0.98}Ga_{0.02}As$ | $Al_xO_y$ |
| contact | 50 | n-delta doped InGaAs | n-delta doped InGaAs |
| buffer/clad | 200 nm | GaAs | GaAs |

What is claimed is:

1. A resonant optical device, comprising:
   a transmission optical waveguide; and
   an optical resonator transverse-coupled to the transmission optical waveguide so as to enable optical signal power transfer therebetween, the transmission optical waveguide being adapted for receiving optical signal power from an optical signal transmission system or transmitting optical signal power to the optical signal transmission system, the optical resonator including a laterally-confined multi-layer dispersion-engineered waveguide structure, the multi-layer waveguide structure including at least one multi-layer reflector stack and at least one active layer, the active layer being adapted for exhibiting varying optical loss or varying modal-index in response to an applied control signal, the optical resonator being transverse-coupled to the transmission optical waveguide through the multi-layer waveguide structure, the multi-layer waveguide structure being adapted for enabling control, by application of a control signal, of optical signal power transfer between the transmission optical waveguide and the optical resonator, a resonant frequency of the optical resonator, or optical loss of the optical resonator, thereby further enabling modulation of transmission of optical signal power through the transmission optical waveguide when the optical signal is substantially resonant with the optical resonator.

2. The device of claim 1, the active layer including at least one electro-active layer, the electro-active layer including an electro-optic layer or an electro-absorptive layer, the optical resonator including a pair of electrical contacts with at least a portion of the electro-active layer therebetween, the control signal being an electrical control signal applied through the electrical contacts.

3. The device of claim 1, the active layer including at least one non-linear optical layer, the control signal being an optical control signal applied to the non-linear-optical layer in at least a portion of the optical resonator.

4. The device of claim 1, the multi-layer waveguide structure including a single multi-layer waveguide stack, the multi-layer waveguide structure being thereby adapted for guiding a surface-guided optical mode.

5. The device of claim 1, the multi-layer waveguide structure including two multi-layer reflector stacks and a core layer therebetween, the multi-layer waveguide structure being thereby adapted for guiding an optical mode along the core layer.

6. The device of claim 1, the optical resonator and the transmission optical waveguide being passively substantially modal-index-matched at respective transverse-coupling segments thereof.

7. The device of claim 1, the optical resonator and the transmission optical waveguide being actively substantially modal-index-matched at respective transverse-coupling segments thereof by applying a control signal to the active layer in the transverse-coupling segment of the optical resonator.

8. The device of claim 1, the multi-layer waveguide structure including a high-index material.

9. The device of claim 1, the transmission optical waveguide being a low-index transmission optical waveguide, the low-index waveguide being adapted for transverse-coupling.

10. The device of claim 1, the transmission optical waveguide being a transmission fiber-optic waveguide, the transmission fiber-optic waveguide being adapted for transverse-coupling.

11. The device of claim 1, the transmission optical waveguide being a transmission fiber-optic waveguide including a fiber-optic-taper segment, the fiber-optic-taper segment being adapted for transverse-coupling.

12. The device of claim 1, the transmission optical waveguide being a low-index planar lightwave transmission optical waveguide, the planar lightwave transmission optical waveguide being adapted for transverse-coupling.

* * * * *